United States Patent
Sugita et al.

(10) Patent No.: US 10,078,239 B2
(45) Date of Patent: Sep. 18, 2018

(54) SENSOR-EQUIPPED DISPLAY DEVICE

(71) Applicant: Sharp Kabushiki Kaisha, Sakai, Osaka (JP)

(72) Inventors: Yasuhiro Sugita, Sakai (JP); Kohhei Tanaka, Sakai (JP); Takeshi Noma, Sakai (JP); Takayuki Nishiyama, Sakai (JP); Ryo Yonebayashi, Sakai (JP); Kenshi Tada, Sakai (JP); Shinji Yamagishi, Sakai (JP); Jean Mugiraneza, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/306,825

(22) PCT Filed: Apr. 27, 2015

(86) PCT No.: PCT/JP2015/062662
§ 371 (c)(1),
(2) Date: Oct. 26, 2016

(87) PCT Pub. No.: WO2015/166899
PCT Pub. Date: Nov. 5, 2015

(65) Prior Publication Data
US 2017/0123253 A1    May 4, 2017

(30) Foreign Application Priority Data
Apr. 28, 2014   (JP) .................................. 2014-093133

(51) Int. Cl.
*G02F 1/1333*   (2006.01)
*G06F 3/041*    (2006.01)
(Continued)

(52) U.S. Cl.
CPC ........ *G02F 1/13338* (2013.01); *G02F 1/1339* (2013.01); *G02F 1/1368* (2013.01);
(Continued)

(58) Field of Classification Search
CPC ............... G02F 1/13338; G02F 1/1339; G02F 1/134336; G02F 1/1368; G02F 1/136286;
(Continued)

(56) References Cited

U.S. PATENT DOCUMENTS

2002/0163614 A1* 11/2002 Hinata .................. G02F 1/1339
349/139
2003/0058395 A1* 3/2003 Hagiwara ............. G02F 1/1339
349/139

(Continued)

FOREIGN PATENT DOCUMENTS

JP  2012-47801 A   3/2012
JP  2013-171369 A  9/2013
(Continued)

OTHER PUBLICATIONS

Official Communication issued in International Patent Application No. PCT/JP2015/062662, dated Jul. 14, 2015.

*Primary Examiner* — Edward Glick
*Assistant Examiner* — Shan Liu
(74) *Attorney, Agent, or Firm* — Keating & Bennett, LLP

(57) ABSTRACT

Provided is a sensor-equipped display device (1) that includes: a first substrate (20a); a second substrate (20b) opposed to the first substrate (20a); a liquid crystal layer (LC); a plurality of first lines (15) extending in a first direction in a pixel area (AA); second lines extending in a second direction that is different from the first direction; pixel switching elements that are provided for pixels, respectively, and are connected to the first lines and the second lines; a plurality of sensor electrodes (SE, DL)

(Continued)

provided at positions that overlap the pixel area on at least one of the first substrate and the second substrate, for detecting the contact or approach of the object; and a plurality of sensor lead-out lines that are provided in parallel to the first lines or the second lines in the pixel area on the first substrate, and are connected to the sensor electrodes, respectively.

16 Claims, 40 Drawing Sheets

(51) Int. Cl.
  *G02F 1/1339* (2006.01)
  *G02F 1/1343* (2006.01)
  *G02F 1/1368* (2006.01)
  *G06F 3/044* (2006.01)
  *G02F 1/1362* (2006.01)

(52) U.S. Cl.
  CPC .. *G02F 1/134336* (2013.01); *G02F 1/136286* (2013.01); *G06F 3/044* (2013.01); *G06F 3/0416* (2013.01); *G02F 2201/121* (2013.01); *G02F 2201/123* (2013.01); *G06F 2203/04108* (2013.01)

(58) Field of Classification Search
  CPC ......... G02F 2201/121; G02F 2201/123; G02F 2001/13312; G06F 3/0416; G06F 3/044; G06F 2203/04108; G06F 3/0412; G06F 3/0421; G06F 3/045; G06F 3/041; G06F 3/0414; G06F 3/0488; G06F 2203/04107; G06F 2203/04103; G06F 2203/041; G06F 3/03547; G06F 3/0418; G06F 3/046; G06F 3/047; G06K 11/06; H05K 9/0079; H05K 9/0073; H05K 9/0081; H05K 9/0088

USPC ............................................. 349/12; 345/173
  See application file for complete search history.

(56) References Cited

U.S. PATENT DOCUMENTS

| | | | |
|---|---|---|---|
| 2003/0095224 A1* | 5/2003 | Asakura | G02F 1/1345 349/143 |
| 2009/0040166 A1* | 2/2009 | Lee | G02F 1/1345 345/98 |
| 2009/0046085 A1* | 2/2009 | Ino | G09G 3/3648 345/208 |
| 2009/0109356 A1* | 4/2009 | Kitagawa | G02F 1/134363 349/33 |
| 2010/0001973 A1 | 1/2010 | Hotelling et al. | |
| 2011/0316809 A1* | 12/2011 | Kim | G06F 3/0412 345/174 |
| 2012/0050193 A1* | 3/2012 | Noguchi | G06F 3/0412 345/173 |
| 2012/0285809 A1* | 11/2012 | Yoshifusa | G06F 3/0416 200/5 R |
| 2013/0215057 A1 | 8/2013 | Kawachi et al. | |
| 2014/0028616 A1* | 1/2014 | Furutani | G06F 3/044 345/174 |
| 2014/0118277 A1* | 5/2014 | Kim | G06F 3/044 345/173 |
| 2014/0125626 A1* | 5/2014 | Yang | G02F 1/134336 345/174 |
| 2014/0285466 A1* | 9/2014 | Hayashi | G06F 3/044 345/174 |
| 2015/0002421 A1* | 1/2015 | Kim | G06F 3/041 345/173 |
| 2015/0192814 A1 | 7/2015 | Kosugi et al. | |
| 2015/0242041 A1 | 8/2015 | Sugita et al. | |
| 2016/0274721 A1* | 9/2016 | Ding | G06F 3/044 |

FOREIGN PATENT DOCUMENTS

| | | |
|---|---|---|
| WO | 2014/042248 A1 | 3/2014 |
| WO | 2014/045601 A1 | 3/2014 |

* cited by examiner

SENSOR-EQUIPPED DISPLAY DEVICE

TECHNICAL FIELD

The disclosure of the present application relates to techniques for a sensor-equipped display device that has a pixel area for displaying an image and is capable of detecting contact or approach of an object.

BACKGROUND ART

Conventionally, a display device in which a touch panel is stacked on a display panel has been in widespread use. Further, a configuration in which a touch panel is incorporated in a display panel has been proposed. For example, US 2010/0001973A discloses a touch screen that includes display pixels having capacitive elements.

In a conventional touch panel, lines that convey signals of electrodes for detecting a touch are arranged outside a sensor area. For example, FIG. 6B and paragraph 0099 of US 2010/0001973A indicate that metal lines are arranged in a frame area of a touch screen.

PRIOR ART DOCUMENT

Patent Document

Patent Document 1: US 2010/0001973A

SUMMARY OF THE INVENTION

Problem to be Solved by the Invention

In the prior art mentioned above, lines of the touch screen are concentratedly arranged in the frame area. This led to design limitations; for example, it became difficult to make the frame area narrower. The present application, then, discloses a sensor-equipped display device configured so that the degree of freedom in designing electrodes and lines, etc., provided for sensors can be increased.

Means to Solve the Problem

A sensor-equipped display device of the disclosure of the present application is a sensor-equipped display device that has a pixel area in which pixels for displaying an image are arranged and that is capable of detecting contact or approach of an object. The sensor-equipped display device includes: a first substrate; a second substrate opposed to the first substrate; a liquid crystal layer provided between the first substrate and the second substrate; a plurality of first lines provided on the first substrate, the first lines extending in a first direction in the pixel area; a plurality of second lines provided on the first substrate, the second lines extending in a second direction that is different from the first direction, in the pixel area; pixel switching elements provided for pixels defined by the first lines and the second lines, respectively, the pixel switching elements being connected to the first lines and the second lines; a plurality of sensor electrodes provided at positions that overlap the pixel area on at least one of the first substrate and the second substrate, the sensor electrodes being for detecting the contact or approach of the object; and a plurality of sensor lead-out lines provided in parallel to the first lines or the second lines in the pixel area on the first substrate, the sensor lead-out lines being connected to the sensor electrodes, respectively.

Effect of the Invention

According to the disclosure of the present application, the degree of freedom in designing layout of lines for sensors can be increased in a sensor-equipped display device or an input device.

BRIEF DESCRIPTION OF DRAWINGS

FIG. 13 is a top view illustrating a schematic configuration of an active matrix substrate 20a.

FIG. 28 illustrates an exemplary equivalent circuit of a drive electrode driver 35a.

MODE FOR CARRYING OUT THE INVENTION

Figure 1:
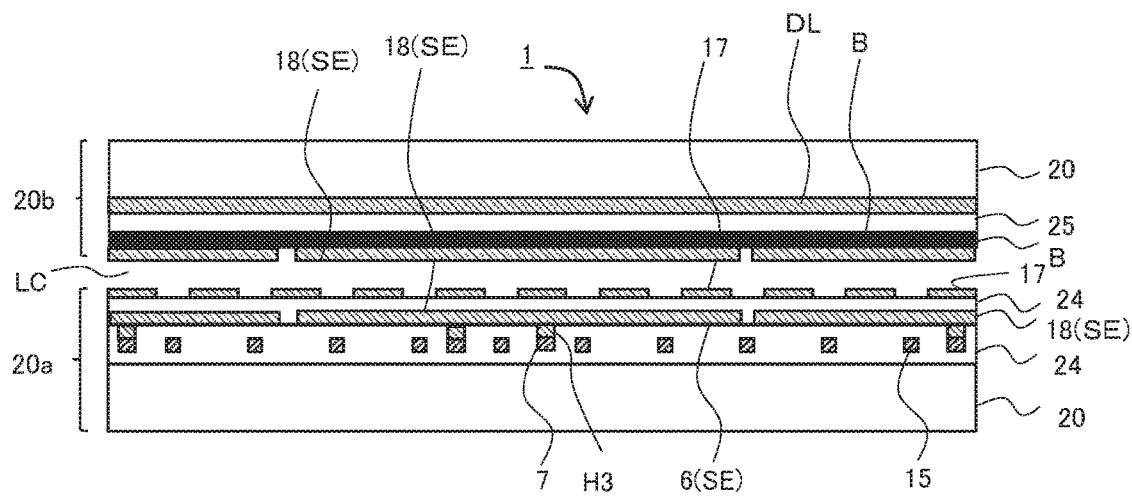
FIG. 1 is a cross-sectional view illustrating an exemplary configuration of a sensor-equipped display device 1 according to Embodiment 1.

An input device according to one embodiment of the present invention is a sensor-equipped display device that has a pixel area in which pixels for displaying an image are arranged and that is capable of detecting contact or approach of an object. The sensor-equipped display device includes: a first substrate; a second substrate opposed to the first substrate; a liquid crystal layer provided between the first substrate and the second substrate; a plurality of first lines provided on the first substrate, the first lines extending in a first direction in the pixel area; a plurality of second lines provided on the first substrate, the second lines extending in a second direction that is different from the first direction, in the pixel area; pixel switching elements provided for pixels defined by the first lines and the second lines, respectively, the pixel switching elements being connected to the first lines and the second lines; a plurality of sensor electrodes provided at positions that overlap the pixel area on at least one of the first substrate and the second substrate, the sensor electrodes being for detecting the contact or approach of the object; and a plurality of sensor lead-out lines provided in parallel to the first lines or the second lines in the pixel area on the first substrate, the sensor lead-out lines being connected to the sensor electrodes, respectively.

In the configuration described above, in the pixel area on the first substrate on which the first lines and the second lines defining the pixels are provided, the sensor lead-out lines connected to the sensor electrodes are arranged in parallel to the first lines or the second lines. This makes it possible to arrange the sensor lead-out lines dispersedly in the pixel area. As a result, the degree of freedom in designing line layout for the sensors can be increased. For example, it is not necessary to route the sensor lead-out lines on the outside to the pixel area.

In the above-described configuration, the sensor electrodes may be formed to extend in the first direction or the second direction on the first substrate. In this case, the sensor lead-out lines can be formed to extend in the same direction as the sensor electrodes in an area overlapping the sensor electrodes when viewed in a direction vertical to the pixel area. This makes it possible to reduce the electric resistance of the sensor electrodes.

In the configuration described above, at least a part of the sensor electrodes may be provided on the second substrate. In this case, the sensor-equipped display device can further include a sealing member provided between the first substrate and the second substrate, the sealing member electrically connecting the sensor lead-out lines provided on the first substrate, and the sensor electrodes provided on the second substrate. The sealing member allows the sensor lead-out lines on the first substrate and the sensor electrodes on the second substrate to be connected to each other. This makes it possible to arrange the sensor electrodes and the sensor lead-out lines dispersedly on the first substrate and the second substrate.

The sealing member can be provided along an edge parallel to the first direction. In this case, the configuration may be such that the sensor lead-out lines enter the pixel area from an edge parallel to the second direction, go out of the pixel area from the edge along which the sealing member is provided, and are connected to the sealing member. Further, the configuration may be such that on the second substrate, on the edge along which the sealing member is provided, the sealing member and the sensor electrodes in the pixel area are connected.

This allows the sensor lead-out lines entering the pixel area from an edge parallel to the first direction to be connected with the sensor electrodes at an edge parallel to the second direction. This, therefore, makes it possible to connect the sensor lead-out lines with the sensor electrodes in the pixel area from an edge parallel to the second direction, without routing the sensor lead-out lines to the outside to the edge parallel to the second direction.

The above-described sensor-equipped display device can include driving switching elements and driving control lines in the pixel area on the first substrate. The driving switching elements are formed in the pixel area on the first substrate, and control the driving of the first lines or the second lines according to signals supplied from outside of the pixel area. The driving control lines are formed in the pixel area on the first substrate, extend in the first direction or the second direction, and are connected to the driving switching elements. The configuration can be such that, when the pixel area is viewed in a plan view in a direction vertical to a surface of the pixel area, the pixels that the driving-control switching elements or the driving control lines overlap, and the pixels that the sensor lead-out lines overlap, are different.

In this configuration, since at least a part of the switching elements of the driving circuits that control the driving of the first lines or the second lines are arranged in the pixel area, fewer circuits for driving are arranged outside the pixel area. With this, an area where the sensor lead-out lines connected to the sensor electrodes can be arranged is enlarged. Consequently, the degree of freedom in designing the lines connected to the sensor electrodes can be increased.

Further, since the pixels that the driving-control switching elements or the driving control lines overlap, and the pixels that the sensor lead-out lines overlap, are different, it is possible to prevent lines and elements from being concentratedly arranged in a part of pixels. Consequently, the deterioration of display quality due to the lines in the pixel area can be suppressed.

The above-described sensor-equipped display device can further include sensor driving switching elements arranged in the pixel area, for controlling the driving of the sensor electrodes. The sensor lead-out lines can connect at least either the sensor driving switching elements and the sensor electrodes, or the sensor driving switching elements and the outside of the pixel area.

This makes it possible to reduce the dullness of the potential of the driving signal, as compared with a case where the driving of the sensor electrodes is controlled via lead-out lines from outside the pixel area, thereby enabling high speed driving. Further, since the switching elements for controlling driving are arranged in the pixel area, the frame can be narrowed as compared with a case where all of the switching elements of the driving circuits are arranged outside the pixel area.

The sensor lead-out lines can include voltage supply lines and sensor driving control lines. The voltage supply lines are lines for supplying a predetermined voltage to the sensor driving switching elements from the outside of the pixel area. The sensor driving control lines are lines for supplying a signal for controlling the output from the driving switching elements, of the predetermined voltage supplied from the voltage supply lines. With this configuration, the potentials of the sensor electrodes are controlled by the sensor driving switching elements according to a signal supplied from outside the pixel area.

In the pixel area, the sensor driving switching elements may be connected to between the sensor lead-out lines and the sensor electrodes. This allows the control of potentials of driving signals to be performed at a position close to the sensor electrodes by the sensor driving switching elements. The degree of reduction of dullness of the potentials of the driving signals therefore can be increased.

Each of the sensor electrodes can include a drive electrode to which a driving signal is input, and a detection electrode that outputs a response signal according to the driving signal. In this case, either the drive electrodes or the detection electrodes may be formed on the second substrate. This makes it possible to arrange the drive electrodes and the detection electrodes dispersedly on the first substrate and the second substrate.

The above-described sensor-equipped display device can further include pixel electrodes provided for the pixels, respectively, and common electrodes provided to be opposed to the pixel electrodes. The common electrodes can double as the sensor electrodes. This makes it possible to reduce the number of electrodes as compared with a case where the supply electrodes and the sensor electrodes are provided independently.

The line widths of the sensor lead-out lines, or the number of the sensor lead-out lines connected to one sensor electrode, may be different depending on the lengths of the sensor lead-out lines. This makes it possible to adjust the resistances of the lines according to the lengths of a plurality of the sensor lead-out lines. For example, the resistances of a plurality of the sensor lead-out lines can be made uniform.

An input device that is capable of detecting contact or approach of an object with respect to a sensor area is also one of embodiments of the present invention. The input device includes a plurality of drive electrodes arranged in the sensor area, driving signals being input to the drive electrodes; a plurality of detection electrodes that output response signals in response to the driving signals input to the drive electrodes; a control unit that controls the driving signals and receives the response signals thereby detecting contact or approach of the object; and sensor driving switching elements that are arranged in the sensor area, and control the driving signals of the drive electrodes according to the control signals supplied from the control unit.

In the above-described configuration of the input device, the potentials of the drive electrodes are controlled by the sensor driving switching elements operating according to the control signals supplied from the control unit. This makes it possible to arrange, in the sensor area, at least a part of the switching elements that compose the driving circuits that control the driving signals of the drive electrodes. This makes it possible to reduce the dullness of the potentials in the drive electrodes, as compared with a case where the potentials of the drive electrodes is controlled from outside the sensor area. Consequently, the lines can be driven at a high speed. Further, since at least a part of the switching elements of the driving circuits are arranged inside the sensor area, the frame can be narrowed, as compared with a case where all of the switching elements of the driving circuits are arranged outside the sensor area.

In the above-described input device, the sensor driving switching elements may be connected to voltage supply lines and sensor driving control lines that extend to outside of the sensor area. The voltage supply lines are lines for supplying a predetermined voltage to the sensor driving switching elements from the outside of the sensor area. The sensor driving control lines are lines for supplying a signal for controlling whether or not the predetermined voltage supplied from the voltage supply lines should be applied to the sensor electrodes. With this configuration, the potentials of the sensor electrodes are controlled by the sensor driving switching elements in the sensor area according to the signal supplied from outside the pixel area.

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

(Exemplary Configuration of Sensor-Equipped Display Device 1)

FIG. 1 is a cross-sectional view illustrating an exemplary configuration of a sensor-equipped display device 1 in Embodiment 1. The sensor-equipped display device 1 has a pixel area in which pixels are arranged, and an image is displayed on the pixel area. The pixel area can be called a display area. Further, the sensor-equipped display device 1 has a sensor area in which contact or approach of an object such as a user's finger or a pen can be detected. The sensor area can be provided at a position overlapping the pixel area.

The sensor-equipped display device 1 illustrated in FIG. 1 includes a pair of substrates opposed to each other with a liquid crystal layer LC being interposed therebetween, that is, an active matrix substrate 20a and a counter substrate 20b. The active matrix substrate 20a is an example of a first substrate, and the counter substrate 20b is an example of a second substrate. In the pixel area of the active matrix substrate 20a, there are arranged a plurality of first lines that extend in a first direction, and a plurality of second lines that extend in a second direction that is different from the first direction. Either of the first lines or the second lines can be used as source lines (data line) 15, and the others can be used as gate lines (control lines).

Though not illustrated in FIG. 1, gate lines are provided on a substrate 20 of the active matrix substrate 20a. Further, source lines 15 are formed to be insulated from the gate lines, with a gate insulating film 24 being interposed therebetween. Still further, on the active matrix substrate 20a, there are provided a plurality of pixel electrodes 17 and common electrodes 18 for applying voltages to the liquid crystal layer LC. To the pixel electrodes 17, data signals are supplied through the source lines. Each pixel electrode 17 is connected via a pixel switching element (illustration of the same is omitted in FIG. 1) to the source line and the gate line.

When data signals are written in the pixel electrodes 17, the common electrodes 18 have a uniform potential. Voltages are applied to the liquid crystal layer LC by electric fields that occur due to potential differences between the common electrodes 18 and the pixel electrodes 17. In the example illustrated in FIG. 1, the common electrodes 18 and the pixel electrodes 17 are provided on the active matrix substrate 20a. This configuration allows a liquid crystal panel of the horizontal electric field mode to be realized. In contrast, the common electrodes can be provided on the liquid crystal layer LC side of the counter substrate 20b. In this case, a liquid crystal panel of the vertical electric field mode, which drives liquid crystal due to potential differences between the pixel electrodes 17 and the common electrodes, which are opposed to each other with the liquid crystal layer LC being interposed therebetween, can be formed. It should be noted that the positional relationship between the common electrodes 18 and the pixel electrodes 17 in FIG. 1 may be opposite, that is, the common electrodes 18 may be positioned on the liquid crystal side of the pixel electrodes 17.

In the present embodiment, the common electrodes 18 double as sensor electrodes for detecting contact or approach of an object.

On the liquid crystal side of the counter substrate 20b, a color filter layer, and sensor electrodes for detecting contact or approach of an object, are provided. In the example illustrated in FIG. 1, drive electrodes DL and detection electrodes SE are provided as sensor electrodes, with an insulating layer 25 being interposed therebetween. The color filter layer is provided between the drive electrodes DL and the detection electrodes SE. In FIG. 1, a black matrix B of the color filter layer is illustrated. The drive electrodes DL can be arranged at positions overlapping the black matrix B when viewed in a direction vertical to the counter substrate 20b. Thus, the drive electrodes DL can be formed in a lattice form in accordance with the shape of the black matrix. The detection electrodes SE are arranged on the liquid crystal layer LC side of the color filter layer. The detection electrodes SE provided on the liquid crystal LC side of the counter substrate 20b can double as the common electrodes 18.

The detection electrodes SE provided on the liquid crystal layer LC side of the counter substrate 20b prevent vertical electric fields from being generated in the liquid crystal layer LC by charges on the surface of the counter substrate 20b. In other words, the detection electrodes SE function as a shield electrode layer. Further, the detection electrodes SE prevent the voltage for driving the touch panel from disarranging the alignment of the liquid crystal molecules thereby reducing the display quality. On the counter substrate 20b, the common electrodes 18 and the detection electrodes SE may be provided independently, without doubling.

Figure 2:
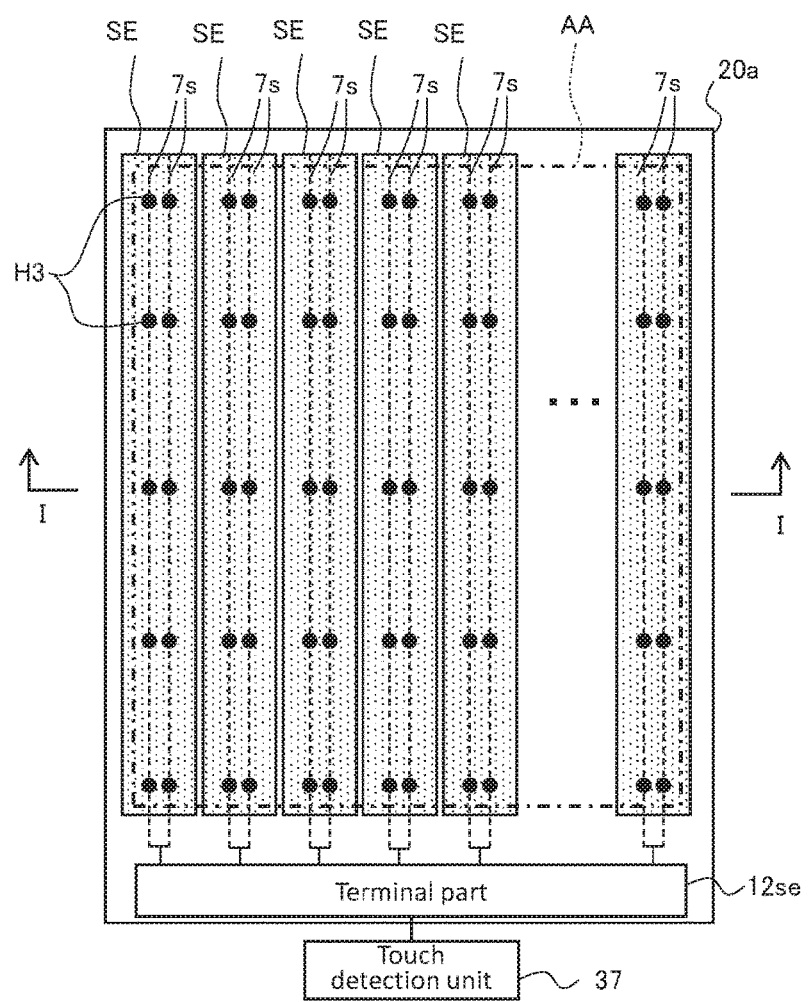
FIG. 2 is a plan view illustrating an exemplary arrangement of sensor electrodes on an active matrix substrate 20a in the sensor-equipped display device 1 illustrated in FIG. 1.

FIG. 2 is a plan view illustrating an exemplary arrangement of the sensor electrodes on the active matrix substrate 20a of the sensor-equipped display device 1 illustrated in FIG. 1. FIG. 1 is a cross-sectional view of FIG. 2 taken along line I-I. In the example illustrated in FIG. 2, a plurality of the detection electrodes SE that extend in a first direction (in the vertical direction in the present example) are arrayed in a second direction (in the horizontal direction in the present example). The plurality of detection electrodes SE are arranged at positions overlapping the pixel area AA.

These detection electrodes SE are formed with the common electrode 18 divided into a plurality of portions. In other words, the common electrode 18 includes a plurality of common electrode portions, and these common electrode portions double as a plurality of detection electrodes SE.

In an area that overlaps these detection electrodes SE, sensor lead-out lines 7 are formed to extend in the same direction as the detection electrodes SE. The sensor lead-out lines 7 are formed in the same layer as the source lines 15, and are provided in parallel with the source lines 15. The sensor lead-out lines 7 are connected to the detection electrodes SE via contact holes H3. By arranging the sensor lead-out lines 7 along the detection electrodes SE in this way, resistances of the detection electrodes SE can be decreased. This makes it possible to improve performance of the touch panel (for example, achieving high SNR, or high report rate). Further, the sensor lead-out lines 7 can be formed, for example, inside light-shielding sections of the black matrix B of the counter substrate 20b. This makes it possible to reduce resistances of the detection electrodes SE, without reducing the aperture ratio. Further, this also makes it possible to achieve the reduction of resistance of the common electrode for display.

For example, the detection electrodes SE can be formed with transparent electrodes made of ITO or the like, and the sensor lead-out lines 7s can be formed with a metal having a resistance lower than that of the transparent electrodes. This makes the effects of the reduction of the resistance more noticeable.

In the example illustrated in FIG. 2, a plurality of (two) sensor lead-out lines 7s are provided per one detection electrode SE. For example, according to a required resistance value, the number or the line width of the sensor lead-out lines 7s can be adjusted.

The plurality of detection electrodes SE are connected to a terminal part 12se provided on an edge parallel to the second direction of the pixel area AA. The terminal part 12se is connected to a touch detection unit 37. The touch detection unit 37 detects contact or approach of an object, based on signals received from the detection electrodes SE.

Figure 3:
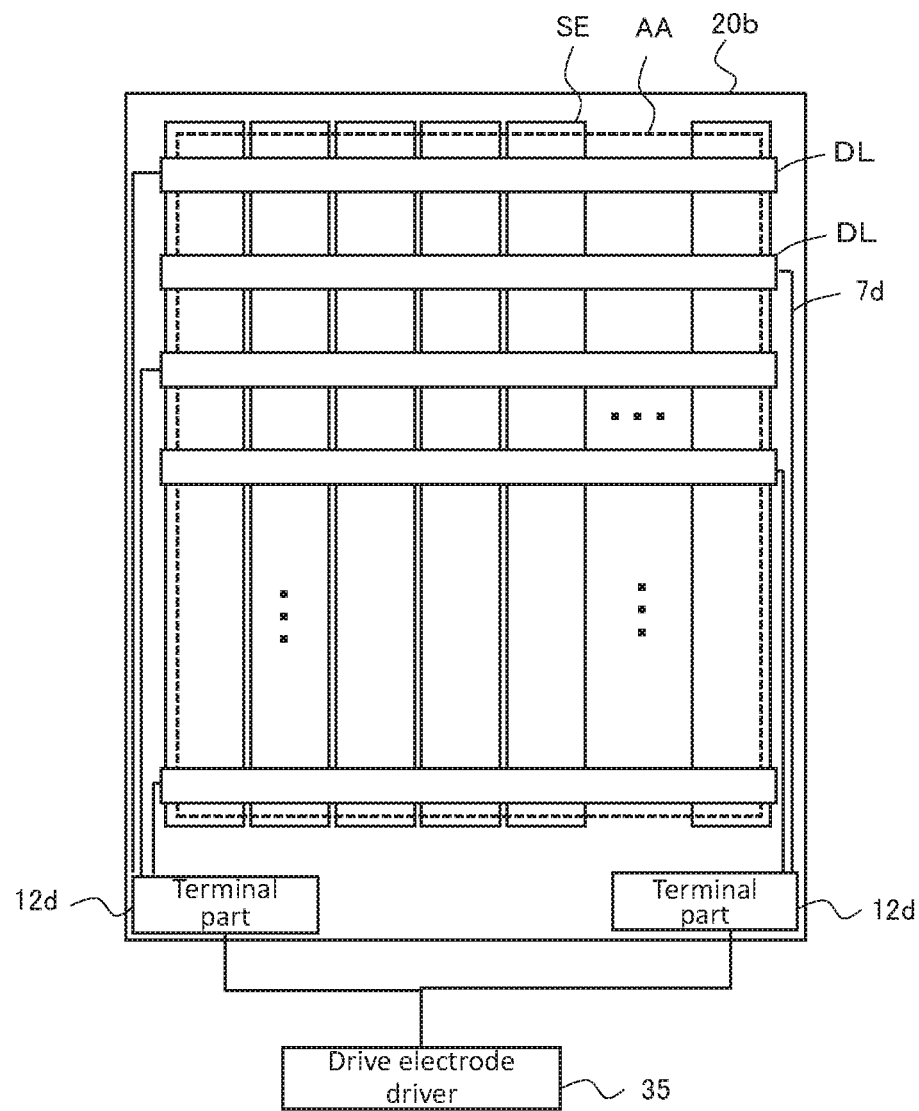
FIG. 3 is a plan view illustrating an exemplary arrangement of sensor electrodes on a counter substrate 20b in the sensor-equipped display device 1 illustrated in FIG. 1.

FIG. 3 is a plan view of an exemplary arrangement of the sensor electrodes on the counter substrate 20b of the sensor-equipped display device 1 illustrated in FIG. 1. On the counter substrate 20b, a plurality of detection electrodes SE extending in the first direction (vertical direction) are arrayed in the second direction. Drive electrodes DL extending in the second direction to intersect with these are arrayed in the first direction.

The detection electrodes SE on the counter substrate 20b extend in parallel to the detection electrodes SE on the active matrix substrate 20a. In other words, the common electrode 18 on the counter substrate 20b is divided into a plurality of portions that extend in parallel to the common electrode 18 on the counter substrate 20b. The common electrode 18 on the counter substrate 20b has a plurality of common electrode portions. Each of the plurality of common electrode portions on the counter substrate 20b is electrically connected with one of the common electrode portions on the active matrix substrate 20a. For example, these can be connected through a seal contact (not shown) provided between the active matrix substrate 20a and the counter substrate 20b. In this way, the common electrode portions of the active matrix substrate 20a and the common electrode portions of the counter substrate 20b are connected, and are used as detection electrodes, whereby parasitic capacitances accompanying the detection electrodes can be reduced.

The detection electrodes, however, are not necessarily provided on both of the active matrix substrate 20a and the counter substrate 20b. The detection electrodes may be provided on either one of these.

The drive electrodes DL are connected to the terminal part 12d via the sensor lead-out lines 7d provided outside the pixel area AA. The terminal part 23d is connected to the drive electrode driver 35. The drive electrode driver 35 controls driving signals.

When the sensor-equipped display device 1 performs a detection operation, driving signals are supplied from the drive electrode driver 35 to each drive electrode DL. In a portion where the drive electrode DL and the detection electrode SE are opposed to each other, an electrostatic capacitance is formed. When the drive electrode driver 35 supplies a driving signal to the drive electrode DL, capacitive coupling between the drive electrode DL and the detection electrode SE causes a response signal corresponding to the driving signal to be output from the detection electrode SE. The touch detection unit 37 is capable of detecting, based on the response signal, a change in the capacitance at a point (node) corresponding to the point of intersection between the drive electrode DL and the detection electrode SE. The touch detection unit 37 can specify the position of the object that is in contact or is approaching, based on the change in the capacitance.

(Modification Example 1 of Configuration)

Figure 4:
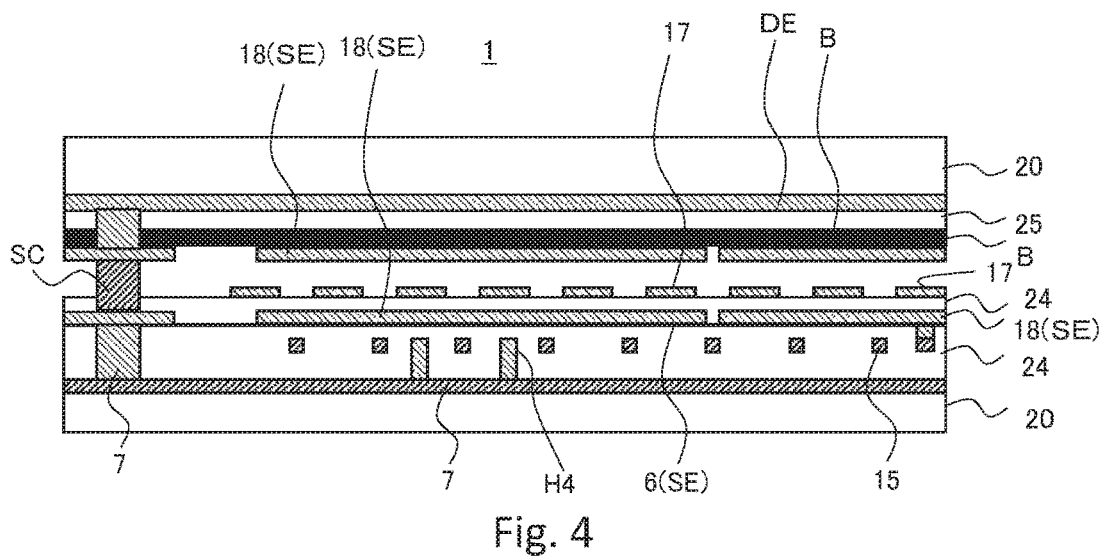
FIG. 4 is a cross-sectional view illustrating a modification example of the configuration of the sensor-equipped display device 1.
Figure 5:
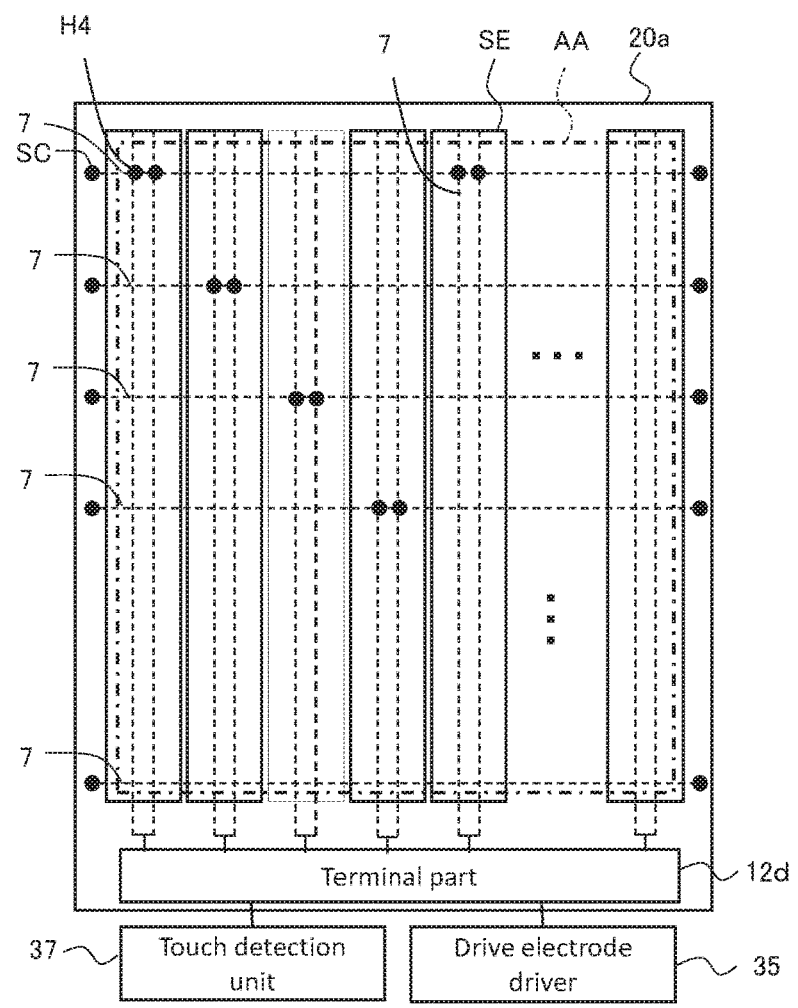
FIG. 5 is a plan view illustrating an exemplary configuration of the sensor electrodes and the sensor lead-out lines on the active matrix substrate 20a in the sensor-equipped display device 1 illustrated in FIG. 4.

FIG. 4 is a cross-sectional view illustrating a modification example of the configuration of the sensor-equipped display device 1. FIG. 5 is a plan view illustrating an exemplary configuration of the sensor electrodes and the sensor lead-out lines on the active matrix substrate 20a of the sensor-equipped display device 1 illustrated in FIG. 4. In the example illustrated in FIGS. 4 and 5, the sensor lead-out lines of the sensor electrodes provided on the counter substrate 20b are provided in the pixel area AA of the active matrix substrate 20a.

More specifically, the sensor lead-out lines 7 that are formed in the same layer as the source lines 15 and extend in the first direction from the terminal part 12d, pass through the contact holes H4, thereby going to a different layer; here, as one example, the sensor lead-out lines 7 go to the same layer as the layer where the gate lines are provided (gate electrode layer). In the gate electrode layer, the sensor lead-out lines 7 extend from the contact holes H4 in the second direction, are led through an edge parallel to the first direction of the pixel area AA to outside the pixel area AA, and are connected to the seal contact SC. The sensor lead-out lines 7 are connected by the seal contact SC to the drive electrodes DL on the counter substrate 20b. The seal contact SC is a sealing member that is provided between the active matrix substrate 20a and the counter substrate 20b, and electrically connects the sensor lead-out lines 7 provided on the active matrix substrate 20a with the drive electrodes DL (sensor electrodes) provided on the counter substrate 20b.

The sensor lead-out lines 7 extending in the first direction, and the sensor lead-out lines extending in the second direction, are formed in different layers in the active matrix substrate 20a, respectively. These are connected via contact holes. This provides connection of the lines through the pixel area, from the edges parallel to the first direction of the pixel area AA, to the edges thereof parallel to the second direction. Thus, line layout between edges of the pixel area AA that are not parallel to each other can be achieved without lines being provided outside the pixel area AA.

(Modification Example 2 of Configuration)

Figure 6:
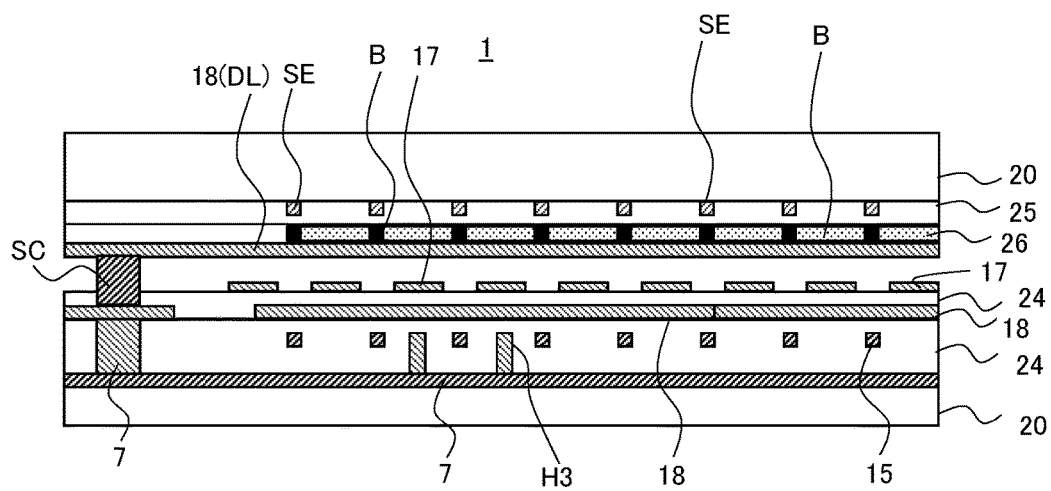
FIG. 6 is a cross-sectional view illustrating another modification example of the configuration of the sensor-equipped display device 1.
Figure 7:
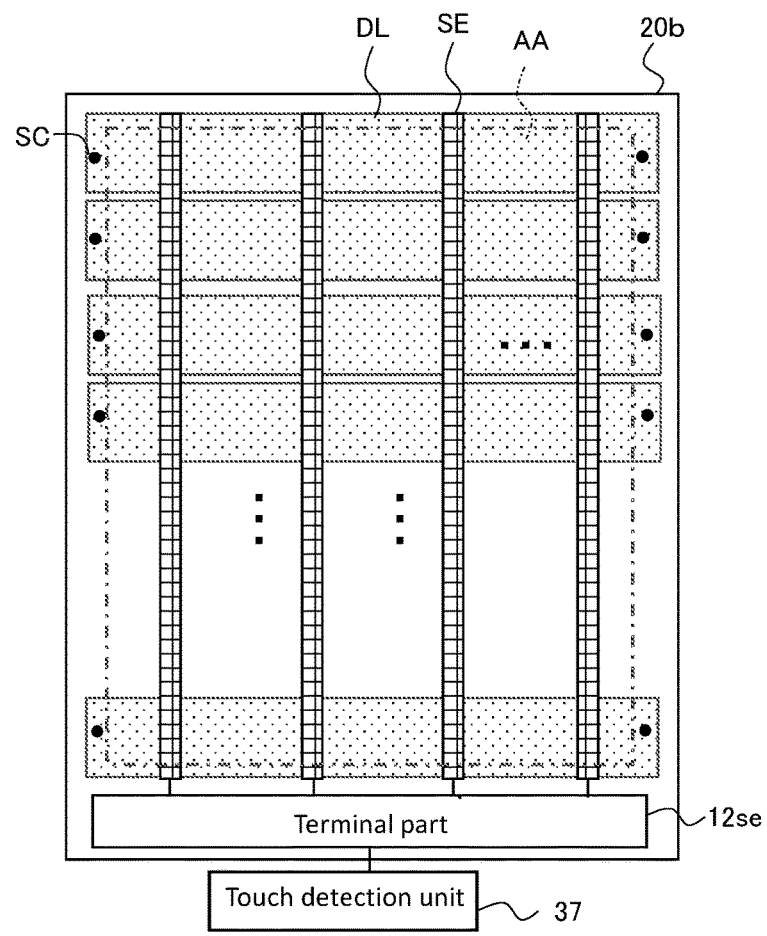
FIG. 7 is a plan view illustrating an exemplary configuration of the sensor electrodes and the sensor lead-out lines on the active matrix substrate 20a in the sensor-equipped display device 1 illustrated in FIG. 6.
Figure 8:
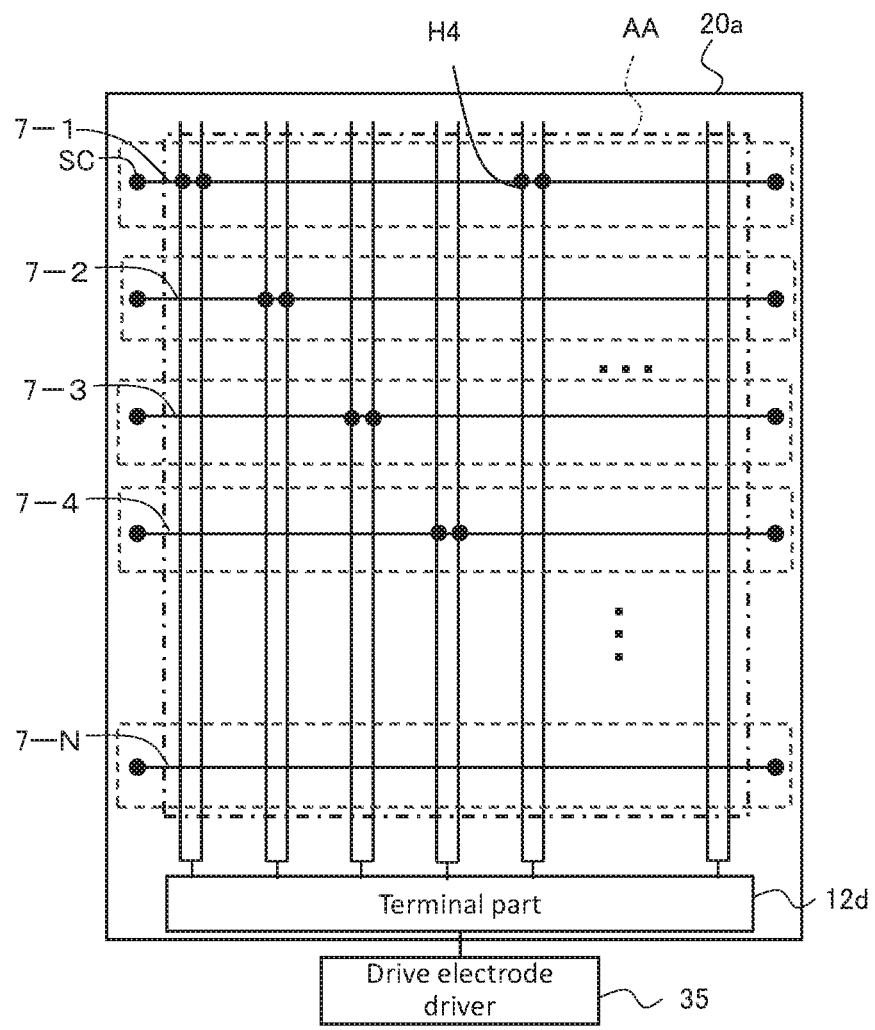
FIG. 8 is a plan view illustrating an exemplary configuration of the sensor electrodes and the sensor lead-out lines on the counter substrate 20b in the sensor-equipped display device 1 illustrated in FIG. 6.

FIG. 6 is a cross-sectional view illustrating another modification example of the configuration of the sensor-equipped display device 1. FIG. 7 is a plan view illustrating an exemplary configuration of the sensor electrodes and the sensor lead-out lines on the counter substrate 20b of the sensor-equipped display device 1 illustrated in FIG. 6. FIG. 8 is a plan view illustrating an exemplary configuration of the sensor lead-out lines on the active matrix substrate 20a of the sensor-equipped display device 1 illustrated in FIG. 6.

In the modification example illustrated in FIGS. 6 and 7, common electrodes 18 that double as the drive electrodes DL are provided on the liquid crystal layer LC side of the counter substrate 20b. The detection electrodes SE are provided, with a color filter layer 26 and an insulating layer 25 being interposed between the same and drive electrodes DL. The detection electrodes SE are provided at positions that overlap the black matrix B. On the active matrix substrate 20a, no sensor electrode is provided. The common electrode 18 on the active matrix substrate 20a is not divided into a plurality of portions, since the same does not double as the sensor electrodes.

On the active matrix substrate 20a, the sensor lead-out lines 7 connected to the drive electrodes DL of the counter substrate 20b are provided. The configuration of the sensor lead-out lines 7 on the active matrix substrate 20a may be similar to that illustrated in FIG. 5.

(Modification Example of Sensor Lead-Out Lines)

The number of the sensor lead-out lines connected to one sensor electrode may be varied according to the length of the sensor lead-out line. For example, in the example illustrated in FIG. 8, to the sensor lead-out line 7-1 in the horizontal direction, at the greatest distance from the terminal part 12d, four sensor lead-out lines in the vertical direction are connected. In this way, in a case where some sensor lead-out lines are longer than the others, the number of sensor lead-out lines connected for one sensor electrode can be increased as compared with the others.

This makes it possible to reduce influences occurring in a case where resistances or parasitic capacitances of a plurality of sensor electrodes are different due to differences in the lengths of the sensor lead-out lines. Further, to achieve this effect, the line widths of the sensor lead-out lines may be varied according to differences in the lengths of the sensor lead-out lines.

(Exemplary Layout of Lines)

Figure 9:
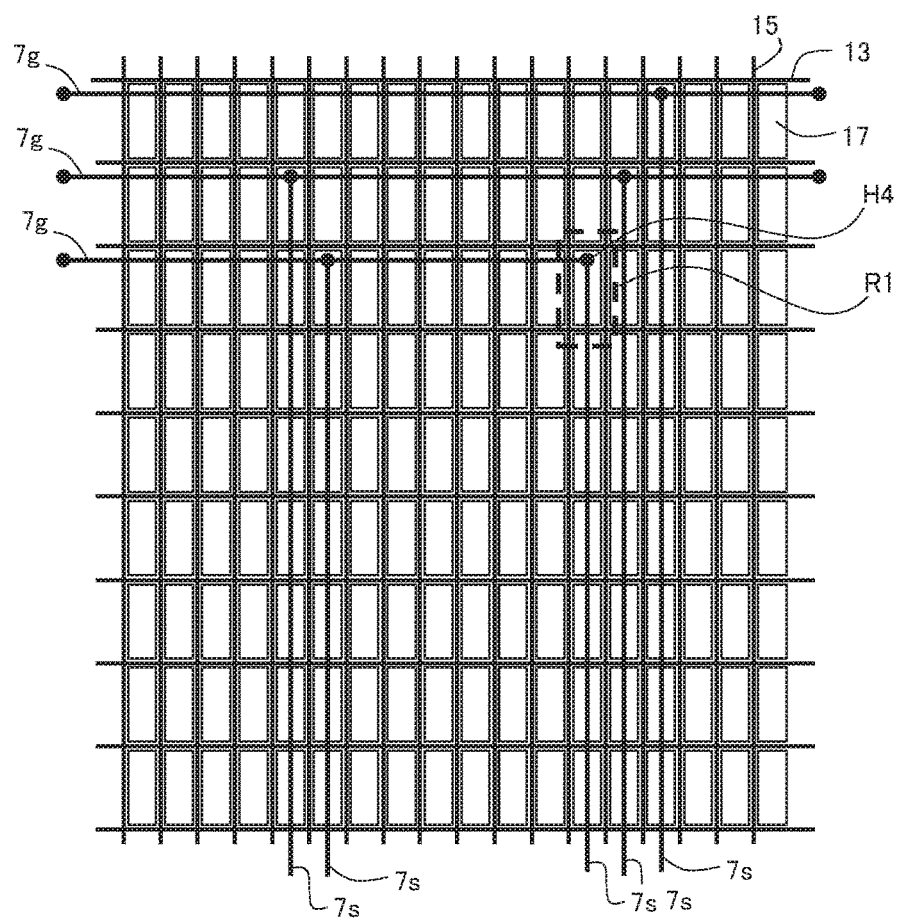
FIG. 9 is a plan view illustrating one example of sensor lead-out lines 7, gate lines 13, and source lines 15.
Figure 10:
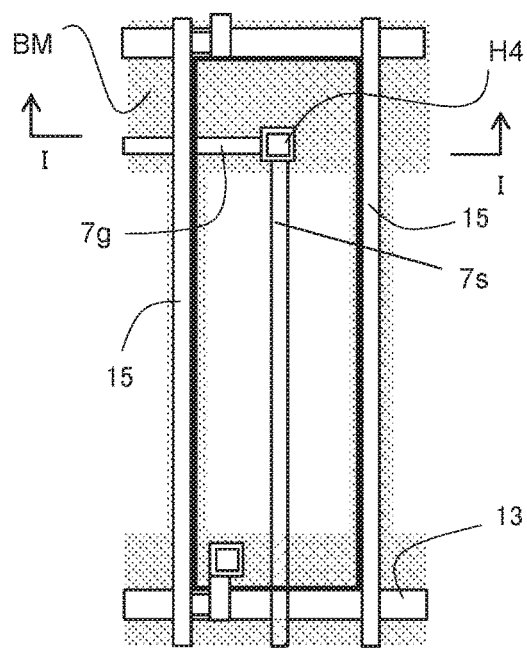
FIG. 10 is an enlarged view of the area R1 illustrated in FIG. 9.
Figure 11:
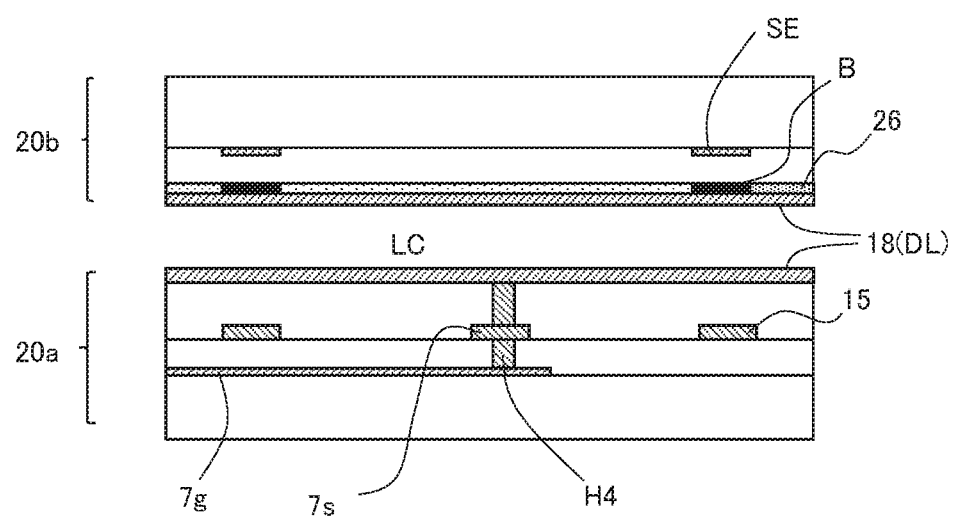
FIG. 11 is a cross-sectional view of the configuration illustrated in FIG. 10 taken along line I-I.

FIG. 9 is a plan view illustrating one example of the sensor lead-out lines 7, the gate lines 13, and the source lines 15. FIG. 10 is an enlarged view of the area R1 illustrated in FIG. 9. FIG. 11 is a cross-sectional view of the configuration illustrated in FIG. 10 taken along line I-I. In the example illustrated in FIG. 9, a plurality of the source lines 15 extending in the first direction (vertical direction), and a plurality of the gate lines extending in the second direction (horizontal direction) vertical to the first direction are arranged so as to intersect with each other. In an area surrounded by the gate lines 13 and the source lines 15, a pixel electrode 17 is arranged. Pixels corresponding to the points of intersection between the source lines 15 and the gate lines 13 are arranged in matrix.

The sensor lead-out lines 7s parallel to the source lines 15 and the sensor lead-out lines 7g parallel to the gate lines 13 are provided to overlap the pixel electrodes 17. In FIG. 9, the sensor lead-out lines 7g, 7s are arranged to overlap a part of the pixels, among all of the pixels in the pixel area. The pixels overlapped by the sensor lead-out lines 7g, 7s might have lower aperture ratios (transmittances) than the other pixels, which causes reductions in the display quality. Then, dummy lines may be arranged in pixels where no sensor lead-out line 7g or 7s is provided so that the plurality of pixels in the pixel area have uniform aperture ratios. Alternatively, as is to be described below, driving switching elements that form driving circuits of the gate driver can be arranged in the pixel area. In this case, these lines can be arranged so that the pixels overlapped by the control signal lines connected to the driving switching elements and the pixels overlapped by the sensor lead-out lines are different. This makes it possible to make the aperture ratios (transmittances) uniform in the pixel area.

As illustrated in FIG. 11, the sensor lead-out lines 7g parallel to the gate lines 13 can be formed in the same layer as the gate lines 13. Further, the sensor lead-out lines 7s parallel to the source lines 15 can be formed in the same layer as the source lines 15. The sensor lead-out lines 7g formed in the same layer as the gate lines, and the sensor lead-out lines 7s formed in the same layer as the source lines can be connected via the contact holes H4. The contact hole H4 can be arranged in, for example, a shielding area BM formed by the black matrix B, as illustrated in FIG. 10. This prevents reductions in the transmittance caused by the contact hole H4. Further, as illustrated in FIG. 11, the sensor lead-out lines 7s and the common electrodes 18 doubling as the drive electrodes DL can be connected through the contact holes H4.

Embodiment 2

Embodiment 2 is a modification example of the display panel 2. In the display panel 2 according to the present embodiment, at least a part of the driving circuits for driving the gate lines and the source lines is formed in the pixel area.

(Configuration of Liquid Crystal Display Device)

Figure 12:
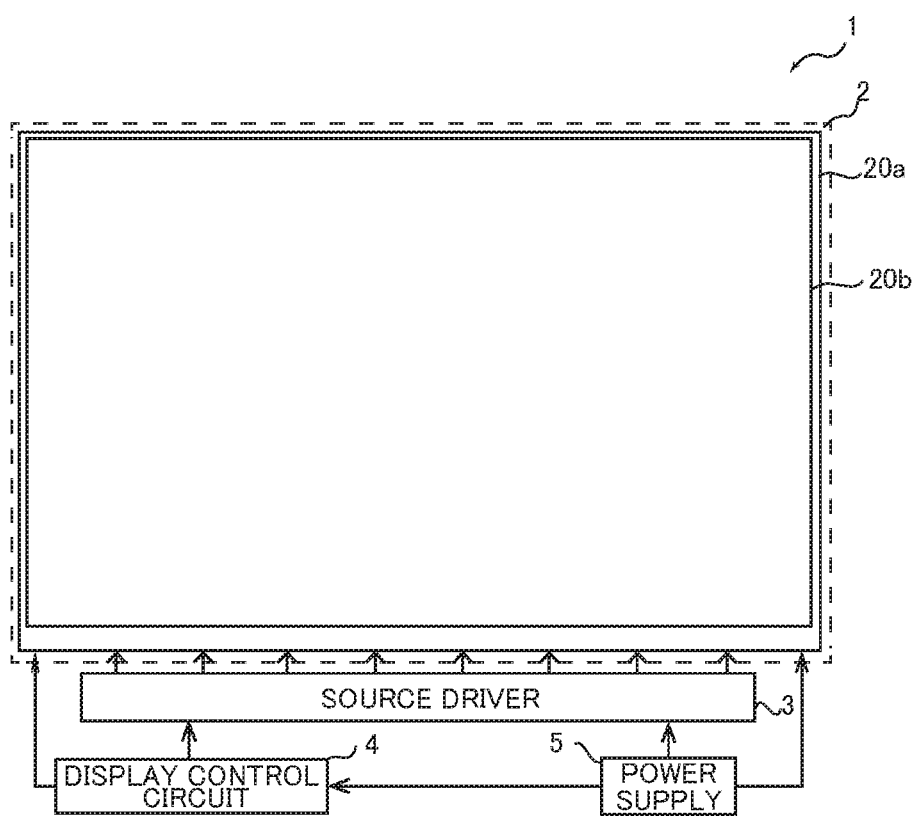
FIG. 12 is a top view illustrating a schematic configuration of a liquid crystal display device according to the present embodiment.

FIG. 12 is a top view illustrating a schematic configuration of a liquid crystal display device according to the present embodiment. The liquid crystal display device 1 includes a display panel 2, a source driver 3, a display control circuit 4, and a power source 5. The display panel 2 includes an active matrix substrate 20a, a counter substrate 20b, and a liquid crystal layer (not shown) interposed between these substrates. Though illustration is omitted in FIG. 12, polarizing plates are provided on a lower surface of the active matrix substrate 20a, and on a top surface of the counter substrate 20b. On the counter substrate 20b, there are formed a black matrix, color filters of three colors of red (R), green (G), and blue (B), and a common electrode (all are not shown).

As illustrated in FIG. 12, the active matrix substrate 20a is electrically connected with the source driver 3 formed on the flexible substrate. The display control circuit 4 is electrically connected with the display panel 2, the source driver 3, and the power source 5. The display control circuit 4 outputs control signals to the source driver 3, and driving circuits formed on the active matrix substrate 20a (hereinafter referred to as gate drivers), which are to be described below. The control signals include a reset signal (CLR), clock signals (CKA, CKB), data signals and the like used for displaying images on the display panel 2. The power source 5 is electrically connected with the display panel 2, the source driver 3, and the display control circuit 4, and supplies a power source voltage signal to each of the same.

(Configuration of Active Matrix Substrate)

Figure 13:
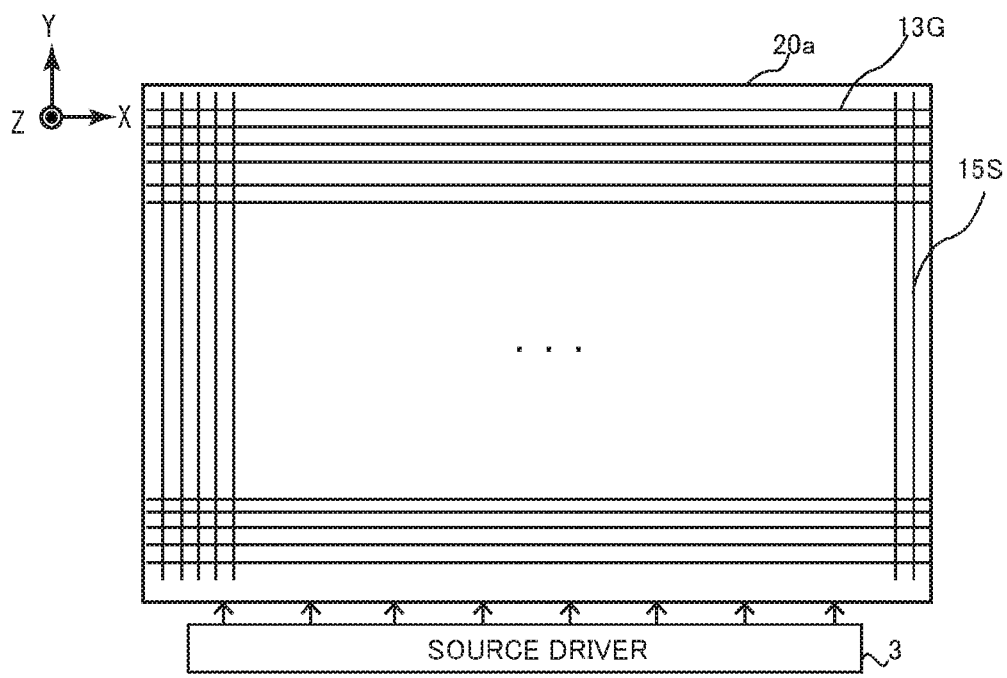

FIG. 13 is a top view illustrating a schematic configuration of the active matrix substrate 20a. On the active matrix substrate 20a, a plurality of gate lines 13G are formed from one end to the other end in the X-axis direction at uniform intervals in approximately parallel. Further, on the active matrix substrate 20a, a plurality of source lines 15S (data lines) are formed to intersect with the group of the gate lines 13G. Each area surrounded by the gate lines 13G and the source lines 15S forms one pixel. Each pixel corresponds to any one of the colors of the color filters.

Figure 14:
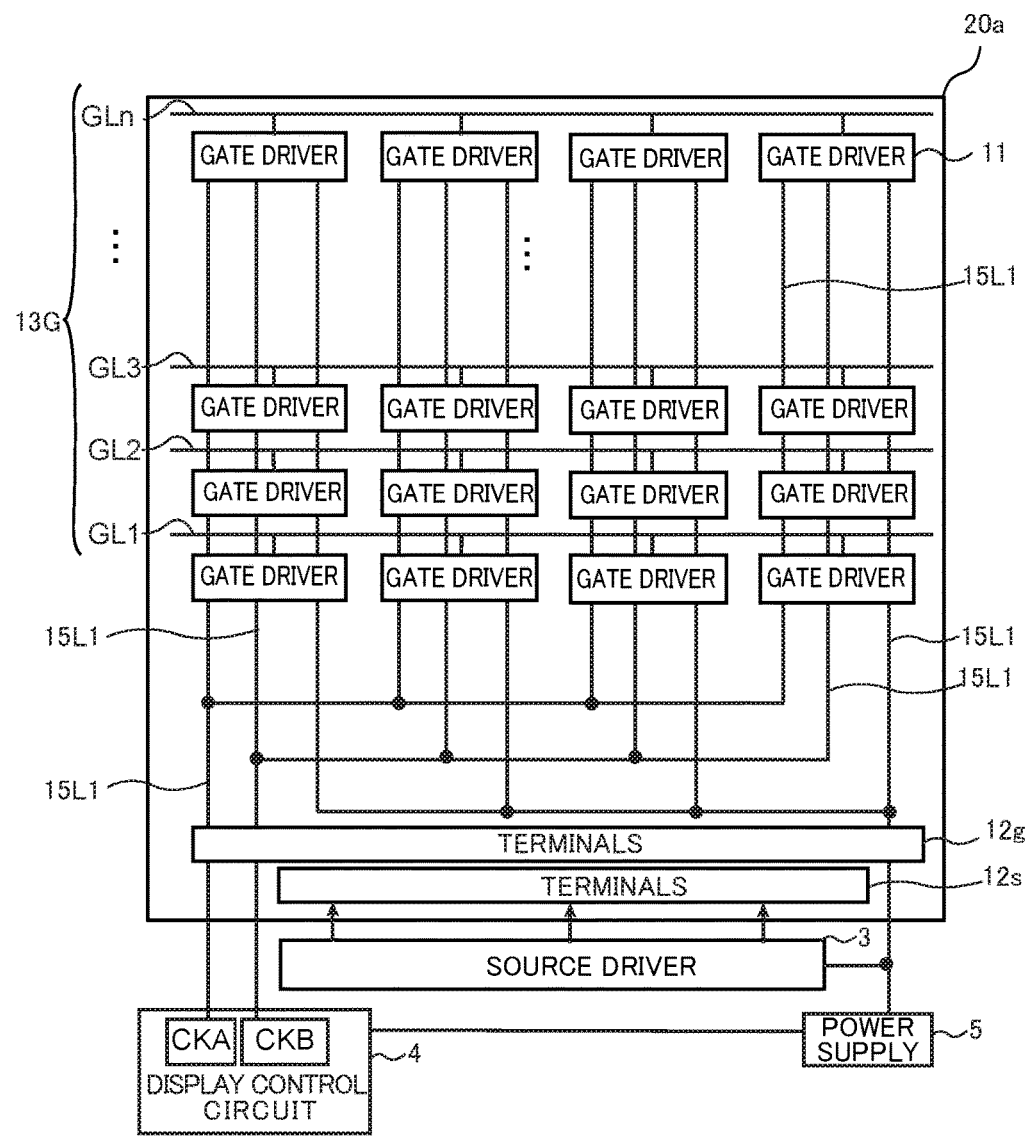
FIG. 14 is a top view illustrating a schematic configuration of the active matrix substrate 20a, and each part connected to the active matrix substrate 20a, with the illustration of the source lines 15S being omitted.

FIG. 14 is a top view illustrating a schematic configuration of the active matrix substrate 20a, and each part connected to the active matrix substrate 20a, with the illustration of the source lines 15S being omitted. As illustrated in the example of FIG. 14, the gate driver 11 (driving circuit) is formed between the gate line 13G and the gate line 13G in the display area. In this example, four gate drivers 11 are connected to each of the gate lines 13G. In a frame area on an edge where the source driver 3 is provided, of the display area of the active matrix substrate 20a, a terminal part 12g (second terminal part) is formed. The terminal part 12g is connected with the control circuit 4 and the power source 5. The terminal part 12g receives signals such as control signals (CKA, CKB) and a power source voltage signal that are output from the control circuit 4 and the power source 5. The signals such as the control signals (CKA, CKB) and the power source voltage signal input to the terminal part 12g are supplied through the line 15L1 to each gate driver 11. The gate driver 11 outputs a voltage signal indicating either one of a selected state and a non-selected state to the gate line 13G connected thereto, according to the signal supplied thereto, and outputs the voltage signal to the gate line 13G on the next stage (the subsequent row). In the following description, voltage signals corresponding to the selected state and the non-selected state are referred to as scanning signals in some cases. Further, the state where the gate line 13G is selected is referred to as "driving of the gate line 13G".

Further, on the active matrix substrate 20a, in a frame area on an edge where the source driver 3 is provided, a terminal part 12g (first terminal part) is formed that connects the source driver 3 and the source lines 15S. The source driver 3 outputs data signals to the source lines 15S, according to control signals input from the display control circuit 4.

As illustrated in FIG. 14, in the present embodiment, a plurality of the gate drivers 11 are connected to the gate lines 13G of GL(1) to GL(n) in the display area. The gate drivers 11 connected to the identical gate line 13G are in synchronization, and one gate line 13G is simultaneously driven by scanning signals output from these gate drivers 11. In the present embodiment, a plurality of the gate drivers 11 are connected at approximately equal intervals to one gate line 13G, in such a manner that a load on one gate driver 11 for driving the gate line 13G should be approximately equal.
(Configuration of Gate Driver)

Figure 15:
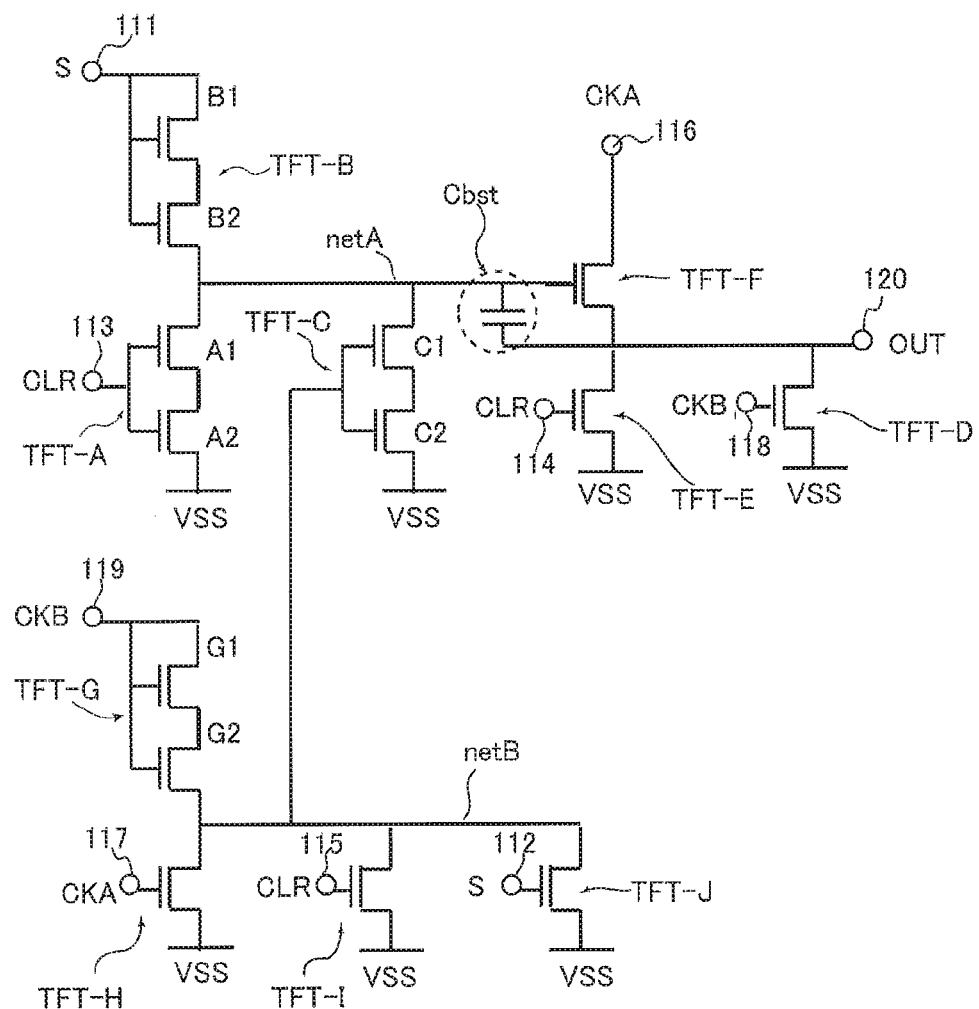
FIG. 15 illustrates an exemplary equivalent circuit of a gate driver 11 that is arranged between gate lines 13G of GL(n−1) and GL(n−2), and drives the gate line 13G of GL(n−1).

Here, the configuration of the gate driver 11 according to the present embodiment is described. FIG. 15 illustrates an exemplary equivalent circuit of the gate driver 11 that is arranged between the gate lines 13G of GL(n–1) and GL(n–2), and drives the gate line 13G of GL(n–1). As illustrated in FIG. 15, the gate driver 11 includes TFTs-A to -J formed with thin film transistors (TFT) as switching elements, a capacitor Cbst, terminals 111 to 120, and a terminal group to which a low-level power source voltage signal is input.

The terminals 111, 112 receive set signals (S) via the gate line 13G of GL(n–2) of the previous stage. It should be noted that the terminals 111, 112 of the gate driver 11 connected to the gate line 13G of GL(1) receive a gate start pulse signal (S) output from the display control circuit 4. The terminals 113 to 115 receive a reset signal (CLR) output from the display control circuit 4. The terminals 116, 117 receive the clock signal (CKA) input thereto. The terminals 118, 119 receive the clock signal (CKB) input thereto. The terminal 120 outputs the set signal (OUT) to a gate line 13G of the subsequent stage.

Figure 20:
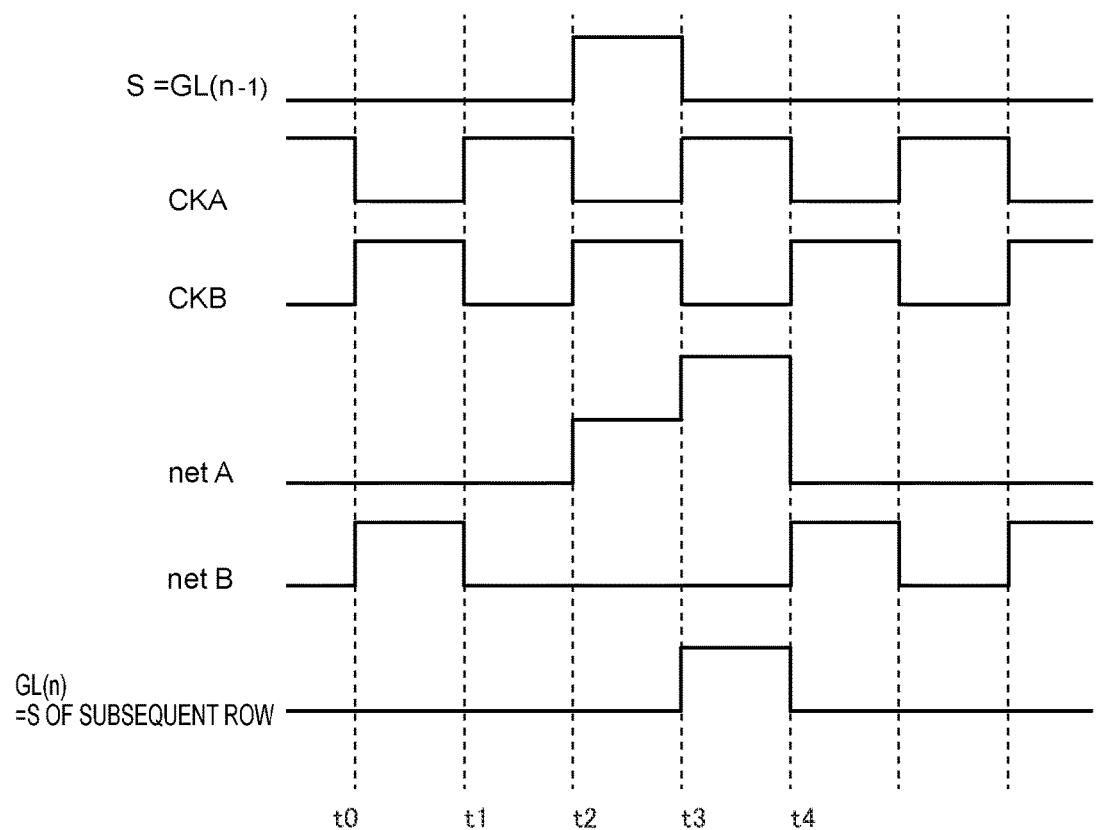
FIG. 20 is a timing chart when a gate driver 11 scans the gate lines 13G.

The clock signal (CKA) and the clock signal (CKB) are two-phase clock signals having phases that are inverted every horizontal scanning period (see FIG. 20). FIG. 15 illustrates an example of the gate driver 11 that drives the gate line 13G of GL(n–1), but in the case of the gate driver 11 of the subsequent stage that drives the gate line 13G of GL(n), the terminals 116, 117 thereof receive the clock signal (CKB), and the terminals 118, 119 of the gate driver 11 receive the clock signal (CKA). In other words, the terminals 116 and 117 as well as the terminals 118 and 119 of each gate driver 11 receive clock signals having phases opposite to those of the clock signals that the gate driver 11 of the adjacent row receives.

In FIG. 15, a line to which the source terminal of the TFT-B, the drain terminal of the TFT-A, the source terminal of the TFT-C, one of the electrodes of the capacitor Cbst, and the gate terminal of the TFT-F are connected is referred to as "netA". A line to which the gate terminal of the TFT-C, the source terminal of the TFT-G, the drain terminal of the TFT-H, the source terminal of the TFT-I, and the source terminal of the TFT-J are connected is referred to as "netB".

The TFT-A is formed with two TFTs (A1, A2) connected in series. Each gate terminal of the TFT-A is connected with the terminal 113, the drain terminal of TFT-A1 is connected with netA, and the source terminal of the TFT-A2 is connected to a power source voltage terminal VSS.

The TFT-B is formed with two TFTs (B1, B2) connected in series. Each gate terminal of the TFT-B and the drain terminal of the TFT-B1 are connected with the terminal 111 (diode connection), and the source terminal of the TFT-B2 is connected to netA.

The TFT-C is formed with two TFTs (C1, C2) connected in series. Each gate terminal of the TFT-C is connected with netB, the drain terminal of the TFT-C1 is connected with netA, and the source terminal of the TFT-C2 is connected to the power source voltage terminal VSS.

Regarding the capacitor Cbst, one of electrodes thereof is connected with netA, and the other electrode thereof is connected with the terminal 120.

Regarding the TFT-D, the gate terminal thereof is connected with the terminal 118, the drain terminal thereof is connected with the terminal 120, and the source terminal thereof is connected to the power source voltage terminal VSS.

Regarding the TFT-E, the gate terminal thereof is connected with the terminal 114, the drain terminal thereof is connected with the terminal 120, and the source terminal thereof is connected to the power source voltage terminal VSS.

Regarding the TFT-F, the gate terminal thereof is connected with netA, the drain terminal thereof is connected with the terminal 116, and the source terminal thereof is connected with the output terminal 120.

The TFT-G includes two TFTs (G1, G2) connected in series. Each gate terminal of the TFT-G and the drain terminal of the TFT-G1 are connected with the terminal 119 (diode connection), and the source terminal of the TFT-G2 is connected to netB.

Regarding the TFT-H, the gate terminal thereof is connected with the terminal 117, the drain terminal thereof is connected with netB, and the source terminal thereof is connected to the power source voltage terminal VSS.

Regarding the TFT-I, the gate terminal thereof is connected with the terminal 115, the drain terminal thereof is connected with netB, and the source terminal thereof is connected to the power source voltage terminal VSS.

Regarding the TFT-J, the gate terminal thereof is connected with the terminal 112, the drain terminal thereof is connected with netB, and the source terminal thereof is connected to the power source voltage terminal VSS.

In FIG. 15, an example is illustrated in which each of the TFTs-A, B, C, and G are formed with two TFTs connected in series, but it may be formed with one TFT.

(Overall Layout of Gate Driver)

Figure 16A:
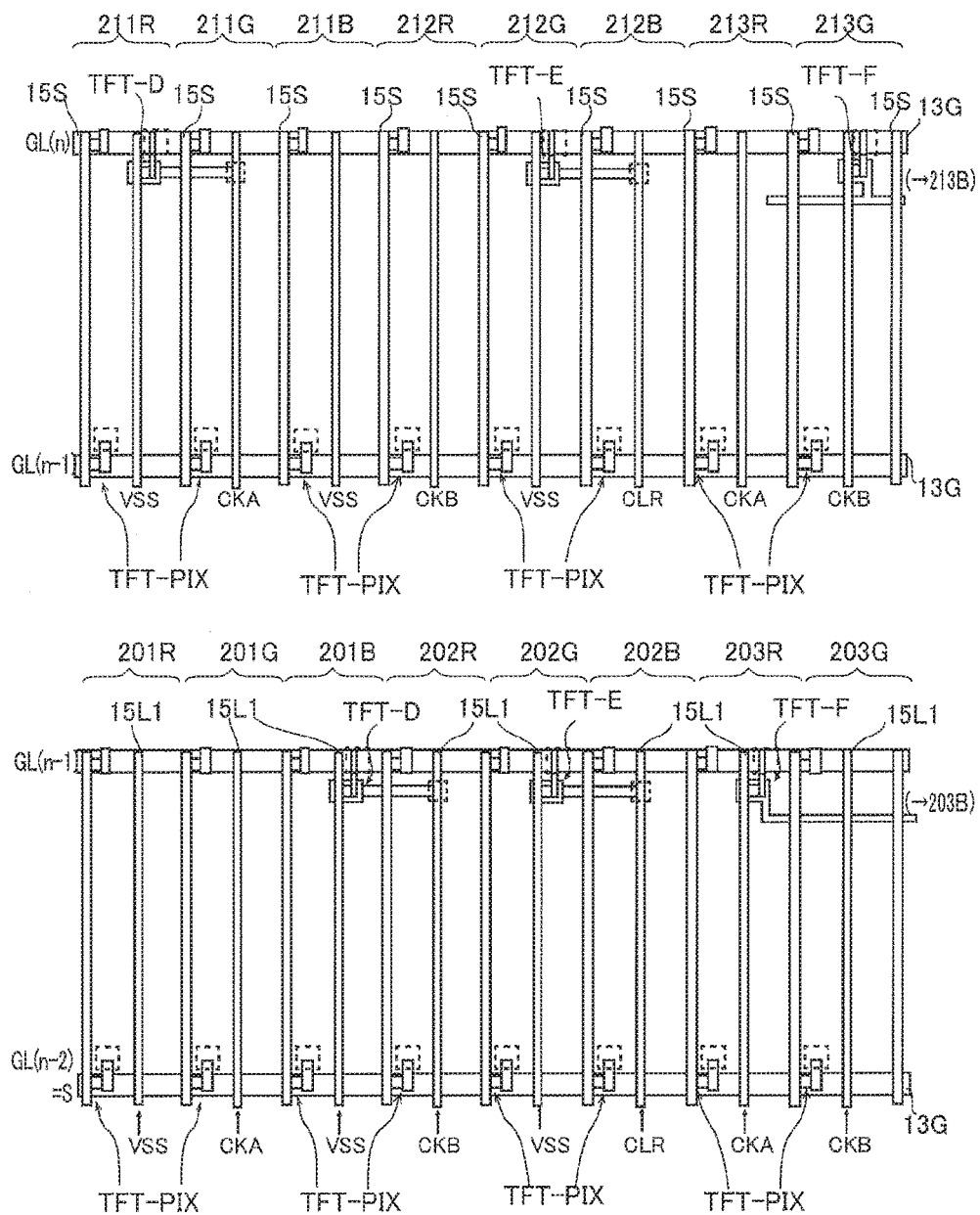
FIG. 16A illustrates an exemplary arrangement of the gate drivers 11.
Figure 16B:
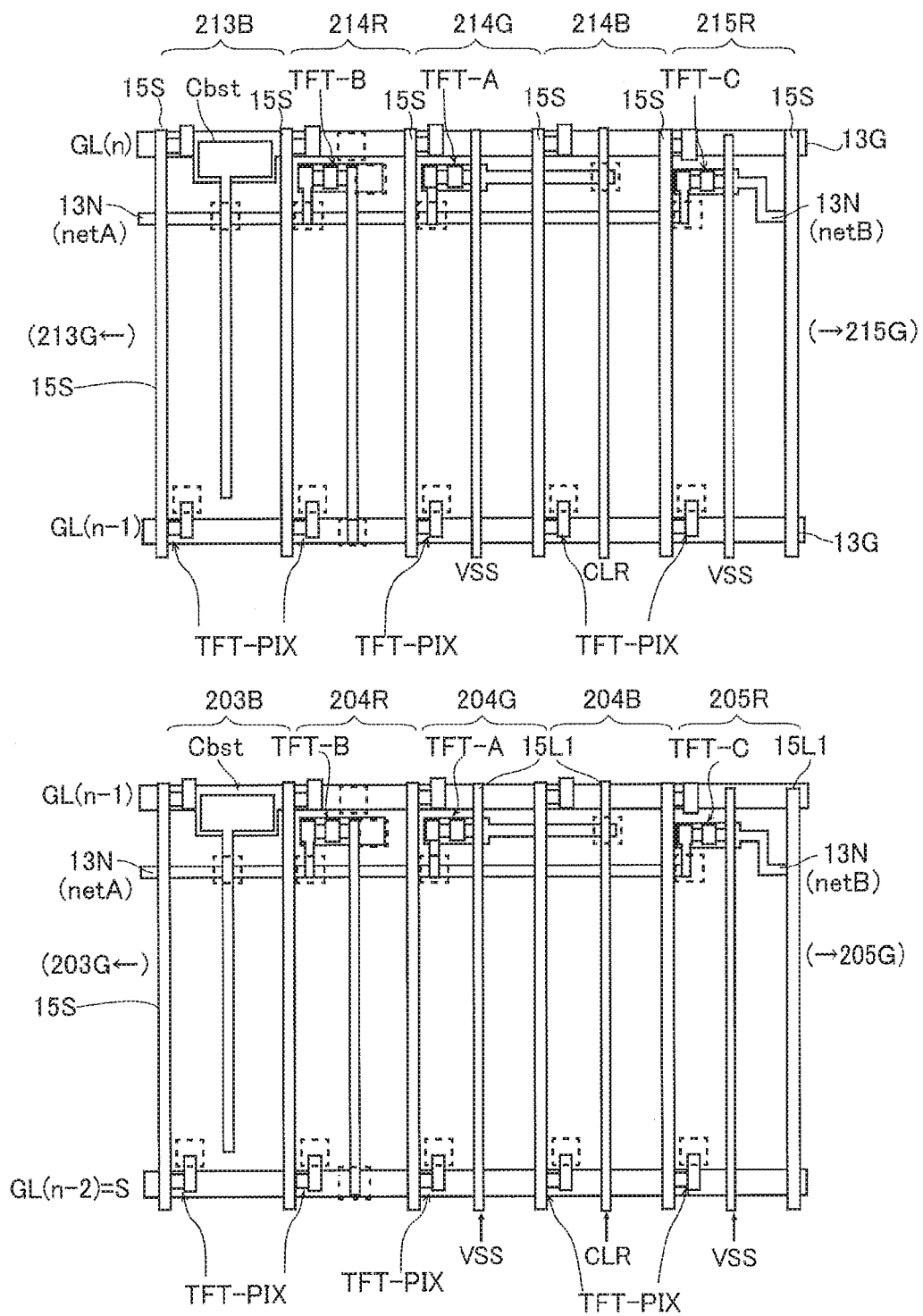
FIG. 16B illustrates an exemplary arrangement of the gate drivers 11.
Figure 16C:
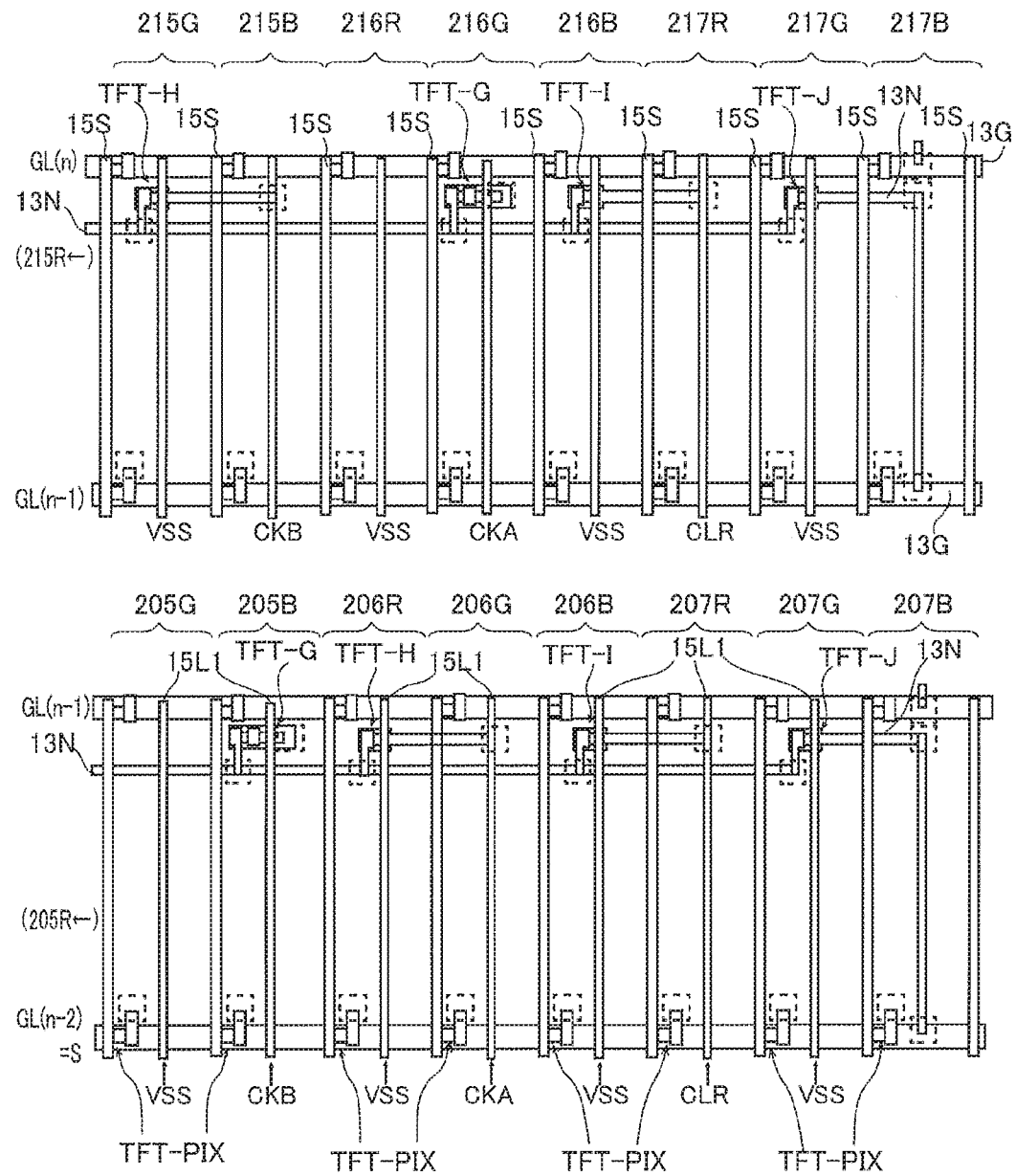
FIG. 16C illustrates an exemplary arrangement of the gate drivers 11.

Next, the arrangement of respective elements of the gate driver 11 in the display area is described. FIGS. 16A to 16C illustrate an example of arrangement of one gate driver 11 provided between GL(n) and GL(n−1), and between GL(n−1) and GL(n−2). In FIGS. 16A to 16C, for convenience sake, pixel regions 211R to 217B between GL(n) and GL(n−1), and pixel regions 201R to 207B between GL(n−1) and GL(n−2), are illustrated as being separate from each other, but actually they overlap each other at the gate line 13G of GL(n−1), whereby the upper and lower pixel regions are continuous. It should be noted that "R", "G", and "B" included in the reference symbols that indicate the pixel regions indicate the colors of a color filter (not shown) formed on the counter substrate 20b.

As illustrated in FIGS. 16A to 16C, in pixel regions 211R to 217B (hereinafter referred to as "upper pixel regions") and pixel regions 201R to 207B (hereinafter referred to as "lower pixel regions"), TFTs (hereinafter referred to as "TFTs-PIX") (pixel switching elements) for displaying images are formed in vicinities of intersections between the source lines 15S and the gate lines 13G.

Besides, in the upper pixel region and the lower pixel region, elements (the TFT-A to TFT-J, and the capacitor Cbst) composing one gate driver 11 are distributedly arranged. Among these pixel regions, in a pixel region where the switching elements receiving any signal among the clock signals (CKA, CKB), the reset signal (CLR), and the power source voltage signal (the TFTs-A, C to F, H to J) are arranged, lines 15L1 for supplying these signals are formed. The lines 15L1 are formed over the upper pixel region and the lower pixel region so as to be approximately parallel with the source lines 15S. Further, in the upper pixel region and the lower pixel region, the lines 13N of netA and netB are formed. The lines 13N are formed over pixel regions in which elements (the TFTs-A to C, F, G to J, and the capacitor Cbst) that are connected to netA and netB are arranged, so as to be approximately parallel with the gate lines 13G in the upper pixel region and the lower pixel region.

In the present embodiment, the TFT-D, the TFT-F, the TFT-H, and the TFT-G, among the gate driver 11, are arranged so that the clock signals supplied thereto have phases opposite to the clock signals supplied to these TFTs of the gate driver 11 of the adjacent row, respectively. In other words, the TFT-D, the TFT-F, the TFT-H, and the TFT-G are arranged in pixel regions displaced in the horizontal direction with respect to pixel regions where these TFTs of the adjacent row are formed.

More specifically, as illustrated in FIG. 16A, while the TFT-D in the upper pixel region is formed in the pixel regions 211R and 211G, the TFT-D in the lower pixel region is formed in the pixel regions 201B and 202R. While the TFT-F in the upper pixel region is formed in the pixel region 213G, the TFT-F in the lower pixel region is formed in the pixel region 203R. Further, as illustrated in FIG. 16C, while the TFT-H in the upper pixel region is formed in the pixel regions 215G and 215B, the TFT-H in the lower pixel region is formed in the pixel regions 206R and 206G. While the TFT-G in the upper pixel region is formed in the pixel region 216G, the TFT-G in the lower pixel region is formed in the pixel region 205B. With this configuration, the clock signal (CKA) is supplied to the TFT-D in the upper pixel region, and the clock signal (CKB) having a phase opposite to that of the clock signal (CKA) is supplied to the TFT-D in the lower pixel region. Regarding the TFT-G and the TFT-H as well, clock signals having opposite phases (CKA or CKB) are supplied to the upper pixel region and the lower pixel region, respectively, as illustrated in FIGS. 16A and 16C.

Further, the TFT-B and TFT-J in the upper pixel region are connected to the gate line 13G of GL(n−1), and the TFT-B and the TFT-J in the lower pixel region are connected to the gate line 13G of GL(n−2). The TFT-D and the TFT-F in the upper pixel region are connected to the gate line 13G of GL(n), and the TFT-D and TFT-F in the lower pixel region are connected to the gate line 13G of GL(n−1). The gate driver 11 arranged in the lower pixel region receive the set signal (S) via the gate line 13G of GL(n−2), and outputs the set signal (S) to the gate line 13G of GL(n), thereby driving the gate line 13G of GL(n−1). The gate driver 11 arranged in the upper pixel region receives the set signal (S) via the gate line 13G of GL(n−1), outputs the set signal (S) to the gate line 13G of GL(n+1), thereby driving the gate line 13G of GL(n).

Figure 17:
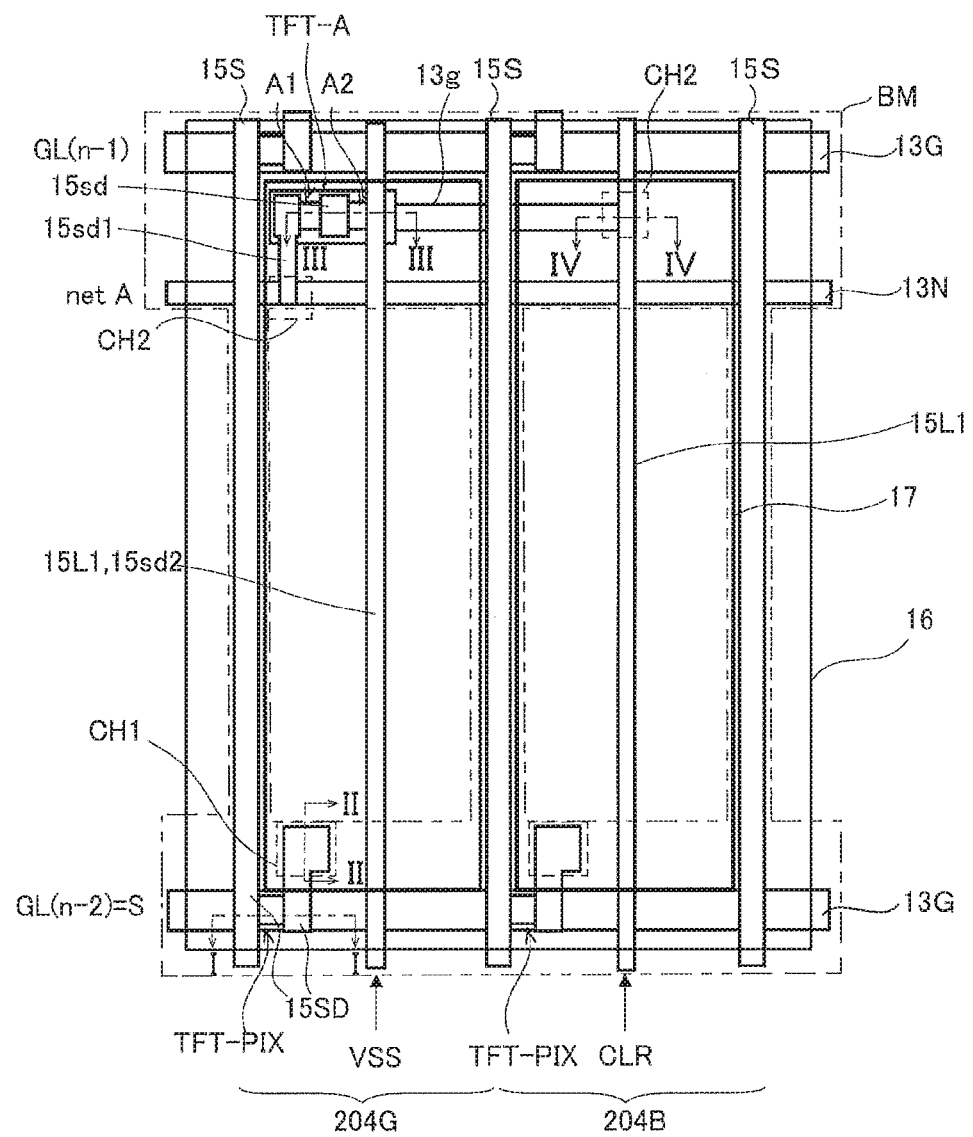
FIG. 17 is an enlarged plan view illustrating a portion of pixel regions 204G and 204B where the TFT-A illustrated in FIG. 16B is formed.

Next, a specific method of connecting the elements composing the gate driver 11 is described. FIG. 17 is an enlarged plan view illustrating portions of the pixel regions 204G and 204B in which the TFT-A illustrated in FIG. 16B is formed. Since the TFT-A and the TFTs-H, I, J are formed using two pixel regions and a common connection method is used, the description is made with reference to the TFT-A. In FIG. 17, the region BM indicated by the alternate long and two short dashed lines is a region that is light-shielded by the black matrix (not illustrated) formed on the counter substrate 20b (hereinafter referred to as a "light-shielded region BM"). The light-shielded region BM includes regions where the gate lines 13G, the elements composing the gate drivers 11, and the source lines 15S are formed.

As illustrated in FIG. 17, in the vicinities of intersections between the gate lines 13G and the source lines 15S, TFTs-PIX for image display are formed. The TFT-PIX and the pixel electrode 17 are connected at a contact portion CH1. Further, in each pixel region, the line 15L1 is formed so as to be approximately parallel with the source line 15S and to intersect the gate line 13G. To the line 15L1 in the pixel region 204G, the power source voltage signal (VSS) is supplied, and to the line 15L1 in the pixel region 204B, the reset signal (CLR) is supplied.

As illustrated in FIG. 17, the gate terminal 13g of the TFT-A is formed from the pixel region 204B to the pixel region 204G. In the pixel regions 204G and 204B, the source line 15S and the line 15L1 intersect, and the line 13N is formed so as to be approximately parallel with the gate line 13G. The line 13N is the above-mentioned line of netA and netB. The TFT-A is connected with the line 15L1 at a contact portion CH2 of the pixel region 204B, and is connected with the line 13N at a contact portion CH2 of the pixel region 204G. Further, in the present embodiment, a shielding layer 16 is formed between the pixel electrodes 17 on one hand, and the TFTs-A, the lines 13N, and the lines 15L1 on the other hand.

Figure 18A:
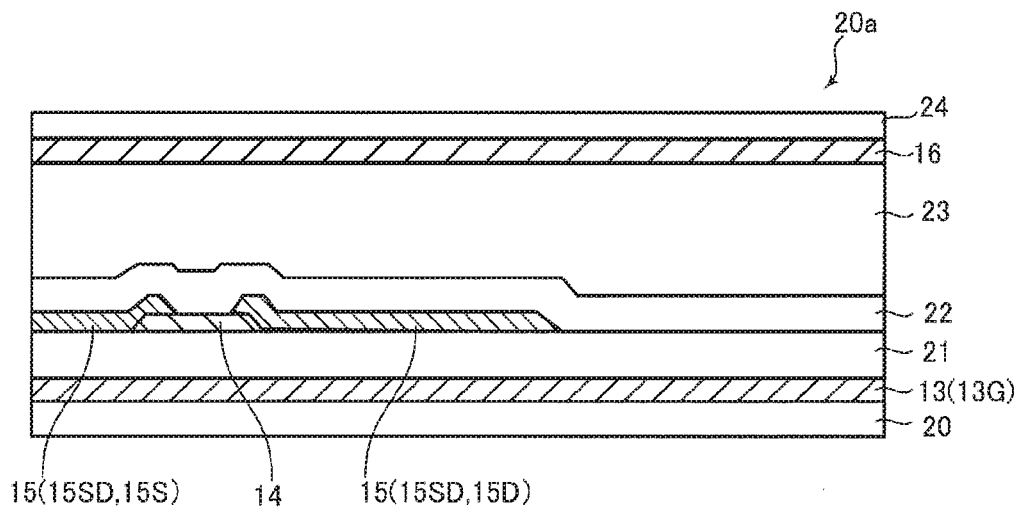
FIG. 18A is a cross-sectional view illustrating the portion of the TFT-PIX in FIG. 17 taken along line I-I.
Figure 18B:
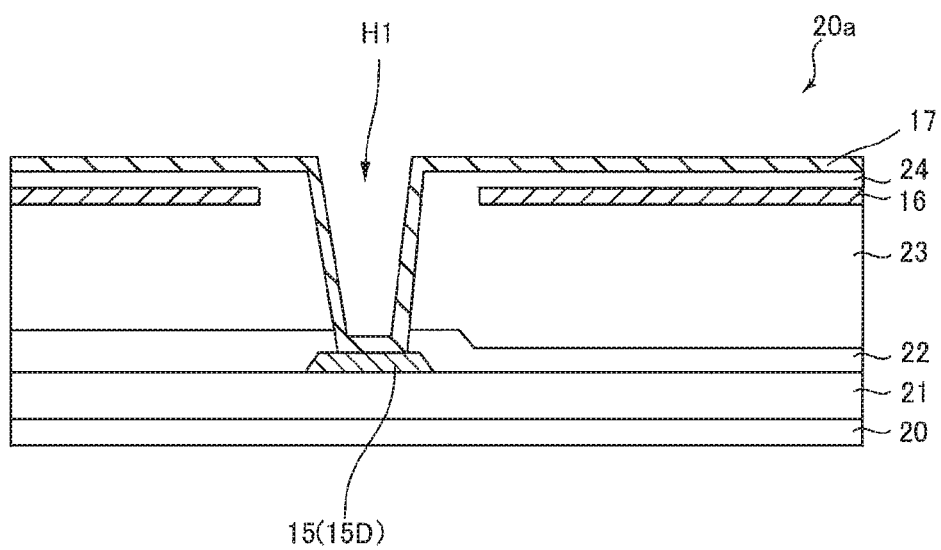
FIG. 18B is a cross-sectional view illustrating a contact portion CH1 taken along line II-II.

Here, a cross-sectional view of the portion of the TFT-PIX in FIG. 17, taken along the line I-I, is illustrated in FIG. 18A, and a cross-sectional view of the contact portion CH1, taken along a line II-II, is illustrated in FIG. 18B. Further, a cross-sectional view of the portion of the TFT-A in FIG. 17, taken along the line III-III, is illustrated in FIG. 18C, and a cross-sectional view of the contact portion CH2, taken along the line IV-IV, is illustrated in FIG. 18D.

Figure 18C:
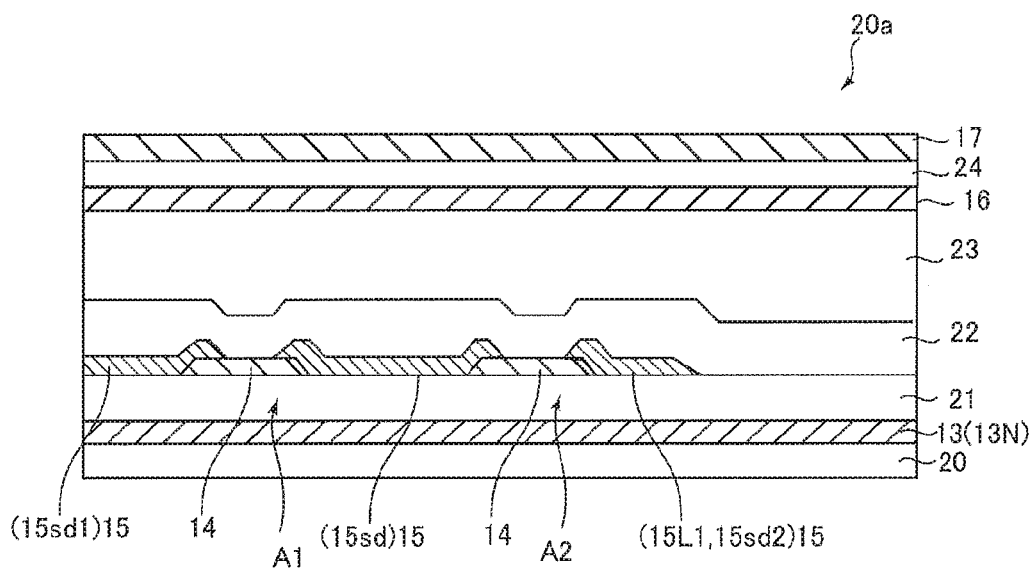
FIG. 18C is a cross-sectional view illustrating a portion of the TFT-A in FIG. 17 taken along line III-III.
Figure 18D:
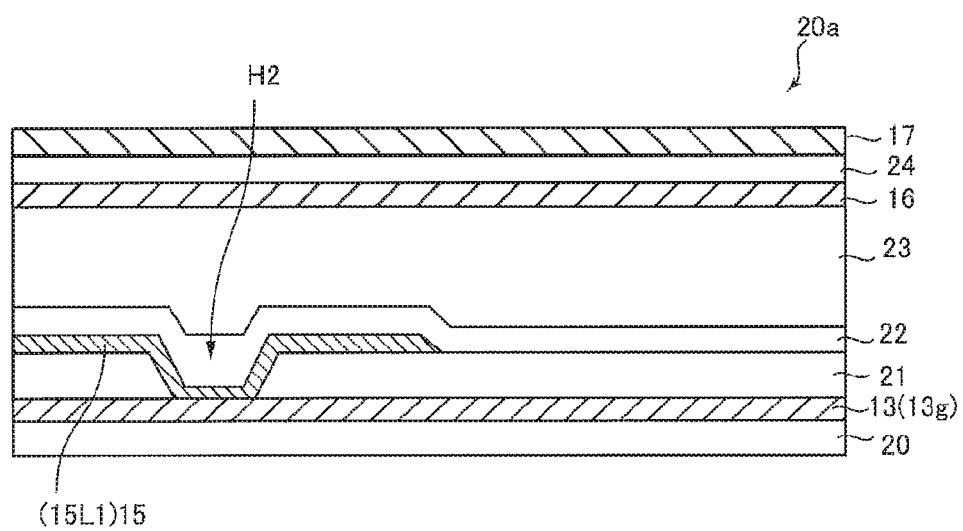
FIG. 18D is a cross-sectional view illustrating a contact portion CH2 taken along line IV-IV.

As illustrated in FIGS. 18A, 18C, and 18D, the gate line layer 13 is formed on the substrate 20, whereby the gate lines 13G, the gate terminals 13g of the TFTs-A, and the lines 13N are formed. As illustrated in FIGS. 18A and 18C, in a layer above the gate line layer 13, in portions where the TFTs-PIX are formed and in portions where the TFTs-A are formed, a semiconductor layer 14 made of an oxide semiconductor is formed, with a gate insulating film 21 being interposed therebetween. Besides, on the substrate 20 on which the semiconductor layer 14 is formed, source line layers 15 are formed so as to be separated from each other above the semiconductor layer 14. With this, as illustrated in FIGS. 18A to 18C, the source lines 15S, source-drain terminals 15SD of the TFTs-PIX, source-drain terminals 15sd (including the source-drain terminals 15sd1, 15sd2) of the TFTs-A, and the lines 15L1 are simultaneously formed.

As illustrated in FIG. 18D, at the contact portion CH2 in the pixel region 204B, a contact hole H2 is formed in the gate insulating film 21 so as to pass therethrough to the surface of the gate layer 13. The source line layer 15 (15L1) is formed on the gate insulating film 21 so as to be in contact with the gate line layer 13 (13g) at the contact hole H2. This causes the gate terminal 13g of the TFT-A and the line 15L1 to be connected at the contact portion CH2 in the pixel region 204B. Further, at the contact portion CH2 in the pixel region 204G as well, similarly, the drain terminal 15sd1 on the A1 side of the TFT-A formed with the source line layer 15, and the line 13N formed with the gate line layer 13 are connected. With this, the TFT-A is connected with netA, and the reset signal (CLR) is supplied via the line 15L1.

Further, as illustrated in FIGS. 18A to 18D, above the source line layer 15, a protection film 22 And a protection film 23 are laminated so as to cover the source line layer 15. The protection film 22 is formed with an inorganic insulating film made of, for example, SiO2. The protection film 23 is formed with an organic insulating film such as, for example, a positive-type photosensitive resin film. Further, as illustrated in FIGS. 18A to 18D, a shielding layer 16 is formed above the protection film 23. The shielding layer 16 is formed with, for example, a transparent conductive film made of, for example, ITO. Above the shielding layer 16, an interlayer insulating film 24 is formed, which is formed with an inorganic insulating film made of, for example, SiO2. Above the interlayer insulating film 24, as illustrated in FIGS. 18C and 18D, a pixel electrode 17 is formed, which is formed with a transparent conductive film made of ITO or the like.

As illustrated in FIG. 18B, at the contact portion CH1, above the drain terminal 15D of the TFT-PIX, a contact hole H1 is formed that passes through the interlayer insulating film 24, the shielding layer 16, and the protection films 22, 23. The pixel electrode 17 is formed above the interlayer insulating film 24 so as to be in contact with the drain terminal 15D at the contact hole H1. With the shielding layer 16 thus formed, a capacitor Cs is formed between the pixel electrode 17 and the shielding layer 16, and the capacitor Cs allows the potential of the pixel electrode 17 to be stabilized.

In this way, the TFT-A, as well as the line 13N and the line 15L1 that are connected with the TFT-A are formed over two pixel regions, which suppresses the reduction of the aperture ratio, as compared with the case where these are formed in one pixel region. Besides, as the shielding layer 16 is formed between the pixel electrodes 17 on one hand and the TFTs-A, the lines 13N, and the lines 15L1 on the other hand, interference between the TFTs-A and the like and the pixel electrodes 17 can be reduced.

(TFT-B)

Figure 19A:
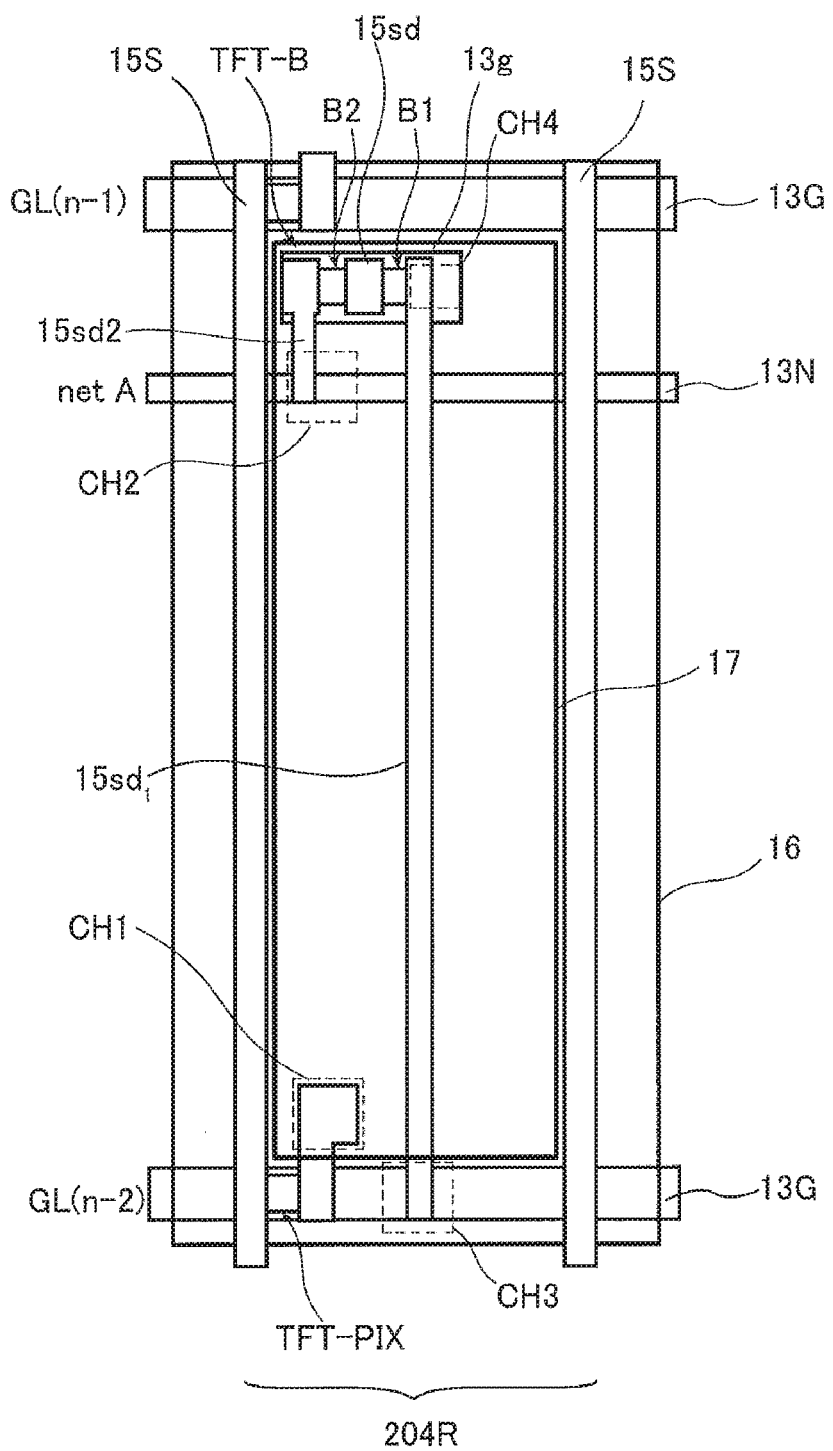
FIG. 19A is an enlarged plan view of the pixel region 204R illustrated in FIG. 16B.

Next, the connection of the TFT-B is described. FIG. 19A is an enlarged plan view illustrating the pixel region 204R illustrated in FIG. 16B. In FIG. 19, the illustration of the light-shielded region BM is omitted. As illustrated in FIG. 19A, the in the pixel region 204R, as is the case with the pixel region 204G described above, the TFT-PIX and the pixel electrode 17 are connected with each other at the contact portion CH1. Further, the source-drain terminals 15sd (including the terminals 15sd1, 15sd2) of the TFT-B are formed with the source line layer 15. With the gate line layer 13, the gate terminal 13g of the TFT-B, the gate line 13G of GL(n−2), and the line 13N are formed.

The drain terminal 15sd1 on the B1 side is formed so as to intersect the gate line 13G of GL(n−2) and the line 13N. At each of the contact portions CH3 and CH4, as is the case with the contact portion CH2 mentioned above, a contact hole H2 for connecting the gate line layer 13 and the source line layer 15 is formed in the gate insulating film 21.

The drain terminal 15sd1 is connected with the gate line 13G of GL(n−2) at the contact portion CH3, and is connected with the gate terminal 13g at the contact portion CH4. Further, the source terminal 15sd2 on the B2 side is connected with the line 13N at the contact portion CH2. With this, the TFT-B is connected to netA, and receives the set signal (S) via the gate line 13G of GL(n−2).

(TFT-C)

Figure 19B:
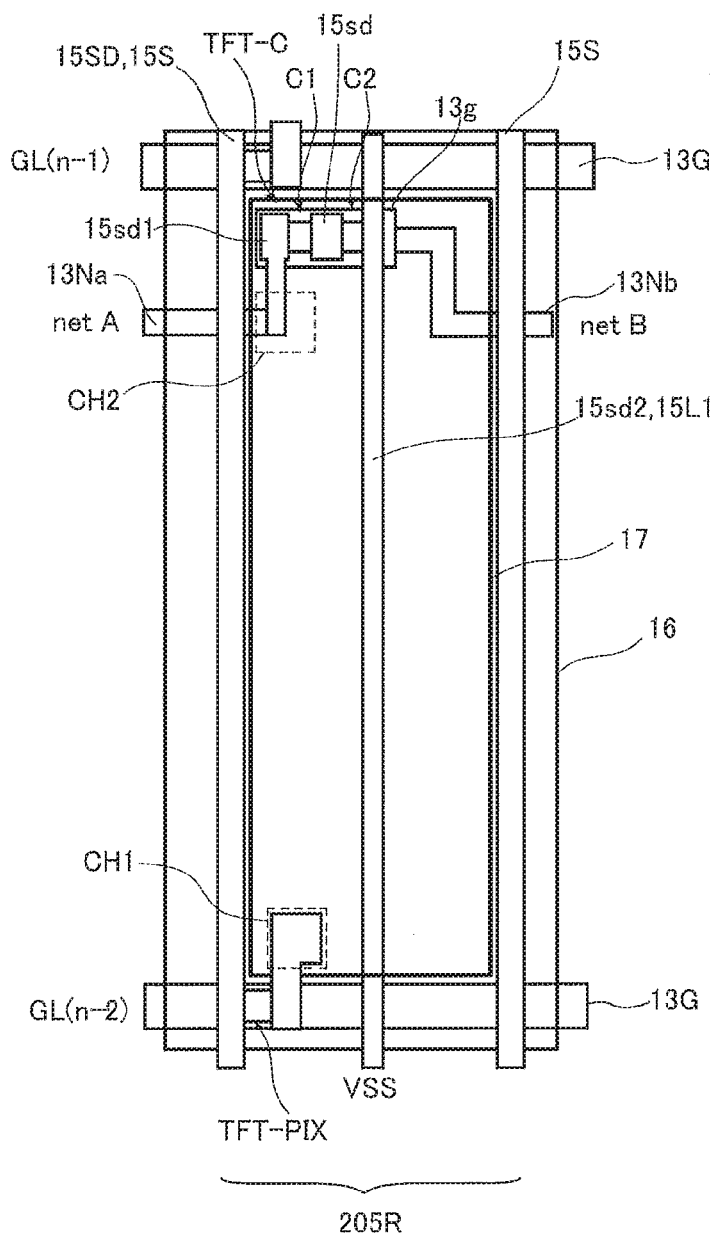
FIG. 19B is an enlarged plan view of the pixel region 205R illustrated in FIG. 16B.

Next, the connection of the TFT-C is described. FIG. 19B is an enlarged plan view illustrating the pixel region 205R illustrated in FIG. 16B. In FIG. 19B, the illustration of the light-shielded region BM is omitted. As illustrated in FIG. 19B, in the pixel region 205R, as is the case with the pixel regions 204G and 204B mentioned above, the TFT-PIX and the pixel electrode 17 are connected at the contact portion CH1. Further, with the gate line layer 13, the gate terminal 13g of the TFT-C, the gate line 13G, and the lines 13N (13Na, 13Nb) are formed. With the source line layer 15, the source-drain terminals 15sd (including the source-drain terminal 15sd1, 15sd2) of the TFT-C, and the lines 15L1 are formed. At the contact portion CH2, the drain terminal 15sd1 on the C1 side and the line 13Na are connected. The TFT-C is connected with netA by the line 13Na, and is connected with netB by the line 13Nb. Further, to the TFT-C, the power source voltage signal (VSS) is supplied, via the line 15L1.

(TFT-F)

Figure 19C:
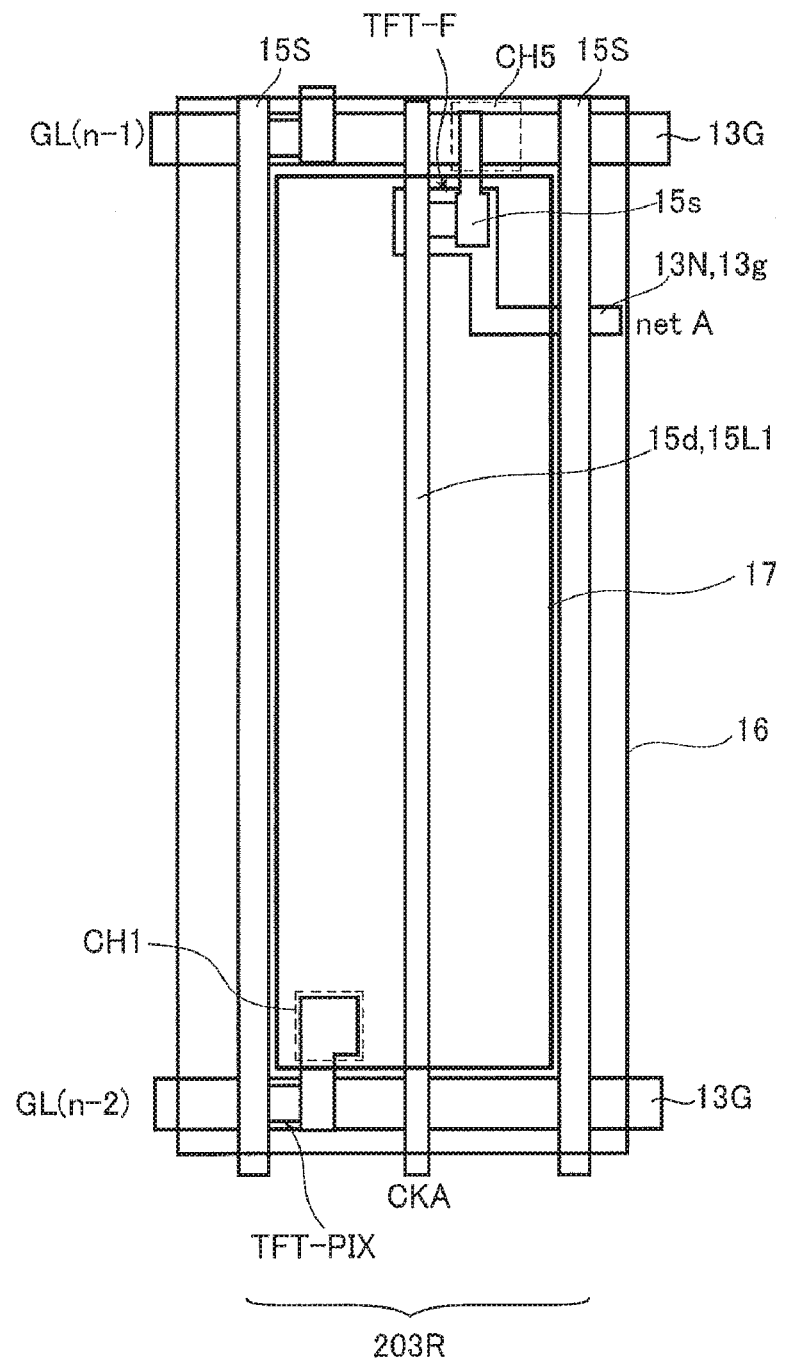
FIG. 19C is an enlarged plan view of the pixel region 203R illustrated in FIG. 16A.

Next, the connection of the TFT-F is described. FIG. 19C is an enlarged plan view illustrating the pixel region 203R illustrated in FIG. 16A. In FIG. 19C, the illustration of the light-shielded region BM is omitted. As illustrated in FIG. 19C, in the pixel region 203R, as is the case with the pixel regions 204G and 204B, the TFT-PIX and the pixel electrode 17 are connected, at the contact portion CH1. Further, with the gate line layer 13, the gate terminal 13g of the TFT-F, the gate line 13G, and the line 13N are formed. With the source line layer 15, the source terminal 15s and the drain terminal 15d of the TFT-F as well as the line 15L1 are formed.

At the contact portion CH5, as is the case with the contact portion CH2 described above, a contact hole H2 for connecting the gate line layer 13 and the source line layer 15 is formed. At the contact portion CH5, the source terminal 15s of the TFT-F and the gate line 13G of GL(n−1) are connected, and the gate terminal of the TFT-F is connected with netA. To the drain terminal 15d of the TFT-F, the clock signal (CKA) is supplied via the line 15L1. Further, the TFT-F outputs the scanning signal to the gate line 13G of GL(n−1) via the contact portion CH5.

(TFT-G)

Figure 19D:
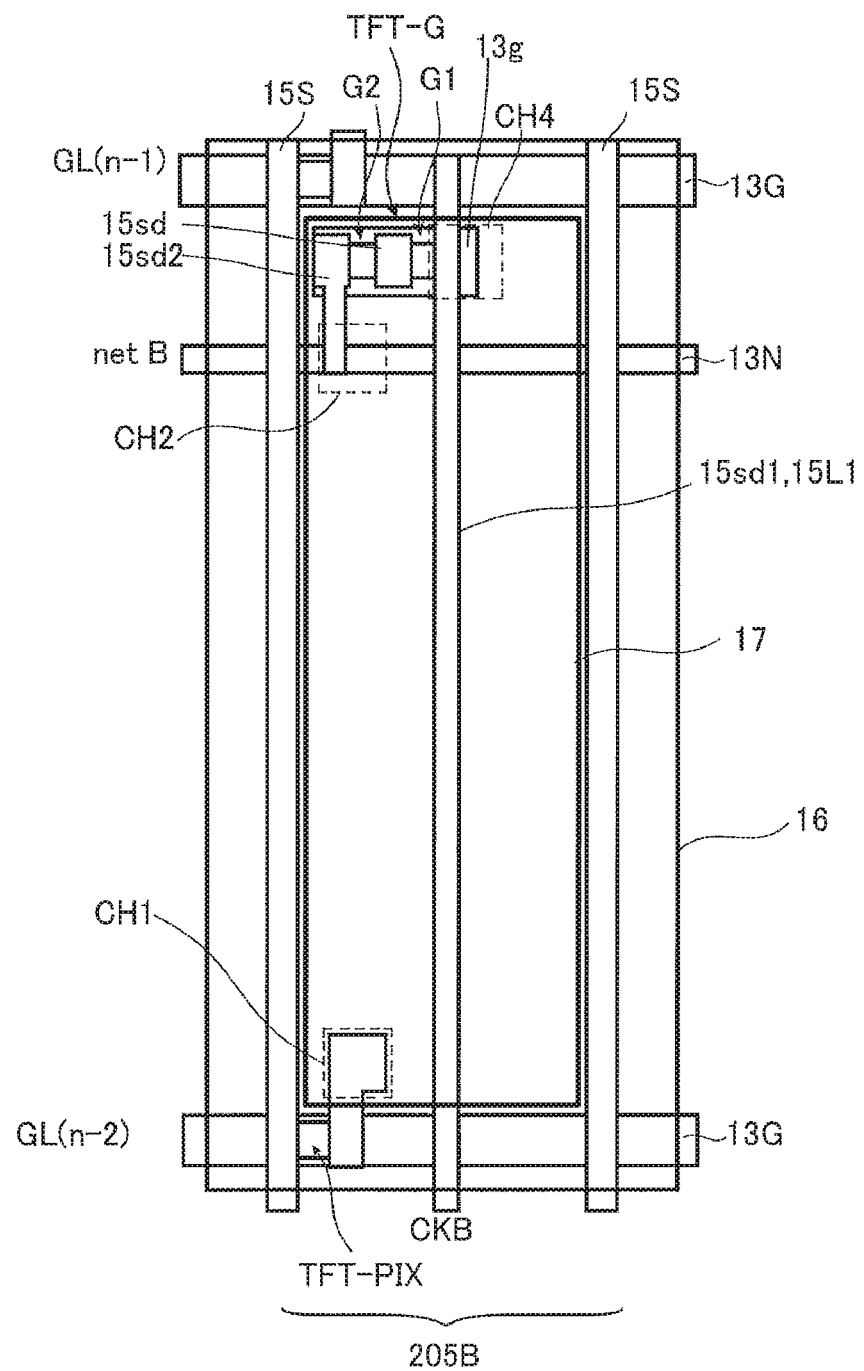
FIG. 19D is an enlarged plan view of the pixel region 205B illustrated in FIG. 16C.

Next, the connection of the TFT-G is described. FIG. 19D is an enlarged plan view illustrating the pixel region 205B illustrated in FIG. 6C. In FIG. 19D, the illustration of the light-shielded region BM is omitted. As illustrated in FIG. 19D, in the pixel region 205B, as is the case with the pixel regions 204G and 204B described above, the TFT-PIX and the pixel electrode 17 are connected with each other, at the contact portion CH1. Further, with the gate line layer 13, the gate terminal 13g of the TFT-G, the gate line 13G, and the line 13N are formed. With the source line layer 15, the source-drain terminals 15sd (including the source-drain terminals 15sd1, 15sd2) of the TFT-G, and the line 15L1 are formed. At the contact portion CH2, the source terminal 15sd2 of the TFT-G, on the G2 side, is connected with the line 13N. The gate terminal 13g of the TFT-G is connected with the drain terminal 15sd1 on the G1 side and the line 15L1 at the contact portion CH4. With this, the TFT-G is connected with netB, and the clock signal (CKB) is supplied via the line 15L1.

(Cbst)

Figure 19E:
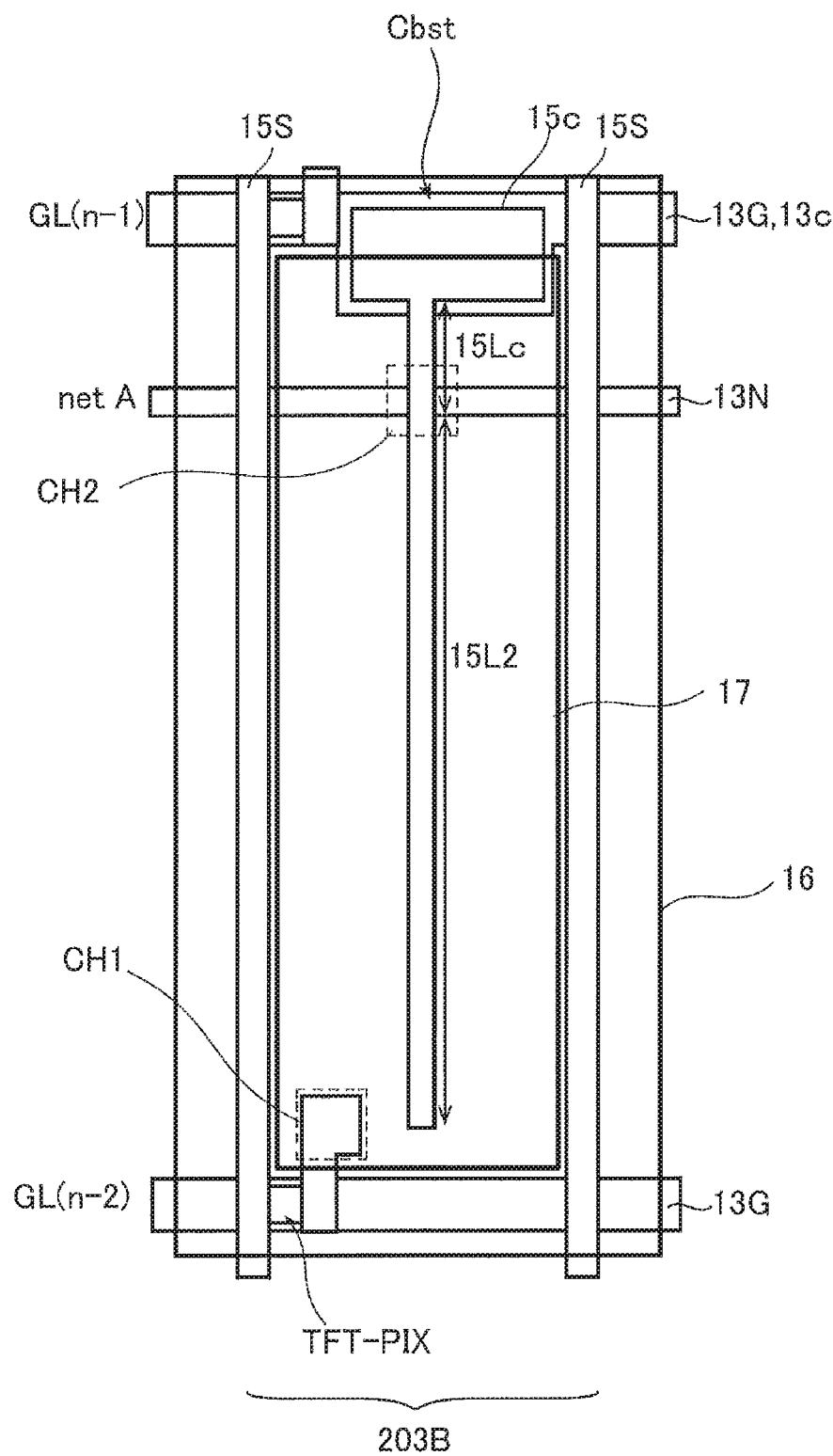
FIG. 19E is an enlarged plan view of the pixel region 203B illustrated in FIG. 16B.

Next, the connection of the capacitor Cbst is described. FIG. 19E is an enlarged plan view illustrating the pixel region 203B illustrated in FIG. 16B. In FIG. 19E, the illustration of the light-shielded region BM is omitted. In the pixel region 203B, as is the case with the pixel regions 204G and 204B, the TFT-PIX and the pixel electrode 17 are connected with each other at the contact portion CH1. Further, with the gate line layer 13, one of electrode 13c composing the capacitor Cbst, the gate line 13G, and the line 13N are formed. With the source line layer 15, the other electrode 15c of the capacitor Cbst, the connection part 15Lc, and the line 15L2 are formed. As illustrated in FIG. 19E, the connection part 15Lc, having a width approximately equal to the width of the line 13N, is formed so as to extend from the electrode 15c to the contact portion CH2, and is connected with the line 13N at the contact portion CH2. Further, the line 15L2 is formed so as to extend from the contact portion CH2 side end of the connection part 15Lc to vicinities of the contact portion CH1. In the present embodiment, the line 15L2 is formed with an intention to cause the pixel region where the capacitor Cbst is formed, and the other pixel region, to have identical aperture ratios. At the contact portion CH2, the electrode 15c is connected with the line 13N by the connection part 15Lc. This allows the capacitor Cbst to be connected with netA.

(TFT-D, E)

Next, the connection of the TFT-D and the TFT-E is described. The TFT-D and the TFT-E, like the TFT-A described above, have gate terminals 13g each of which is formed over two adjacent pixel regions, and the gate terminal 13g is connected with the line 15L1 formed in one of the pixel regions. Since the TFT-D and the TFT-E are different only in the signal supplied to the gate terminal, the reset signal (CLR) or the clock signal (CKA), the following description describes the connection of the TFT-D.

Figure 19F:
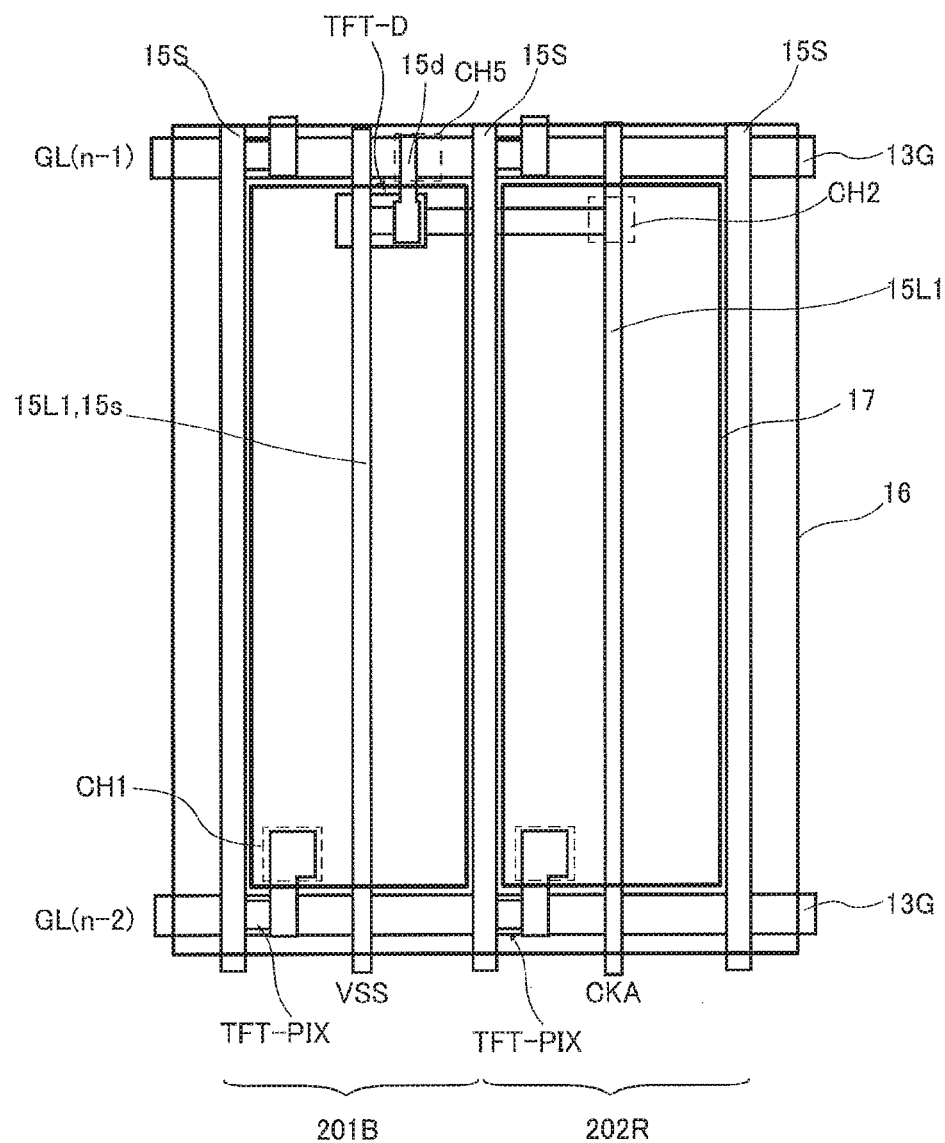
FIG. 19F is an enlarged plan view of pixel regions 201B and 202R illustrated in FIG. 16A.

FIG. 19F is an enlarged plan view illustrating the pixel regions 201B and 202R illustrated in FIG. 16A. In FIG. 19F, the illustration of the light-shielded region BM is omitted. In the pixel regions 201B and 202R, as is the case with the pixel regions 204G and 204B described above, the source terminal 15s and the drain terminal 15d of the TFT-D, and the line 15L1, are formed with the source line layer 15 thus formed. The drain terminal 15d thereof is connected with the gate line 13G of GL(n−1) at the contact portion CH5 in the pixel region 201R. The TFT-D is supplied with the power source voltage signal (VSS) and the clock signal (CKA) via the lines 15L1 in the pixel regions 201B and 202R, drives the gate line 13G of GL(n−1) via the contact portion CH5 so as to output the set signal to the gate line 13G of GL(n).

The foregoing description describes the configuration of the gate driver 11, and a connection example of elements. Descriptions are omitted regarding the pixel regions where the TFTs-B to -E, the TFT-F, the TFT-G, the capacitor Cbst, and the TFT-D are formed, but in the above-mentioned pixel regions as well, as is the case with the pixel region where the TFT-A is formed, the protection films 22 And 23, the shielding layer 16, the interlayer insulating film 24, and the pixel electrode 17 are laminated above the source line layer 15.

(Operation of Gate Driver 11)

Next, the operation of one gate driver 11 is described with reference to FIGS. 15 to 20. FIG. 20 is a timing chart illustrating an operation of the gate driver 11 for scanning the gate line 13G of GL. In FIG. 20, the period from t3 to t4 is a period while the gate line 13G(n) is selected. The clock signal (CKA) and the clock signal (CKB), having phases that are inverted every horizontal scanning period, which are supplied from the display control circuit 4, are input via the terminals 116 to 119 to the gate driver 11. Further, though illustration is omitted in FIG. 20, the reset signal (CLR), which is at the H (High) level for a certain set period every perpendicular scanning period, is input from the display control circuit 4 via the terminals 113 to 115 to the gate driver 11. Upon the input of the reset signal (CLR), netA, netB, and the gate line 13G make transition to the L (Low) level.

In a period from the time t0 to the time t1 in FIG. 20, the clock signal (CKA) at the L level is input to the terminals 116, 117, and the clock signal (CKB) at the H level is input to the terminals 118, 119. This causes the TFT-G to be turned ON, and causes the TFT-H to be turned OFF, thereby causing netB to be charged to the H level. Besides, since the TFT-C and the TFT-D are turned ON and the TFT-F is turned OFF, netA is charged to the power source voltage (VSS) at the L level, whereby a potential at the L level is output from the terminal 120.

Next, at the time t1, the clock signal (CKA) shifts to the H level and the clock signal (CKB) shifts to the L level, which causes the TFT-G to be turned OFF and causes the TFT-H to be turned ON, thereby causing netB to be charged to the L level. Since the TFT-C and the TFT-D are turned OFF, the potential of netA is maintained at the L level, and the potential at the L level is output from the terminal 120.

At the time t2, the clock signal (CKA) shifts to the L level, the clock signal (CKB) shifts to the H level, and the set signal (S) is input to the terminals 111, 112 via the gate line 13G of GL(n−1). This causes the TFT-B to be turned ON, and causes netA to be charged to the H level. Further, the TFT-J is turned ON, the TFT-G is turned ON, and the TFT-H is turned OFF, which causes netB to be maintained at the L level. Since the TFT-C and the TFT-F are in the OFF state, the potential of netA is maintained without dropping. During this period, since the TFT-D is turned ON, a potential at the L level is output from the terminal 120.

At the time t3, the clock signal (CKA) shifts to the H level and the clock signal (CKB) shifts to the L level, which causes the TFT-F to be turned ON and causes the TFT-D to be turned OFF. Since the capacitor Cbst is provided between netA and the terminal 120, as the potential of the terminal 116 of the TFT-F rises, netA is accordingly charged to a potential higher than the H level of the clock signal (CKA). During this period, since the TFT-G and the TFT-J are turned OFF and the TFT-H is turned ON, the potential of netB is maintained at the L level. Since the TFT-C is in the OFF state, the potential of netA does not drop, and the potential of the H level (selection voltage) of the clock signal (CKA) is output from the terminal 120. This causes the gate line 13G of GL(n) connected with the terminal 120 to be charged to the H level, thereby making transition to the selected state.

At the time t4, the clock signal (CKA) shifts to the L level and the clock signal (CKB) shifts to the H level, which causes the TFT-G to be turned ON and causes the TFT-H to be turned OFF, thereby causing netB to be charged to the H level. This causes the TFT-C to be turned ON and causes netA to be charged to the L level. During this period, since the TFT-D is turned ON and the TFT-F is turned OFF, a potential at the L level (non-selection voltage) is output from the terminal 120, whereby the gate line 13G of GL(n) is charged to the L level.

In this way, the set signal (S) is output from the terminal 120 of the gate driver 11 to the gate line 13G, thereby causing the gate line 13 to make transition to the selected state. The liquid crystal display device 1 sequentially scans the gate lines 13G using a plurality of the gate drivers 11 connected respectively to the gate lines 13G, and supplies data signals respectively to the source lines 15S using the source driver 3, thereby causing an image to be displayed on the display panel 2.

In Embodiment 1 described above, a plurality of gate drivers 11 are formed with respect to each of the gate lines 13G, in the display area. Each of the gate lines 13G is sequentially driven according to the scanning signals output from the plurality of gate drivers 11 connected to the gate line 13G. As compared with a case where, as conventionally, a gate driver is provided outside the display area and a scanning signal is input from one end of a gate line, therefore, the dullness of the scanning signal in one gate line is reduced, which allows the gate line to be driven at a high speed. Further, since a plurality of the gate drivers 11 are connected to one gate line 13G, even in a case where disconnection occurs to a part of the gate line 13G, a scanning signal is supplied from another part, and appropriate image display can be maintained.

Further, in Embodiment 1 described above, as illustrated in FIGS. 12, 14 and the like, control signals such as clock signals and power source voltage signals supplied to the gate drivers 11 provided inside the display area are input through a frame area on one edge where the source driver 3 is provided in the display panel 2. This makes it possible to narrow the other peripheral regions on the three other edges where the source driver 3 is not provided.

Still further, in Embodiment 1 described above, since a shielding layer 16 is formed between the pixel electrodes 17, and the switching elements as well as the line sections of the gate drivers 11 provided in the display area, the gate drivers 11 and the pixel electrodes 17 do not mutually interfere, which allows images to be displayed appropriately.

In addition, in Embodiment 1 described above, as illustrated in FIGS. 16B and 19E, in the pixel region in which the capacitor Cbst composing the gate driver 11 is formed, the line 15L2 is formed from the contact portion CH2 to the vicinities of the contact portion CH1 so that the aperture ratio therein becomes identical to the aperture ratio in the other pixel regions. By doing so, the aperture ratios of the pixel regions become approximately uniform, which results in the reduction of color unevenness and the like.

On the pixels to which lines for the switching elements of the above-described gate drivers 11 are not provided, the sensor lead-out lines 7 can be arranged. For example, pixels on which switching elements or lines that form the gate drivers are not formed can be used as the pixels to which sensor lead-out lines are arranged. The sensor lead-out lines 7 can be arranged in such a manner that the pixels have identical aperture ratios to the aperture ratios of the pixels on which elements or lines that form the gate drivers are formed. By arranging the sensor lead-out lines so that the arrangement of the same corresponds to the arrangement of the clock lines and power source lines, the lines of the sensor electrodes can be routed without reductions in the aperture ratios. Further, the sensor lead-out lines can be formed by the same patterning as the patterning for the electrodes formed on the active matrix substrate 20a, such as the source lines or the gate lines. The sensor lead-out lines therefore can be formed without increasing the number of process steps and the number of layers.

Embodiment 3

In Embodiment 1 described above, the sensor lead-out lines are arranged in the pixel area of the active matrix substrate 20a. In Embodiment 3, in addition to the sensor lead-out lines, sensor driving switching elements for controlling the driving of the sensor electrodes are arranged in the pixel area. The sensor driving switching elements control potentials of the drive electrodes according to control signals supplied from outside the pixel area. It should be noted that the liquid crystal display device 1 of Embodiment 2 described above can be combined with the configuration of the present embodiment 3.

Figure 21:
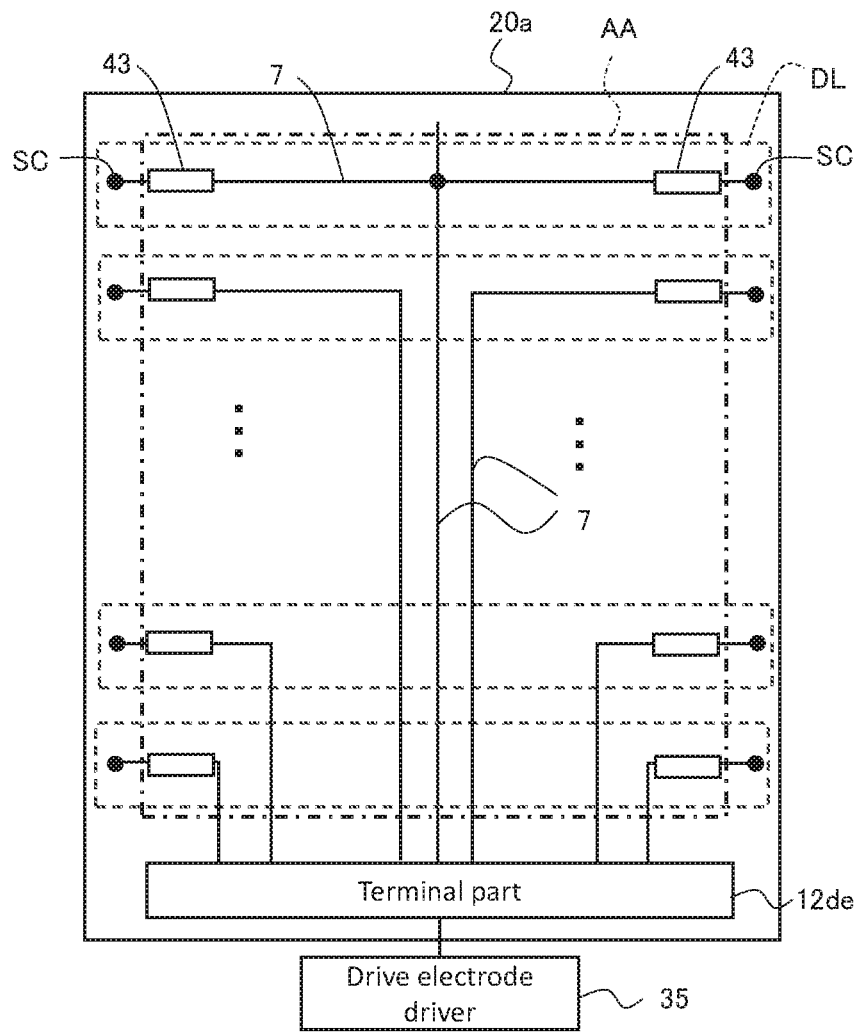
FIG. 21 is a plan view illustrating an exemplary arrangement of sensor lead-out lines and sensor driving switching elements on an active matrix substrate 20a in Embodiment 3.

FIG. 21 is a plan view illustrating an exemplary arrangement of the sensor lead-out lines and the sensor driving switching elements of the active matrix substrate 20a according to Embodiment 3. In the example illustrated in FIG. 21, a seal contact SC connected to the drive electrodes DL on the counter substrate 20b is formed along an edge where the terminal part 12d is not provided, among four edges of the pixel area AA. Along this edge where the terminal part 12d is not provided, inside the pixel area AA, last-stage TFTs as exemplary sensor driving switching elements are provided. Sensor lead-out lines 7, going into the pixel area AA through the terminal part 12d, pass through the last-stage TFTs, go outside from the edge where the terminal part 12d is not provided, and are connected to the drive electrodes DL through the seal contact SC.

The last-stage TFTs 43 are buffers on the last stage for voltages applied as driving signals. In the last-stage TFTs 43, voltages to be applied to the drive electrodes DL are charged, and discharged at a timing based on control signals input thereto. In other words, the last-stage TFTs 43 can be considered the last stage buffers for the voltages to be applied to the drive electrodes DL. The sensor lead-out lines 7 connected to the last-stage TFT 43, therefore, include a voltage supply line for supplying a voltage to be applied as a driving signal, and a sensor driving control line for supplying a control signal for controlling whether the voltage supplied from this voltage supply line is to be applied to the drive electrode DL.

Figure 22A:
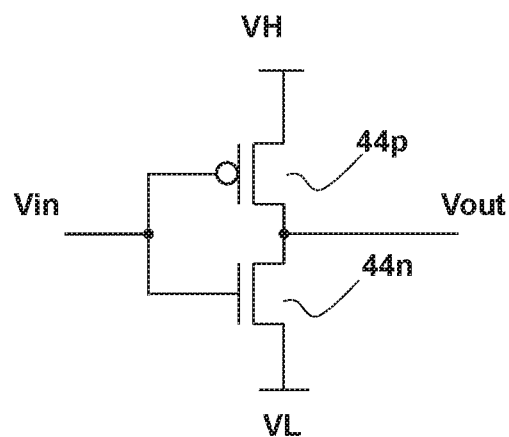
FIG. 22A is a circuit diagram illustrating an exemplary configuration of a last-stage TFT.
Figure 22B:
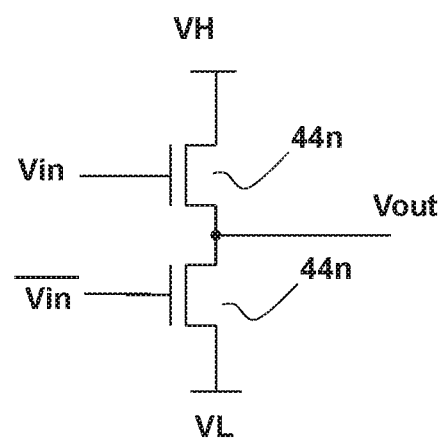
FIG. 22B is a circuit diagram illustrating another exemplary configuration of the last-stage TFT.

FIGS. 22A and 22B are circuit diagrams illustrating exemplary configurations of the last-stage TFT. FIG. 22A is a circuit diagram of a last-stage TFT including a pMOSTFT 44p and a nMOSTFT 44n. In FIG. 22A, control signals are input to gates of the pMOSTFT 44p and the nMOSTFT 44n, and a node that connects a drain of the pMOSTFT 44p and a source of the nMOSTFT 44n serves as an output terminal. To a source of the pMOSTFT 44p, a uniform voltage VH is input, and to a drain of the nMOSTFT 44n, a uniform voltage VL is input.

FIG. 22B is a circuit diagram of a last-stage TFT in which only an nMOSTFT is used. A source of an nMOSTFT to whose drain a uniform voltage VH is input, and a drain of an nMOSTFT to whose source a uniform voltage VL is input, are connected, and the connection node thereof serves as an output terminal. To gates of these two nMOSTFTs, a signal, and the same signal with the phase being inverted, are input, respectively.

Figure 23:
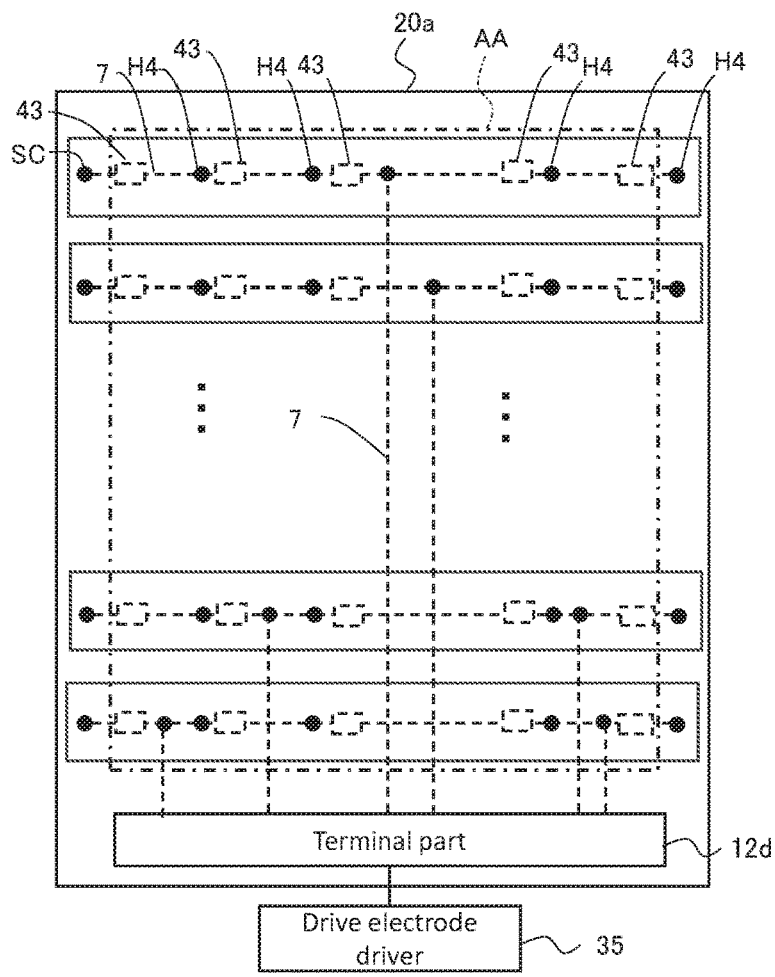
FIG. 23 illustrates another exemplary arrangement of the last-stage TFTs 43.

FIG. 23 illustrates another exemplary arrangement of the last-stage TFTs 43. In the example illustrated in FIG. 23, common electrodes 18 that double as drive electrodes DL are provided on the active matrix substrate 20*a*. The last-stage TFTs 43 are formed in regions that overlap the drive electrodes DL. In the vicinity of the contact holes H4, which connect the drive electrodes DL and the sensor lead-out lines 7, the last-stage TFTs 43 are formed. In other words, the last-stage TFTs 43 are formed between the drive electrodes DL and the sensor lead-out lines 7. Further, a plurality of last-stage TFTs 43 are arranged dispersedly with respect to one drive electrode DL. With this, the distance between the last buffer and the drive electrode to which a voltage charged in the last buffer is applied becomes smaller. Further, the problem of different degrees of dullness of the driving signals due to different lengths of the sensor lead-out lines 7 can be solved. Consequently, the performance of the touch panel can be improved. Further, since the TFTs formed in the frame area decrease, the frame can be narrowed more easily.

Figure 24:
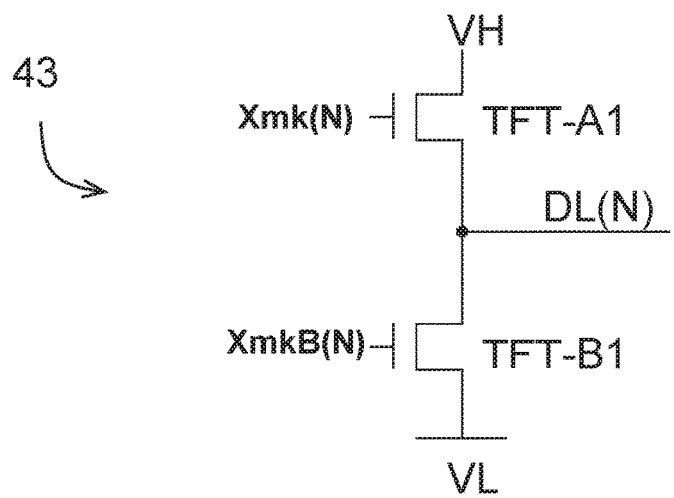
FIG. 24 illustrates an exemplary configuration of the last-stage TFT.

Next, an exemplary driving of the drive electrodes DL by using the last-stage TFTs 43 is described. Here, an exemplary case where last-stage TFTs of the circuit illustrated in FIG. 24 are provided with respect to the drive electrodes DL(1), DL(2), . . . , DL(N), respectively, is described. In the example illustrated in FIG. 24, an input signal Xmk(N) is input to a TFT-A. The TFT-A supplies a constant voltage VH to the drive electrode DL(N), when the input signal has a high potential. A signal XmkB(N) having a phase opposite to that of the signal Xmk(N) is input to a TFT-B. When the input signal has a high potential, the TFT-B supplies a constant voltage VH to the drive electrode DL(N). Here, the signals Xmk are XmkB assumed to be signals whose high potential is VDD and whose low potential is VSS.

In the circuit illustrated in FIG. 24, when Xmk has a high potential, the TFT-A is turned ON, which causes a voltage VH to be supplied to DL. Since XmkB is low here, the TFT-B is in an OFF state. In contrast, when XmkB has a high potential and Xmk has a low potential, the TFT-A is turned OFF and the TFT-B is turned ON, which causes VL to be supplied to DL. This causes DL to be driven. Xmk, XmkB only have to charge/discharge gate electrodes of the TFT-A and the TFT-B, which are buffer TFTs. As compared with a case where the drive electrode DL is driven directly by the signal Xmk, driving loads can be reduced. It should be noted that the potential relationship of VDD>VH+Vth(A) and VSS≤VL is desired. Here, Vth(A) is a threshold value of the TFT-A.

Figure 25:
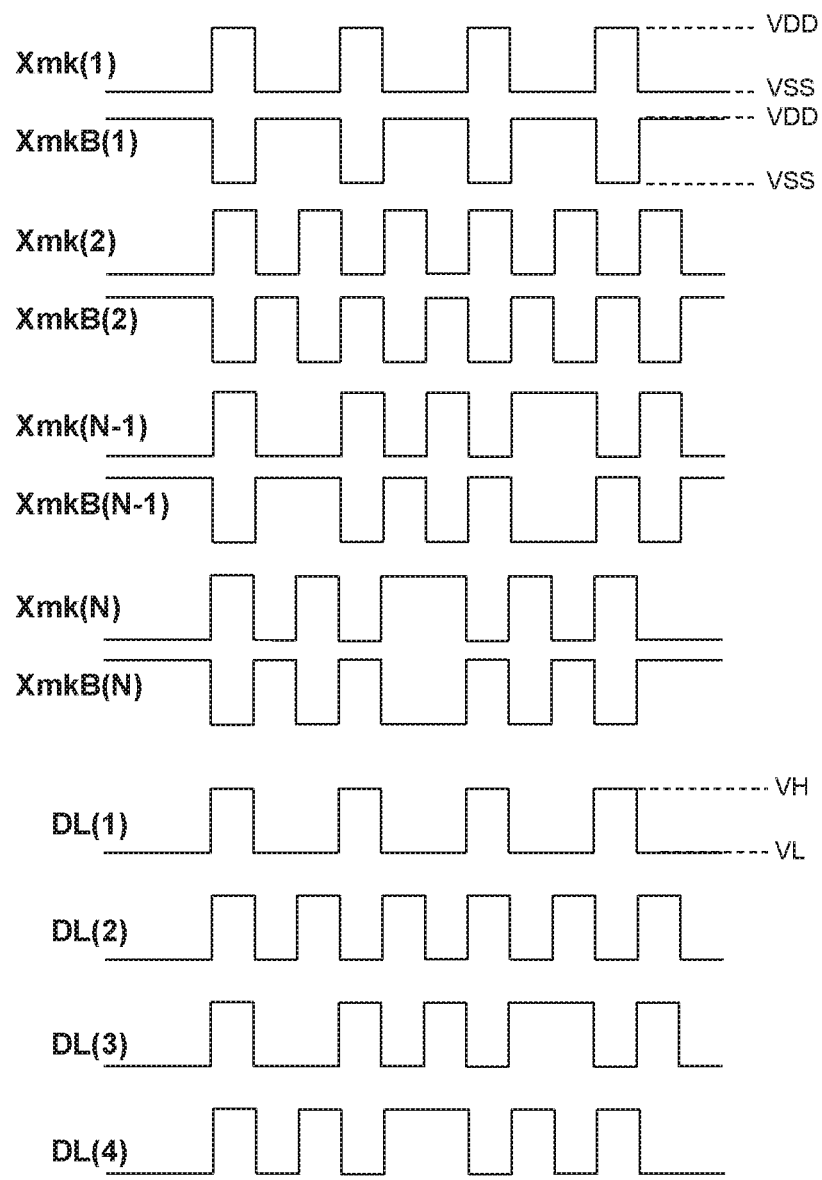
FIG. 25 illustrates exemplary waveforms Xmk(1) to Xmk(N), and XmkB(1) to XmkB(N) in a case where drive electrodes DL(1), DL(2), ... DL(N) are driven in parallel, and exemplary waveforms of the drive electrodes DL(1) to DL(N).

FIG. 25 illustrates exemplary waveforms of Xmk(1) to Xmk(N), and XmkB(1) to XmkB(N) in a case where the drive electrodes DL(1), DL(2), . . . DL(N) are driven in parallel, and exemplary waveforms of the drive electrodes DL(1) to DL(N). The example illustrated in FIG. 25 is an operation example in a case where the last-stage TFTs illustrated in FIG. 24 are connected to each of the drive electrodes DL(1) to DL(N).

Figure 26:
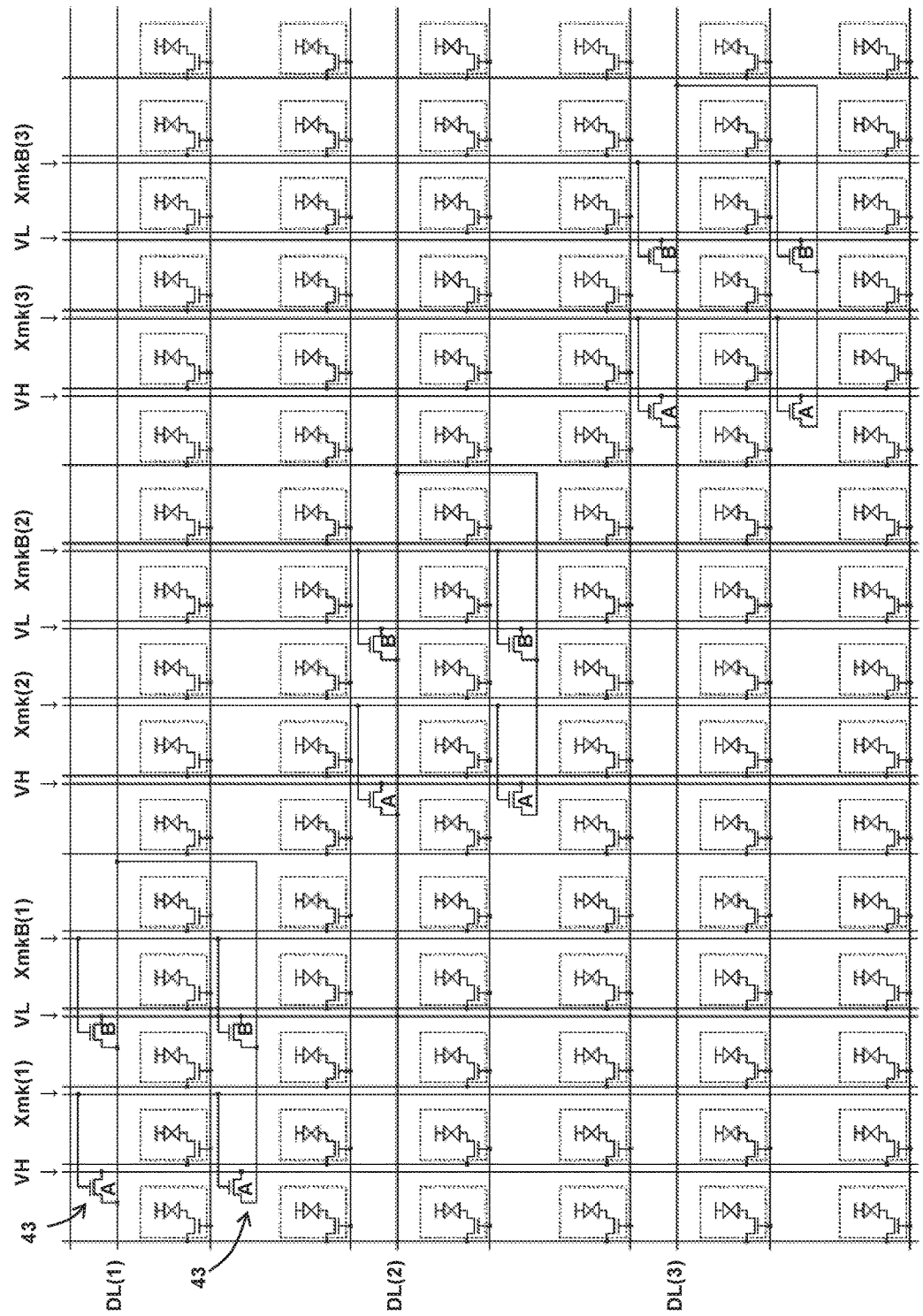
FIG. 26 illustrates an exemplary circuit configuration in a case where last-stage TFTs are connected to the drive electrodes DL(1) to DL(N)

FIG. 26 illustrates an exemplary circuit configuration in a case where the last-stage TFTs are connected to each of the drive electrodes DL(1) to DL(N). In the example illustrated in FIG. 26, a plurality of last-stage TFTs 43 each of which includes a TFT-A and a TFT-B are connected in parallel to one drive electrode DL. Two TFTs-A and two TFT-B, connected to one drive electrode DL, are arranged over two rows of pixels. In this way, by connecting a plurality of last-stage TFTs 43 to one drive electrode DL, the buffer size, which is in the size of the TFT-A and the TFT-B, can be increased. Though the last-stage TFTs 43 are arrayed in the row direction in the case of FIG. 26, the last-stage TFTs 43 may be arrayed in the column direction.

Embodiment 4

In Embodiment 3 described above, the last-stage TFTs (last buffers) as a part of a driving circuit are arranged in the pixel area of the active matrix substrate 20*a*. In Embodiment 4, not only the last buffers but also sensor driving switching elements for a driving circuit that controls the input timings for inputting driving signals based on clock signals are also arranged in the pixel area. It should be noted that the liquid crystal display device 1 according to Embodiment 2 described above can be combined with the configuration of the present Embodiment 4.

Figure 27:
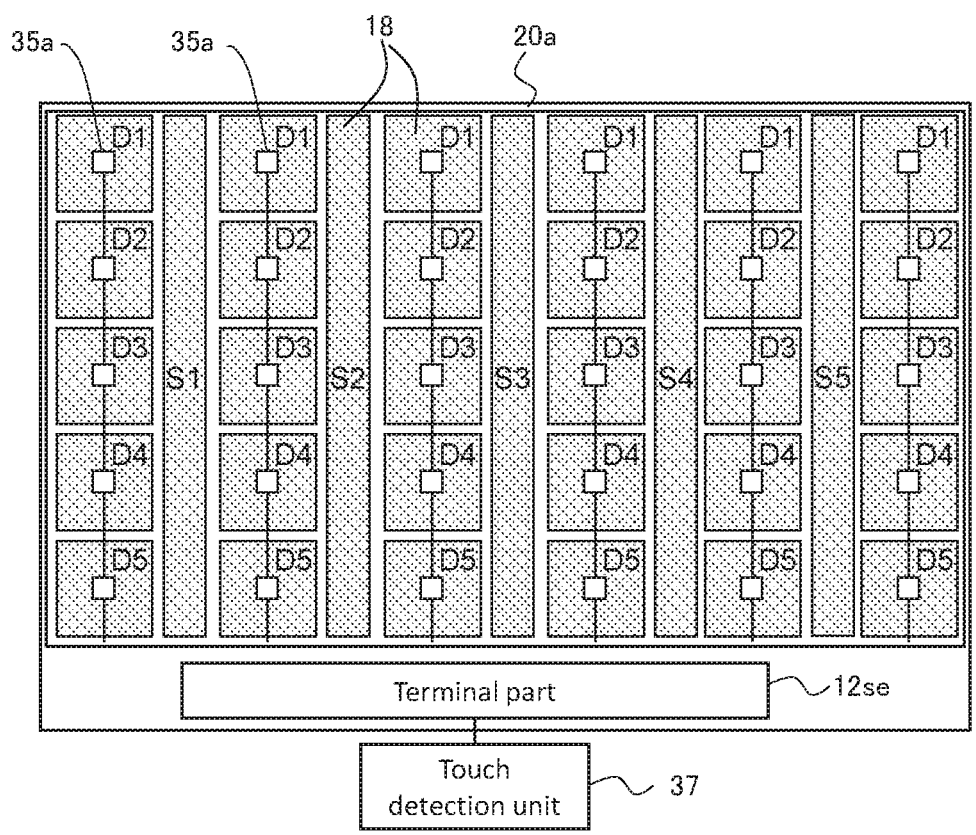
FIG. 27 illustrates an exemplary configuration of an active matrix substrate 20a in Embodiment 3.

FIG. 27 illustrates an exemplary configuration of an active matrix substrate 20*a* according to Embodiment 3. The active matrix substrate 20*a* illustrated in FIG. 27 includes a common electrode 18. The active matrix substrate 20*a*, in one example, can provide a horizontal electric field mode such as the FSS mode, for driving the liquid crystal layer LC with an electric field generated by the common electrode 18 and the pixel electrodes 17 (not illustrated in FIG. 27)

The common electrode 18 on the active matrix substrate 20*a* doubles as a plurality of drive electrodes D1 to D5 and detection electrodes S1 to S5. The common electrode 18, therefore, are divided into portions equivalent to a plurality of drive electrodes D1 to D5 and detection electrodes S1 to S5. In the drive electrodes D1 to D5, switching elements that compose drive electrode drivers 35*a* provided in the pixel area are arranged. To one drive electrode D1, the same driving signal is input. This one drive electrode D1, to which the same driving signal is input, is further divided into a plurality of (six in the present example) electrode pads, and the detection electrodes S1 to S5 are arranged in spaces between the electrode pads thus obtained by dividing. The drive electrode drivers 35*a* are provided with respect to these electrode pads thus obtained by dividing, respectively.

The drive electrode driver 35*a* includes switching elements such as a TFT or a capacitor that functions as a buffer that charges a voltage to be applied to the drive electrode D1; a timing control TFT that controls a timing of charging/discharging a voltage of the buffer based on a clock signal or a control signal from the drive electrode of the previous stage; and a next stage control TFT that outputs a control signal to the drive electrode on the next stage according to a voltage charging/discharging operation of the buffer.

With this configuration, the common electrode portions 18 for respective pixels in the pixel area can also function as drive electrodes for sensing (referred to as drive electrodes, or a transmission electrodes, in some cases), and as detection electrodes (referred to as sense electrodes, or reception electrodes, in some cases). In one example, after display data are written in pixels for one frame, a plurality of drive electrodes D1 to D5 are sequentially scan-driven by the drive electrode drivers 35*a* provided in the image area. Here, for example, the common electrode portions corresponding to the pixels included in the area of D1 function as drive electrodes D1. The common electrode portions in this area are connected with one another. The same driving signal, therefore, is input simultaneously to a plurality of electrode pads included in the drive electrode D1.

Response signals corresponding to a driving signal input to the drive electrodes D1 are output from the detection electrodes S1 to S5. These response signals reflect electrostatic capacitances between the drive electrode D1 and the detection electrodes S1 to S5. The touch detection unit 37 detects changes in the electrostatic capacitances between the drive electrode D1 and the detection electrodes S1 to S5. Thus, the sensor-equipped display device 1 can operate as an in-cell touch sensor.

Further, as is the case with Embodiment 2 described above, drivers for driving the liquid crystal panel can be arranged also in the pixel area. In a case where both of the gate drivers and the drive electrode drivers are arranged in the pixel area, the configuration can be such that the pixels on which the gate drivers are arranged, and the pixels on which drive electrode drivers are arranged, are different. For example, the drive electrode drivers can be formed in the areas of the drive electrodes D1 to D5, and the gate drivers can be formed in the areas of the detection electrodes S1 to S5.

Figure 28:
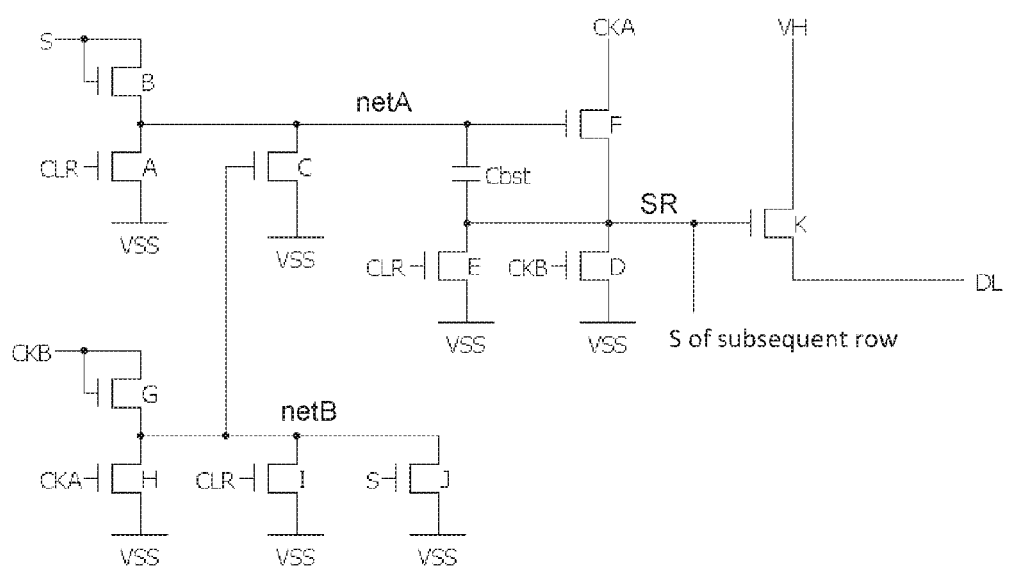

FIG. 28 illustrates an exemplary equivalent circuit of the drive electrode driver 35a. As illustrated in FIG. 28, the drive electrode driver 35a includes TFT-A to TFT-K formed with thin film transistors (TFTs) as switching elements, and a capacitor Cbst. In FIG. 28, the source terminal of TFT-B, and the drain terminal of TFT-A, the source terminal of TFT-C, one of electrodes of the capacitor Cbst, and the gate terminal of TFT-F are connected to a line, which is called netA. Further, the gate terminal of TFT-C, the source terminal of TFT-G, the drain terminal of TFT-H, the source terminal of TFT-I, and the source terminal of TFT-J are connected to a line, which is called netB. Still further, the other electrode of the capacitor Cbst, the source terminal of TFT-F, the drain terminal of TFT-D, the drain terminal of TFT-E, and the gate terminal of TFT-K are connected to a line, which is called SR.

To each gate terminal of TFT-A, a reset signal (CLR) is input. The drain terminal of TFT-A is connected with netA, and the source terminal thereof is connected to a power source voltage terminal VSS. To the gate terminal of TFT-B, a clock signal (CKB) is input. The gate terminal and the drain terminal of TFT-B are connected (diode connection), and the source terminal thereof is connected to netA. To the gate terminal of TFT-B, a set signal (S) of the previous stage is input.

Each gate terminal of TFT-C is connected with netB, the drain terminal of C1 is connected with netA, and the source terminal of C2 is connected to the power source voltage terminal VSS. One of the electrodes of the capacitor Cbst is connected with netA, and the other electrode is connected with SR. To the gate terminal of TFT-D, the clock signal (CKB) is input. The drain terminal of TFT-D is connected to SR, and the source terminal thereof is connected to the power source voltage terminal VSS.

To the gate terminal of TFT-E, the reset signal (CLR) is input. The drain terminal of TDT-E is connected with SR, and the source terminal thereof is connected to the power source voltage terminal VSS. The gate terminal of TFT-F is connected with netA, the clock signal (CKA) is input to the drain terminal thereof, and the source terminal thereof is connected with SR.

The gate terminal of TFT-G and the drain terminal of G1 are connected (diode connection), and the source terminal thereof is connected to netB. To the gate terminal thereof, the clock signal (CKA) is input. To the gate terminal of TFT-H, the clock signal (CKA) is input. The drain terminal of TFT-H is connected with netB, and the source terminal thereof is connected to the power source voltage terminal VSS.

To the gate terminal of TFT-I, the reset signal (CLR) is input. The drain terminal of TFT-I is connected with netB, and the source terminal thereof is connected to the power source voltage terminal VSS. To the gate terminal of TFT-J, the set signal (S) of the previous stage is input. The drain terminal of TFT-J is connected with netB, and the source terminal thereof is connected to the power source voltage terminal VSS. To the drain terminal of TFT-K, a signal VH is input. The gate terminal of the TFT-K is connected with netB, and the source terminal thereof is connected to the drive electrode DL.

Figure 29:
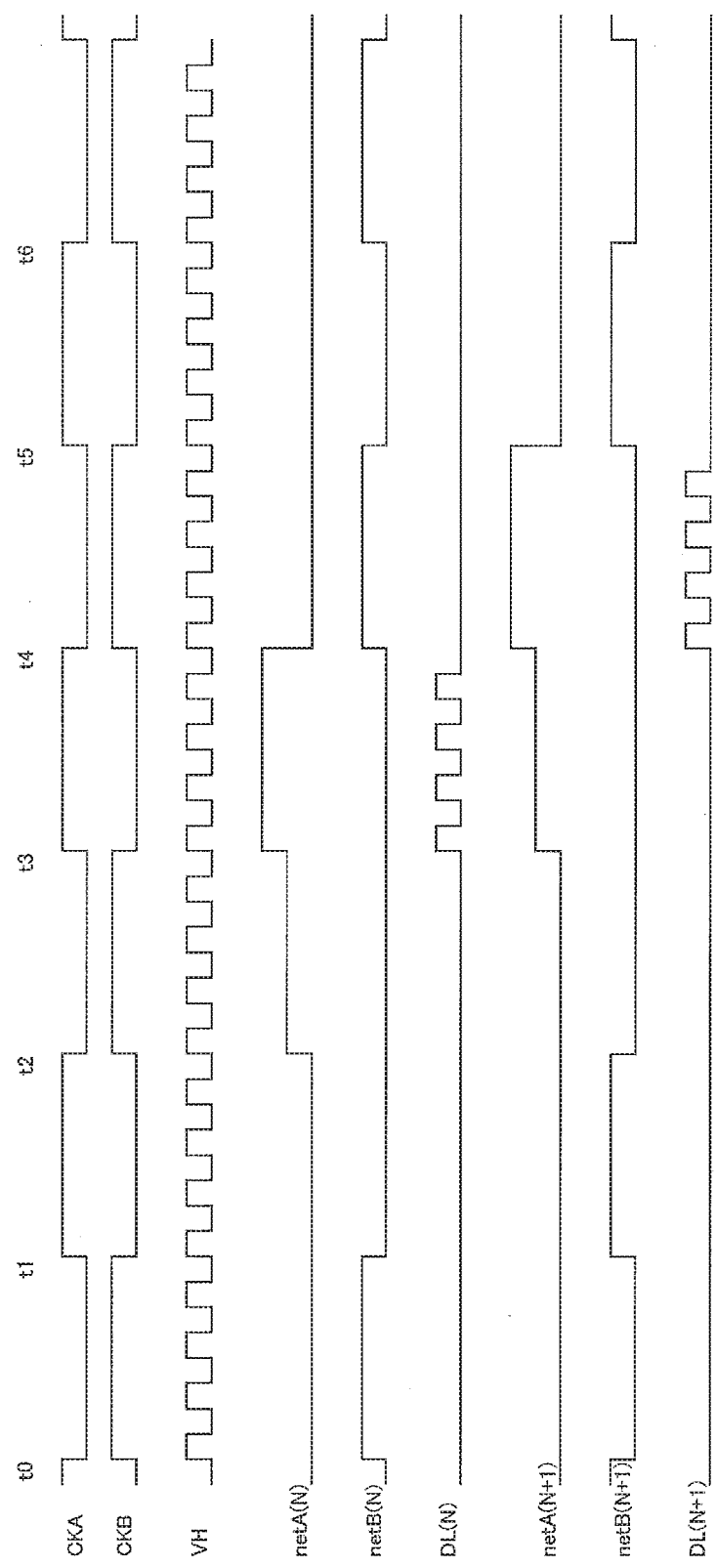
FIG. 29 is a timing chart when the drive electrode driver 35a scans drive electrodes D1 to D5.

FIG. 29 is a timing chart when the drive electrode driver 35a scans drive electrodes D1 to D5. In FIG. 29, the period from t3 to t4 is a period while a driving signal is input to DL(n). The clock signal (CKA) and the clock signal (CKB), which are supplied form outside the pixel area and whose phase is inverted every horizontal scanning period, are input through TFT-D, TFT-F, TFT-G, and TFT-H to the drive electrode driver 35a. Further, though illustration is omitted in FIG. 29, a reset signal (CLR) that is at a H (high) level during a uniform period every perpendicular scanning period is input through TFT-A, TFT-E, and TFT-I to the drive electrode driver 35a. When the reset signal (CLR) is input, netA, netB, and DL make transition to the L (low) level.

During a period from time t0 to time t1 in FIG. 29, the clock signal (CKA) at the L level is input to TFT-H and TFT-F, the clock signal (CKB) at the H level is input to TFT-G and TFT-D. This causes TFT-G to be turned ON, and causes TFT-H to be turned OFF, thereby causing netB to be charged to the H level. Further, since TFT-C and TFT-D are turned ON and TFT-F is turned OFF, netA is charged to the power source voltage (VSS) at the L level, and SR has a potential at the L level.

Next, at time t1, when the clock signal (CKA) rises to the H level and the clock signal (CKB) falls to the L level, TFT-G is turned OFF and TFT-H is turned ON, whereby netB is charged to the L level. Then, TFT-C and TFT-D are turned OFF, whereby the potential of netA is maintained at the L level, and SR comes to have a potential at the L level.

At time t2, the clock signal (CKA) falls to the L level and the clock signal (CKB) rises to H level, and the set signal (S) from the previous stage is input to TFT-A and TFT-J. This causes TFT-B to be turned ON, and causes netA to be charged to the H level. Further, TFT-J is turned ON, TFT-G is turned ON, and TFT-H is turned OFF, whereby netB is in a state of being maintained at the L level. Since TFT-C and TFT-F are turned OFF, the potential of netA does not decrease and is maintained. During this period, since TFT-D is in the ON state, SR has a potential at the L level.

At time t3, the clock signal (CKA) rises to the H level and the clock signal (CKB) falls to the L level, which causes TFT-F to be turned ON and causes TFT-D to be turned OFF. Since the capacitor Cbst is provided between netA and SR, as the potential of the drain terminal of TFT-F increases, netA is charged to a potential higher than the H level of the clock signal (CKA). During this period, TFT-G and TFT-J are turned OFF, and TFT-H is turned ON, whereby the potential of netB is maintained at the L level. Since TFT-C in the OFF state, the potential of netA does not decrease, and the H level potential (selection voltage) of the clock signal (CKA) is output from the terminal 120. This causes SR to be charged to the H level. Here, TFT-K is turned ON, and a VH signal is input through TFT-K to DL. Here, in order to turn TFT-K ON sufficiently, VDD≥VDD2+Vth is desirably satisfied. VDD is a high potential of CKA, CKB, CLR, VDD2 is a high potential of VH, and Vth is a threshold value of TFT-B.

At time t4, when the clock signal (CKA) falls to the L level and the clock signal (CKB) rises to the H level, TFT-G is turned ON and TFT-H is turned OFF, whereby netB is charged to the H level. This causes TFT-C to be turned ON and netA is charged to the L level. During this period, since TFT-D is turned ON and TFT-F is turned OFF, SR comes to have a potential of the L level. This causes TFT-K to be turned OFF, whereby the supply of the VH signal to the drive electrode DL ends.

In this way, the drive electrode driver 35a sequentially supplies the driving signals to the plurality of drive electrodes D1 to D6, and the touch detection unit 37 receives a response signal corresponding to the driving signal.

Figure 30:
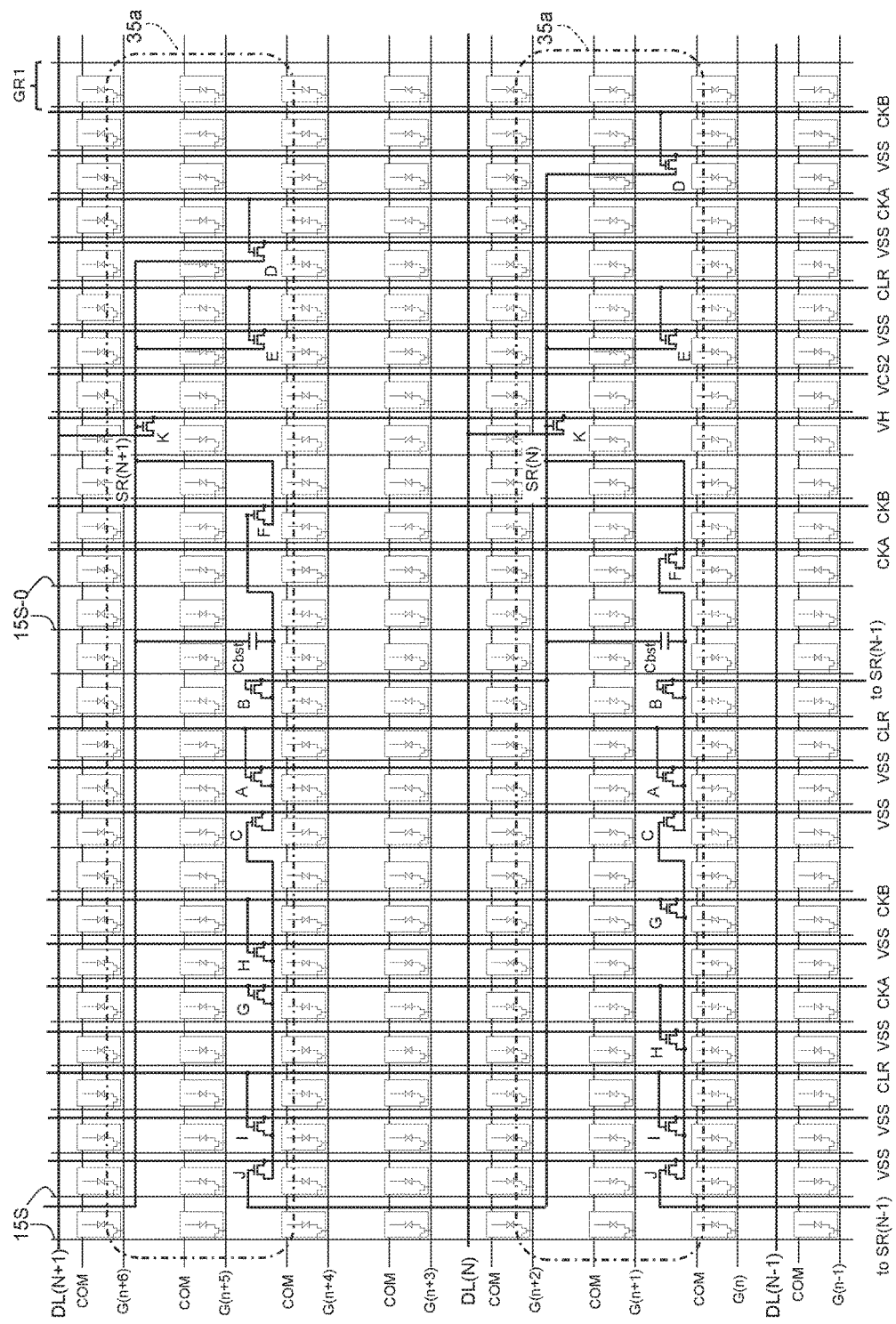
FIG. 30 illustrates an exemplary arrangement of drive electrode drivers 35a illustrated in FIG. 28 in a pixel area.

FIG. 30 illustrates an exemplary arrangement of the drive electrode drivers 35a illustrated in FIG. 28 in the pixel area. In the example illustrated in FIG. 28, the drive electrodes DL(N−1) to DL(N+1) are arranged in parallel with the gate lines G(n−1) to G(n+6). In parallel with the source line 15S, lines for supplying signals (VSS, CLR, CKA, CKB) to the drive electrode driver 35a are arranged. In addition, the line SR is also provided in parallel with the gate line G. These lines in parallel with the source line are arranged so as to pass different pixel arrays from one another, respectively. The drive electrode DL is connected to a common electrode COM. To the drive electrode DL or the line SR, TFTs-A to K are connected. The reference marks "A" to "K" in FIG. 30 correspond to TFTs-A to K in FIG. 28, respectively. TFTs-A to K are arranged at different pixels, respectively. This allows the TFTs and the lines to be arranged dispersedly in the pixel area. This prevents the lines and the TFTs from being arranged concentratedly in specific pixels, and makes it possible to make the distribution of transmittance uniform throughout the pixel area.

In the example illustrated in FIG. 30, the clock signal input to the drive electrode driver that outputs a driving signal to D(N) has a phase opposite to the phase of the clock signal input to the drive electrode driver that outputs a driving signal to D(N+1), i.e., the next stage (the subsequent row). More specifically, the clock signals supplied to TFT-D, TFT-F, TFT-H, and TFT-G in the drive electrode driver of D(N), respectively, have phases opposite to the phases of the clock signals supplied to the TFTs in the drive electrode driver of adjacent D(N+1), respectively.

Further, as described above, both of the drive electrode drivers 35a and the gate drivers 11 can be arranged in the pixel area. In this case, the lines and TFTs of the drive electrode drivers 35a can be arranged on the pixels where the lines and TFTs of the gate drivers 11 are not provided. This makes it possible to make the distribution of aperture ratios in the pixel area close to uniform distribution. For example, dummy lines provided on the pixels where the gate drivers 11 are not arranged so that the aperture ratios are made uniform can be used as the lines of the drive electrode drivers 35a. Further, at least a part of the lines can be shaped by the drive electrode drivers 35a and the gate drivers 11.

In one example, the TFTs and lines of the gate drivers 11 can be arranged on the pixel arrays where the TFTs and lines of the drive electrode drivers 35a are not provided. For example, in the case of the configuration illustrated in FIG. 30, the TFTs and lines of the gate driver 11 can be provided on a pixel array on the left to the pixel array GR1 outside the pixel array where the TFTs and lines of the drive electrode driver are provided (not shown in FIG. 30).

In this way, the configuration is not limited to the case where an area for the gate driver 11 and an area for the drive electrode driver 35a are separated in each row; an area for the gate driver 11 and an area for the drive electrode driver 35a can be separated in each column. For example, a line of the drive electrode driver corresponding to the source line 15S-0 illustrated in FIG. 30 is not provided. In this way, along the source line 15-0 of the pixel array on which the line of the drive electrode driver is not provided, the lines for the gate driver 11 can be arranged. In this case, in a column where a TFT of the drive electrode driver is not provided, TFTs for the gate driver 11 can be arranged.

Figure 31:
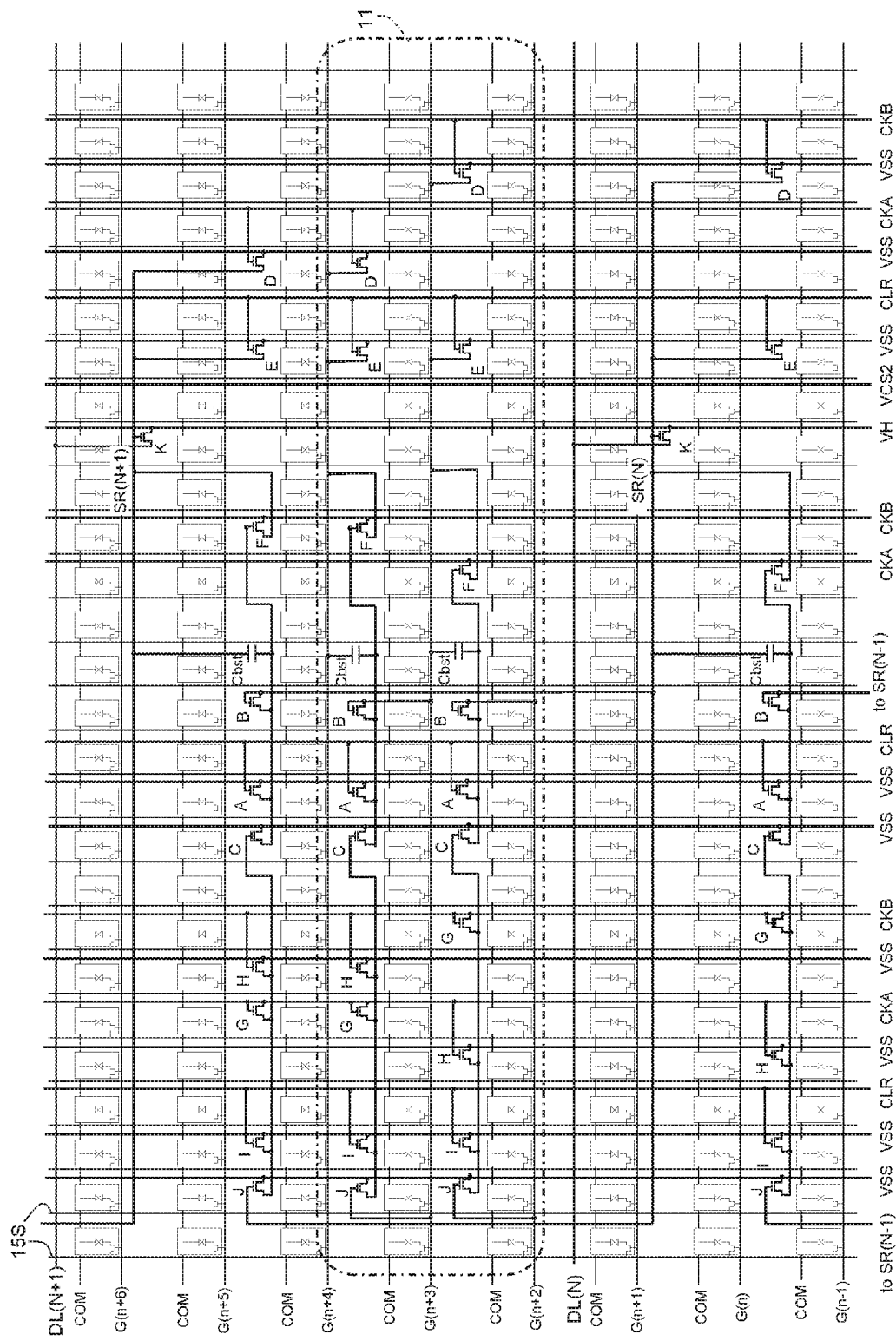
FIG. 31 illustrates an exemplary configuration in a case where lines of the drive electrode drivers double as lines of the gate drivers 11.

Further, at least a part of the lines for controlling the drive electrode drivers can double as lines for controlling the gate drivers 11. FIG. 31 is an exemplary configuration in a case where lines are shared by the drive electrode drivers and the gate drivers 11. In the example illustrated in FIG. 31, TFTs of the gate driver 11 are provided in a column between a column where TFTs of the drive electrode driver of D(N) are arranged and a column where TFTs of the drive electrode driver of D(N+1) are arranged. The reference marks "A" to "J" of TFTs in FIG. 31 correspond to TFTs-A to J in FIG. 15, respectively. In this example, the lines for supplying the power source voltage (VSS), the lines for supplying the clock signal (CKA, CKB), and the lines for supplying the reset signal (CLR) are shared by the gate drivers 11 and the drive electrode drivers. This embodiment is merely one example, and it may be possible that at least one line among these lines be shared by the gate drivers 11 and the drive electrode drivers. In the case of the configuration illustrated in FIG. 31, for example, the gate drivers and the drive electrode drivers can operate under time-sharing. In this way, the sharing of lines makes it possible to arrange lines efficiently.

Figure 32:
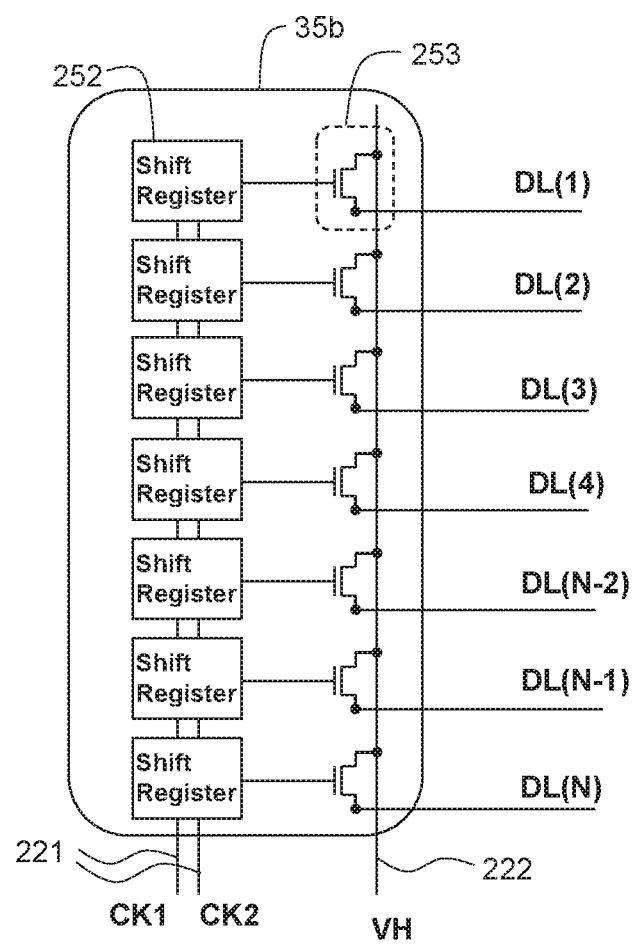
FIG. 32 illustrates an example of a sequential driving circuit that sequentially drives the drive electrodes DL.
Figure 33:
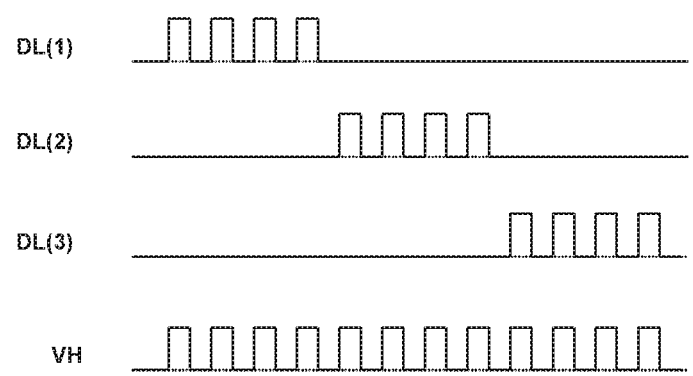
FIG. 33 is a timing chart of the driving circuit illustrated in FIG. 32.

The configuration and operation of the drive electrode drivers 35a are not limited to the above-described example. For example, as illustrated in FIG. 32, the configuration may be such that a shift register that sequentially inputs a driving signal to a plurality of drive electrodes DL(1) to DL(N), based on the clock signal CLK, is provided for each drive electrode DL. FIG. 32 illustrates an exemplary sequential driving circuit for sequentially driving the drive electrodes DL. FIG. 33 is a timing chart of a driving circuit illustrated in FIG. 32.

The drive electrode driver 35b in FIG. 32 includes a shift register 252 and a switching circuit 253 corresponding to the drive electrodes, respectively. Each shift register 252 is connected to the drive electrode DL via the switching circuit 253. To the shift register, a line 221 for supplying the clock signal is connected. To the switching circuit 253, a driving signal line 222 for inputting a driving signal wave VH is connected. The shift register 252, by controlling the switching circuit 252, controls the presence/absence of output of the driving signal wave VH to the drive electrode DL.

The driving signal wave VH may have a rectangular waveform, that is, may be a pulse signal that is output consecutively in a certain cycle. A plurality of shift registers 252 provided so as to correspond to the drive electrodes DL(1) to DL(N), respectively, turn on the switching circuits 253 sequentially, for a prescribed period of time each. This allows the driving signal in the rectangular waveform to be output sequentially to the drive electrodes DL(1) to DL(N) as illustrated in FIG. 33.

Figure 34:
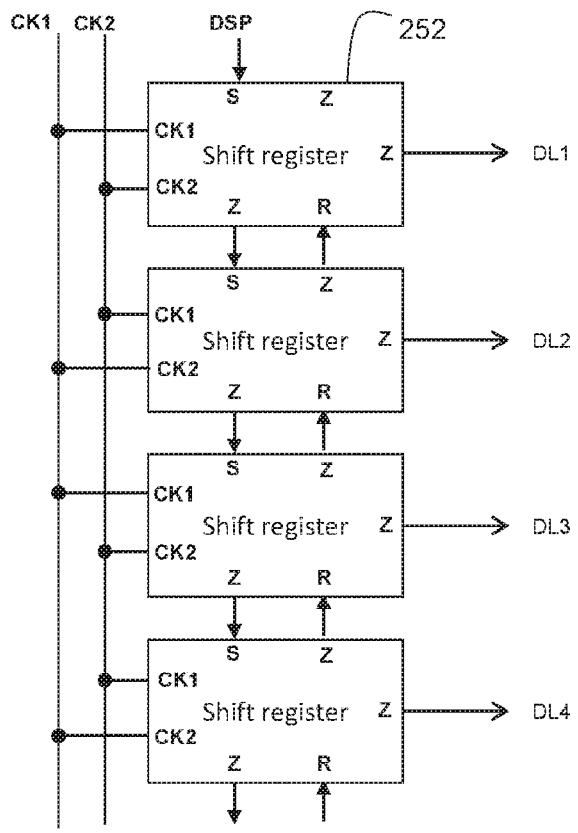
FIG. 34 illustrates a configuration of a shift register 252 illustrated in FIG. 32.
Figure 35:
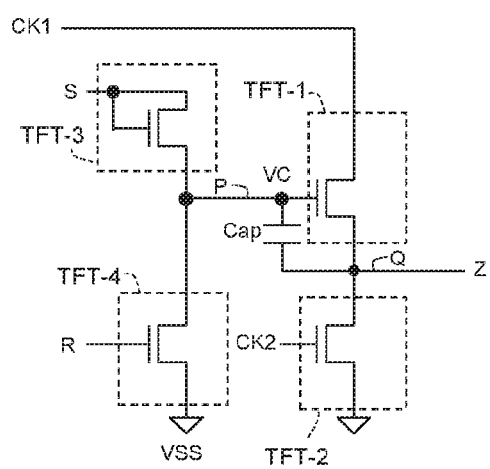
FIG. 35 illustrates an exemplary circuit configuration of the shift register 252 illustrated in FIG. 34.

FIG. 34 illustrates a configuration of the shift register 252 illustrated in FIG. 32. FIG. 35 illustrates an exemplary circuit configuration of the shift register 252 illustrated in FIG. 34. In the example illustrated in FIG. 34, each of a plurality of shift registers 252 has terminals through which two clock signals CK1, CK2 having opposite phases are input thereto, a terminal through which an output signal S from the shift register on the previous stage is input thereto, terminals for outputting an output signal Z, and a terminal through which an output signal R from the shift register on the subsequent stage is input thereto. The shift register on the first stage does not have a terminal through which an output signal Z from the previous stage is input, and a driving start signal DSP is input thereto instead. For example, each shift register 252 is capable of turning ON the output signal Z with a delay based on the clock with respect to the timing at which the output signal S of the previous stage is turned ON. Further, each shift register 252 is capable of turning OFF the output signal Z at a timing at which the output signal R of the subsequent stage is turned ON.

In the example illustrated in FIG. 35, the shift register 252 includes a capacitor Cap in which a voltage VC for turning ON the output signal Z (high level) is charged, and first to fourth switching elements (TFTs-1 to 4). The first switching element TFT-1 outputs a voltage VC charged in the capacitor Cap according to the first clock signal CK1. The third switching element TFT-3 charges the voltage VC based on the output signal S of the previous stage to the capacitor Cap. The second switching element TFT-2 turns OFF the voltage of the output signal S (low level) based on the second clock signal CK2. The fourth switching element TFT-4 resets the voltage VC based on the output signal R of the subsequent stage.

One of electrodes of the capacitor is connected to a line P for accumulating the voltage VC, and the other electrode thereof is connected to a line Q. The line Q is a line for outputting an output signal. The gate terminal of the first switching element TFT-1 is connected to the line P, the source terminal thereof is connected to the line Q, and the drain terminal thereof is connected to an input terminal for the first clock signal CK1. The gate terminal of the second switching element TFT-2 is connected to an input terminal for the second clock signal CK2, the source electrode thereof is connected to a supply line for supplying the power source voltage VSS, and the drain terminal thereof is connected to the line Q.

The gate terminal of the third switching element TFT-3 and the drain terminal thereof are connected to the input terminal for the output signal S on the previous stage, and the gate terminal thereof is connected to the line P. The gate terminal of the fourth switching element TFT-4 is connected to the input terminal for the output signal R of the subsequent stage, the drain terminal thereof is connected to the line P, and the source terminal thereof is connected to the supply line of the power source voltage VSS.

Figure 36:
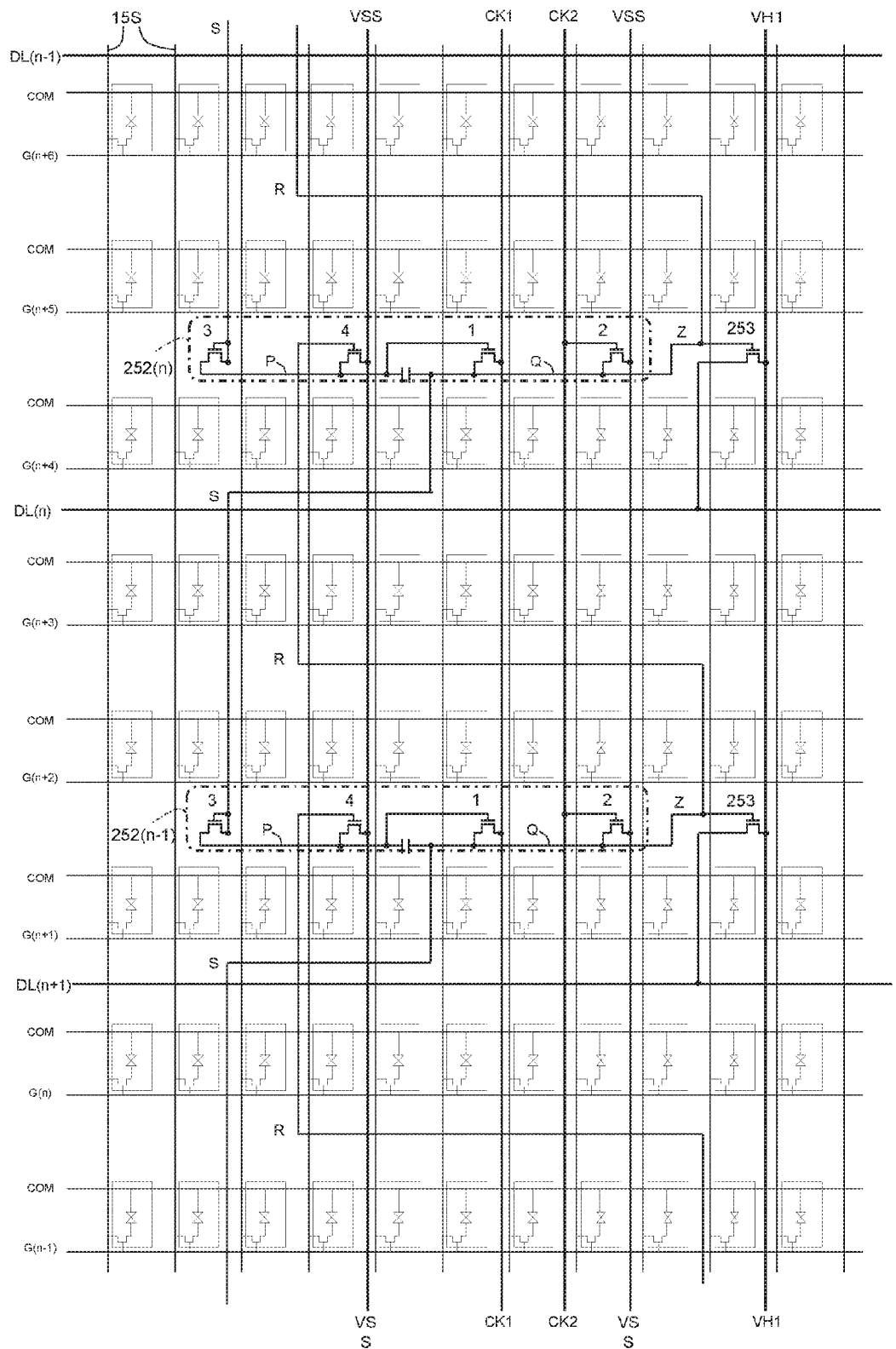
FIG. 36 illustrates an exemplary circuit configuration in a case where drive electrode drivers 35b having the configuration illustrated in FIGS. 32, 34, and 35 are arranged in the pixel area.

FIG. 36 illustrates an exemplary circuit configuration in a case where the drive electrode drivers 35b each of which has a configuration illustrated in FIGS. 32, 34, and 35 are arranged in the pixel area. In FIG. 36, TFT-1, TFT-2, TFT-3, and TFT-4 are denoted by reference numerals of "1", "2", "3", and "4", respectively. In the example illustrated in FIG. 36, lines for supplying the power source voltage VSS, lines for supplying the first clock signal CK1, lines for supplying the second clock signal CK2, and lines for supplying the driving signal wave VH are provided in parallel with the source lines 15S. These are lines connected to the drive electrode drivers 35b provided in the pixel area. A shift register 252(n) of the n-th stage, and a shift register 252(n+1) of the (n+1)-th stage are provided on pixels of different rows. TFT-1 to TFT-4 of the shift register 252 of each stage are connected to the lines for supplying the signals of VSS, CK1, and CK2 and the lines P, Q, as is the case with the circuit configuration illustrated in FIG. 35.

Further, the gate terminal of the switching circuit 253 is connected to the line Q of the shift register 252, the drain terminal thereof is connected to the line for supplying the driving signal wave, and the source terminal thereof is connected to the drive electrode DL. Further, the line Q of the shift register 252(n) of the n-th stage is connected to the gate terminal and the drain terminal of TFT-3 of the shift register 252(n+1) of the (n+1)-th stage. The line Q of the shift register 252(n+1) of the (n+1)-th stage is connected to the gate terminal of TFT-4 of the shift register 252(n) of the n-th stage.

Figure 37:
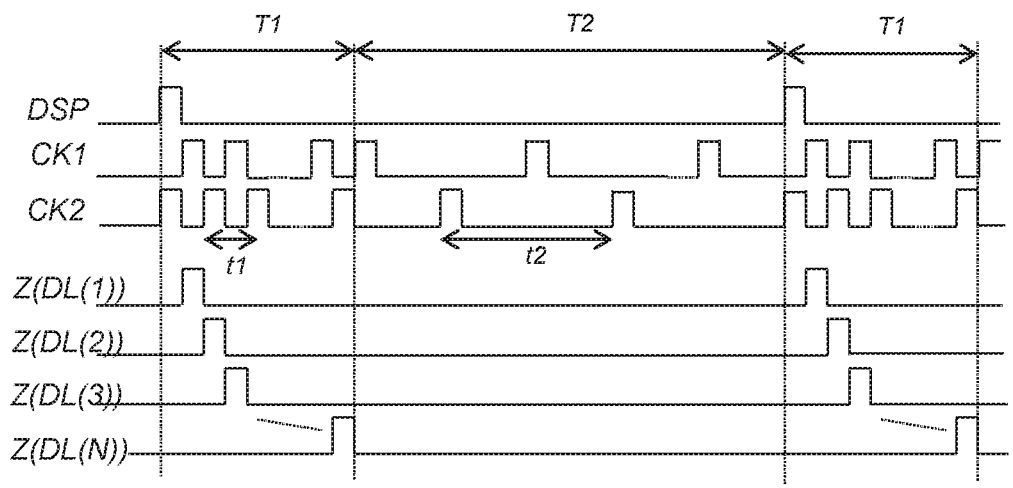
FIG. 37 illustrates an exemplary operation of the drive electrode driver 36b illustrated in FIGS. 32 to 36.

FIG. 37 illustrates an exemplary operation of the drive electrode driver 36b illustrated in FIGS. 32 to 36. FIG. 37 illustrates examples of a driving start signal DSP, a first clock signal CK1, a second clock signal CK2, and signals Z output from the shift registers 252 corresponding to the drive electrodes DL(1), DL(2), . . . , DL(N).

In the example illustrated in FIG. 37, a period while a time for scanning the drive electrodes DL(1) to DL(N), that is, a perpendicular scanning time, is T1, and a period while the perpendicular scanning time is T2, are provided alternately. The cycle t1 of the clock signals CK1, CK2 during the period while the perpendicular scanning time is T1, and the cycle t2 of the clock signals CK1, CK2 during the period while the perpendicular scanning time is T2, are different. In this way, a plurality of periods that are different regarding the perpendicular scanning time can be arrayed in the time axis. This makes it possible to execute a plurality of operations that are different regarding the perpendicular scanning time, under time-sharing. For example, an operation of switching the cycle of the driving signal depending on the noise environments is enabled. Or alternatively, in a case where the lines for supplying the clock signals to the drive electrode drivers 35 double as the lines for supplying the clock signals to the gate drivers, the operations of the drive electrode drivers 35 and the operations of the gate drivers can be executed under time-sharing.

Figure 38:
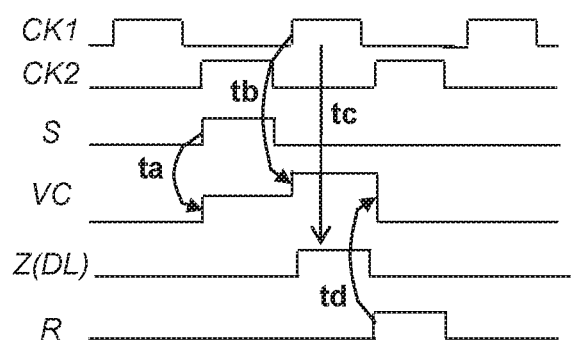
FIG. 38 illustrates an exemplary operation of a shift register 252 having the configuration illustrated in FIG. 35.

FIG. 38 illustrates an exemplary operation of the shift register 252 having a configuration illustrated in FIG. 35. FIG. 38 illustrates signals during a period while the output signal Z of the shift register 252 is in the ON state in FIG. 37 and periods before and after the foregoing period.

In the example illustrated in FIG. 38, at a time to when the output signal S of the previous stage makes transition from the OFF state to the ON state, the voltage VC of the line P changes due to output signal S. Here, since the first clock signal CK1 is Low and the second clock signal CK2 is High, TFT-1 is turned OFF and TFT-2 is turned ON. This causes the voltage of the line Q, that is, the voltage of the output signal Z, to be turned OFF (low level). Thereafter, at a time tb when the second clock signal CK2 drops to the Low level and the first clock signal CK1 rises to the high level, the voltage VC is boosted up, and the TFT-1 is turned ON. Consequently, the output signal Z (DL) changes from the OFF state (low level) to the ON state (high level). During a period tc while the first clock CK1 is high, the ON state of the output signal is maintained. At a time td when the output signal R of the subsequent stage changes to the ON state, TFT-4 is turned ON, and the voltage of the line P becomes VSS. Consequently, the output signal Z changes from the ON state to the OFF state.

Figure 39:
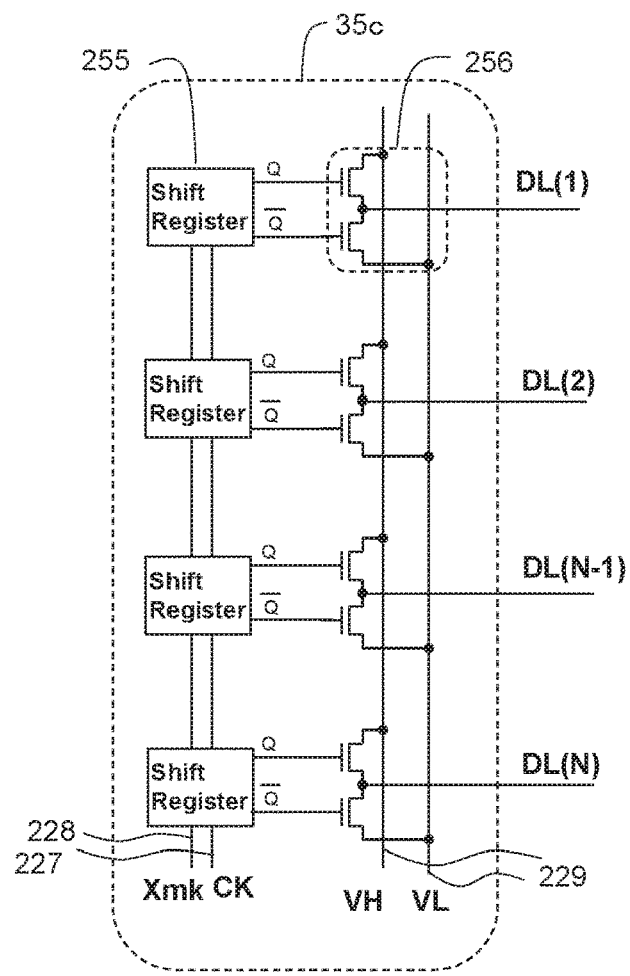
FIG. 39 is an exemplary configuration of a drive electrode driver 35c that can perform parallel driving.
Figure 40:
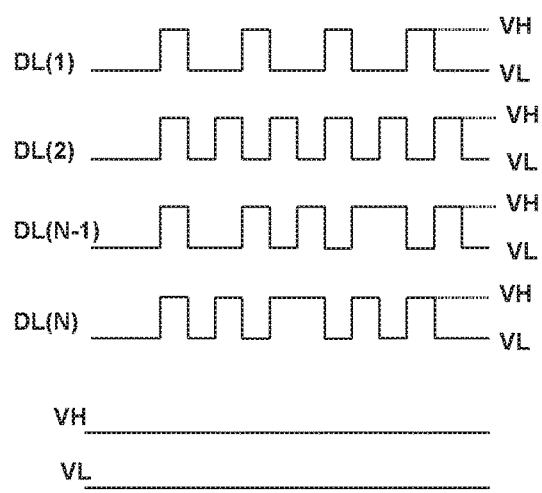
FIG. 40 is a timing chart of the parallel driving circuit illustrated in FIG. 39.

So far, an exemplary configuration and operation in a case where shift registers are used in the drive electrode driver is described. The driving method of the drive electrode driver is not limited to this example. For example, the driving method is not limited to sequential driving, but may be parallel driving. FIG. 39 illustrates an exemplary configuration of a drive electrode driver 35c that can be driven by parallel driving. FIG. 40 is a timing chart of a parallel driving circuit illustrated in FIG. 39.

The drive electrode driver 35c in FIG. 39 includes shift registers 255 and switching circuits 256 that correspond to drive electrodes, respectively. Each shift register 255 is connected to the drive electrode DL via the switching circuit 256. To the shift register 255, a line 227 for supplying the clock signal CK and a line 228 for supplying a signal Xmk in a coded pattern are connected. To the switching circuit 256, driving signal lines 229 for inputting a high level voltage VH and a low level voltage VL of the driving signal are connected. The shift register 255 controls the switching circuit 256 based on the clock signal CK and the signal Xmk in the coded pattern, thereby to generate an application voltage having a pattern coded by using VH and VL, and outputs the same to each drive electrode DL. This application voltage having the coded pattern is applied simultaneously (in parallel) to a plurality of the drive electrodes DL. The coded pattern, which is input as the signal Xmk, can be, for example, an M sequence code or an Hadamard code.

Figure 41:
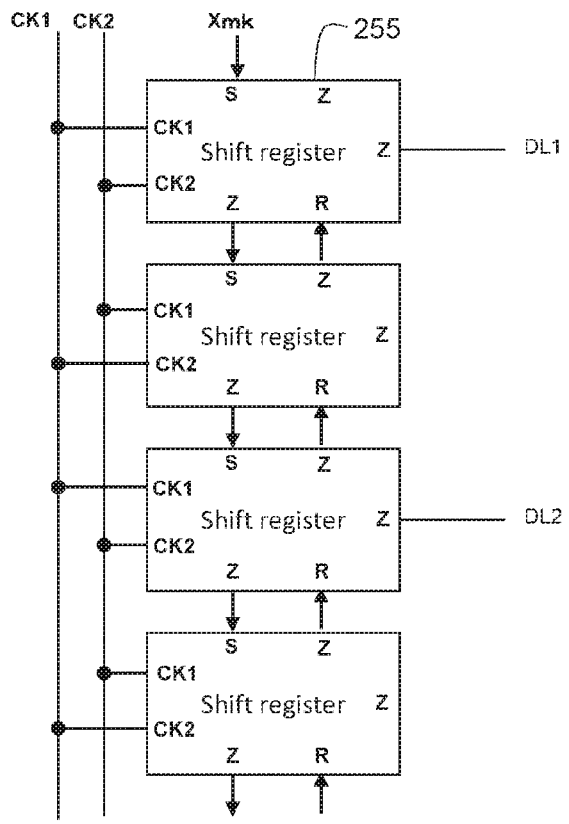
FIG. 41 illustrates another exemplary configuration of a driving circuit for parallel driving in which shift registers 255 are used.
Figure 42:
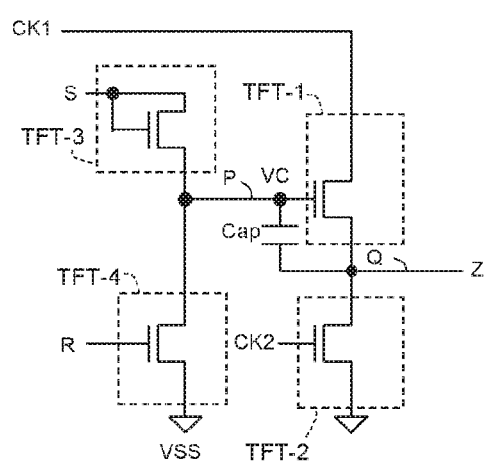
FIG. 42 illustrates an exemplary circuit configuration of the shift register 255 illustrated in FIG. 41.

FIG. 41 illustrates another exemplary configuration of a driving circuit of parallel driving in which the shift registers 255 are used. FIG. 42 illustrates an exemplary circuit configuration of the shift register 255 illustrated in FIG. 41. In the example illustrated in FIG. 41, two consecutive shift registers among a plurality of shift registers connected are used for supplying the driving signal to one drive electrode DL. In other words, a set of shift registers of two stages is provided with respect to each drive electrode DL. The output signal Z of one of the shift registers of two stages is output to the drive electrode DL. With this configuration, signals at the same level can be simultaneously output to the two consecutive drive electrodes DL(n), DL(n+1). For example, it is possible to simultaneously input a signal at a high level (signal indicating "1") or a signal at a low level (signal indicating "0") to both of one driving electrode DL(n) and a drive electrode DL(n+1) of the next stage (the subsequent row). It is therefore possible to output a signal in a pattern based on the signal Xmk input thereto, simultaneously to a plurality of drive electrodes DL(1) to DL(N).

Each of the shift registers 255 has terminals through which two clock signals CK1, CK2 having opposite phases are input thereto, a terminal through which an output signal S from the shift register on the previous stage is input thereto, terminals for outputting an output signal Z, and a terminal through which an output signal R from the shift register on the subsequent stage is input thereto. The shift register on the first stage does not have a terminal through which an output signal Z from the previous stage is input, but has a terminal through which the signal Xmk of the coded pattern is input thereto instead.

In the example illustrated in FIG. 42, the shift register 252 includes a capacitor Cap in which a voltage VC for turning ON the output signal Z is charged, and first to fourth switching elements (TFTs-1 to 4). The first switching element TFT-1 outputs a voltage VC charged in the capacitor Cap according to the first clock signal CK1. The third switching element TFT-3 charges the voltage VC to the capacitor Cap based on the output signal S of the previous stage. The second switching element TFT-2 turns OFF the voltage of the output signal S (predetermined voltage) based on the second clock signal CK2. The fourth switching element TFT-4 resets the voltage VC based on the output signal R of the subsequent stage.

One of electrodes of the capacitor is connected to a line P for accumulating the voltage VC, and the other electrode thereof is connected to a line Q. The line Q is a line for outputting an output signal. The gate terminal of the first switching element TFT-1 is connected to the line P, the source terminal thereof is connected to the line Q, and the drain terminal thereof is connected to an input terminal for the first clock signal CK1. The gate terminal of the second switching element TFT-2 is connected to an input terminal for the second clock signal CK2, the source electrode thereof is connected to a supply line for supplying the power source voltage VSS, and the drain terminal thereof is connected to the line Q.

The gate terminal of the third switching element TFT-3 and the drain terminal thereof are connected to the input terminal for the output signal S on the previous stage, and the gate terminal thereof is connected to the line P. The gate terminal of the fourth switching element TFT-4 is connected to the input terminal for the output signal R of the subsequent stage, the drain terminal thereof is connected to the line P, and the source terminal thereof is connected to the supply line of the power source voltage VSS.

Figure 43:
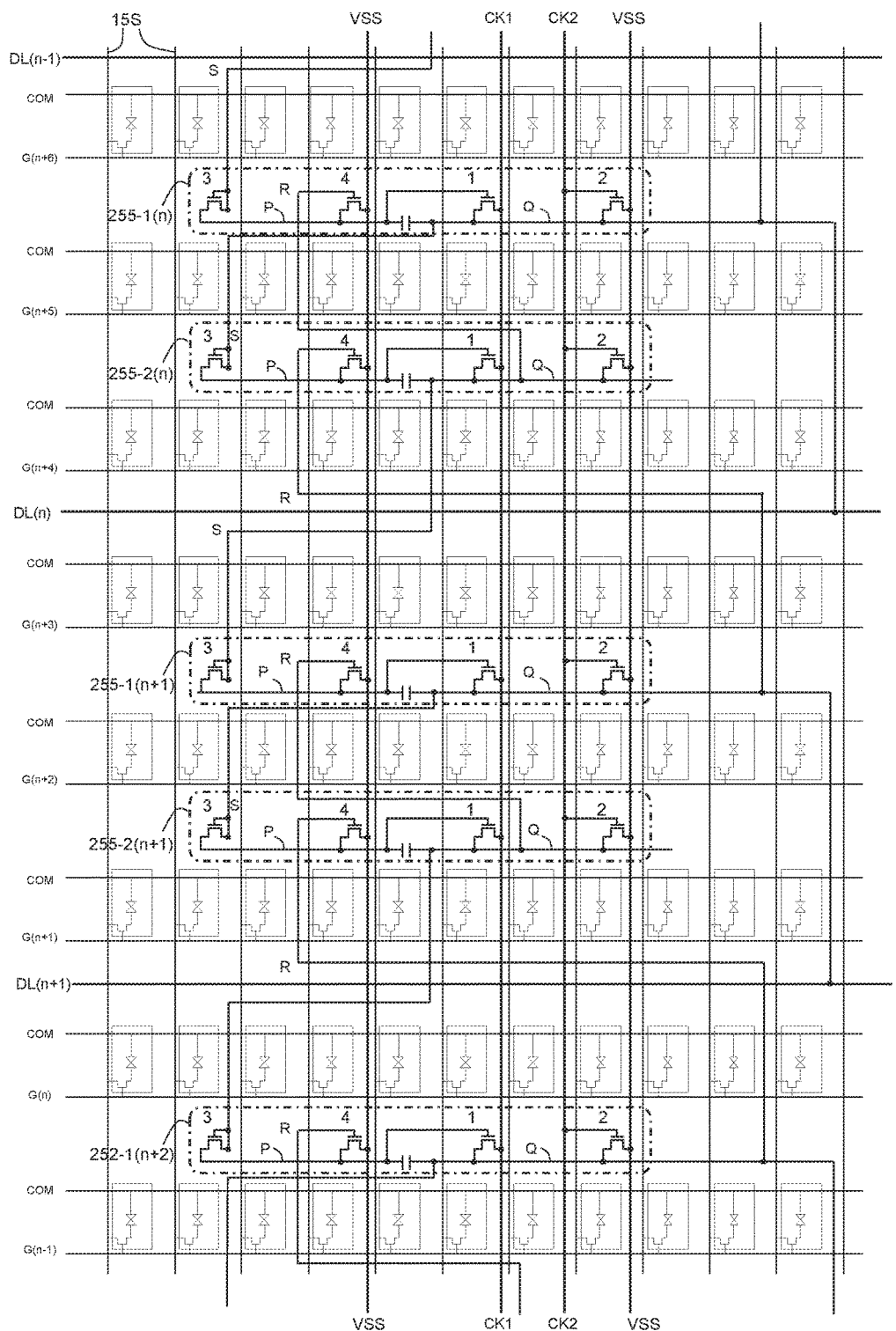
FIG. 43 illustrates an exemplary circuit configuration in a case where the drive electrode driver 35c having a configuration illustrated in FIGS. 41 and 42 is arranged in a pixel area.

FIG. 43 illustrates an exemplary circuit configuration in a case where the drive electrode drivers 35c each of which has a configuration illustrated in FIGS. 41, 42 are arranged in the pixel area. In FIG. 43, TFT-1, TFT-2, TFT-3, and TFT-4 are denoted by reference numbers of "1", "2", "3", and "4", respectively. In the example illustrated in FIG. 43, lines for supplying the power source voltage VSS, lines for supplying the first clock signal CK1, and lines for supplying the second clock signal CK2 are provided in parallel with the source lines 15S. These are lines connected to the drive electrode drivers 35c provided in the pixel area. A first shift register 255-1(n) corresponding to the n-th drive electrode DL(n), and a second shift register 255-2(n) corresponding to the n-th drive electrode DL(n) are provided on pixels of different rows. In each of the first shift register 255-1 and the second shift register 255-2, TFT-1 to TFT-4 are connected to the lines for supplying the signals of VSS, CK1, and CK2 and the lines P, Q, as is the case with the circuit configuration illustrated in FIG. 42.

The line Q of the first shift register 255-1(n) corresponding to the n-th drive electrode DL(n) is connected to the drive electrode DL(n). This line Q is further connected to the gate terminal of TFT-4 of the first shift register 255-1(n−1) corresponding to the (n−1)-th drive electrode DL(n), and the gate terminal and the drain terminal of TFT-3 of the second shift register 252-2(n) corresponding to the n-th drive electrode DL(n).

Further, the line Q of the second shift register 255-2(n) corresponding to the n-th drive electrode DL(n) is connected to the gate terminal and the drain terminal of TFT-3 of the first shift register 255-1(n+1) of the (n+1)-th drive electrode DL(n+1). This line Q of the second shift register 255-2(n) is also connected to the gate electrode of TFT-4 of the first shift register corresponding to the n-th drive electrode DL(n). Still further, the line Q of the first shift register 252(n+1) of the (n+1)-th stage is connected to the gate terminal of TFT-4 of the second shift register 252(n) of the n-th stage.

In other words, the line Q to which the output signal of the first shift register of each stage is output is connected to the drive electrode DL, as well as to the gate terminal of TFT-4 of the shift register of the previous stage and the gate terminal of the shift register of the subsequent stage. In contrast, the output signal of the second shift register of each stage is not output to the drive electrode DL, while being connected to the gate terminal of TFT-4 of the shift register of the previous stage and to the gate terminal of the shift register of the subsequent stage.

By using the shift register of sequential driving or parallel driving as described above for a drive electrode driver, an increase in the number of lines provided in the frame area, caused by the enlargement of the panel and the enhancement of image definition, can be suppressed. Consequently, the frame width can be decreased. Further, drive electrode drivers can be arranged in the vicinity of drive electrodes DL, which makes it possible to suppress reductions in the sensor performance due to line resistances between the drive electrodes DL and the drive electrode drivers.

Effects of Embodiments

According to the above-described Embodiments 1 to 4, the line lead-out lines connected to the sensor electrodes can be arranged in the pixel area. This makes it possible to decrease the lines arranged in the frame area outside the pixel area. Further, providing the sensor lead-out lines or the sensor driving switching elements at positions overlapping the sensor electrodes in the pixel area contributes to the reduction of resistances of the sensor electrodes. This makes it possible to improve the touch panel performance. Further, in a case where the sensor electrodes double as the common electrode, the display performance can be improved by the reduction of the resistance of the common electrode. Further, by arranging a part of the driving circuits in the pixel area, the degree of freedom in designing the driving circuits is increased, which makes it easier to design and manufacture a deformed panel. Further, by arranging the gate drivers and the sensor electrode driving drivers in the pixel area, the aperture ratios of the pixels can be made uniform easily.

In Embodiments 1 to 4 described above, an oxide semiconductor can be used for the switching elements of the drive electrode drivers provided in the pixel area. The oxide semiconductor is, for example, an InGaZnO-based oxide semiconductor. This makes it possible to significantly reduce the electric power consumption caused by leakage current. Further, by forming TFTs with the InGaZnO-based oxide semiconductor, the areas of TFTs per se can be reduced. This therefore makes it possible to suppress reductions in the aperture ratios caused by providing TFTs for the drive electrode drivers in the pixel area. Consequently, the influences of the drive electrode drivers in the pixel area to the display quality can be controlled within an allowable range. Further, by using the InGaZnO-based oxide semiconductor, a high voltage can be used for the driver circuits, as compared with cases where an Si-based oxide semiconductor of, for example, amorphous Si or poly-Si is used. This allows a high voltage for a liquid crystal display device (LCD) to be used for the touch panel. Consequently, without increases in the costs, the signals can be increased, which improves the performance of the touch panel.

The present invention is not limited to the embodiments described above. For example, the embodiments described above are examples of an in-cell type sensor-equipped display device in which a layer having a function of a touch panel is provided on the liquid crystal layer LC sides of the active matrix substrate 20*a* and the counter substrate 20*b*, but the embodiments of the present invention encompass, for example, an on-cell type sensor-equipped display device in which a layer having a function of a touch panel is provided between a polarizing plate provided on a viewer side of the counter substrate and the counter substrate.

Further, the embodiments of the present invention also encompass an external-type touch panel in which a touch panel is arranged on a viewer side of a polarizing plate provided on a viewer side of the counter substrate.

In the examples described above, the sensor lead-out lines or the sensor driving switching elements are arranged in the source layer or the gate layer of the active matrix substrate, but these may be provided in a layer other than the active matrix substrate. For example, the sensor lead-out lines in such a configuration as that described above in the descriptions of the embodiments can be arranged in a layer between the counter substrate and the touch panel in an external-type touch panel.

Further, the above descriptions of the embodiments describe exemplary operations of a mutual capacitance type touch panel, but the touch panel may be of a self-capacitance type. Further, the touch panel is not limited to a touch panel of an electrostatic capacitance type. The present invention can be applied to a touch panel of another detection type, such as a resistance film type, that has electrodes for detecting contact or approach of an object.

DESCRIPTION OF REFERENCE NUMERALS

1 Sensor-equipped display device
2 Display panel
7 Sensor lead-out line
13 Gate line
15 Source line
17 Pixel electrode
18 Common electrode
20*a* Active matrix substrate
20*b* Counter substrate
DL Drive electrode
SE Detection electrode

The invention claimed is:

1. A sensor-equipped display device that includes a pixel area in which pixels that display an image are arranged and that is capable of detecting contact or approach of an object, the sensor-equipped display device comprising:
a first substrate;
a second substrate opposed to the first substrate;
a liquid crystal layer provided between the first substrate and the second substrate;
a plurality of first lines provided on the first substrate, the first lines extending in a first direction in the pixel area;
a plurality of second lines provided on the first substrate, the second lines extending in a second direction in the pixel area that is different from the first direction;
pixel switching elements provided for pixels defined by the first lines and the second lines, respectively, the pixel switching elements being connected to the first lines and the second lines;
a plurality of sensor electrodes provided at positions that overlap the pixel area on at least one of the first substrate and the second substrate, the sensor electrodes detecting the contact or approach of the object; and
a plurality of sensor lead-out lines provided in parallel to the first lines or the second lines in the pixel area on the first substrate, the sensor lead-out lines being connected to the sensor electrodes, respectively,
wherein the sensor electrodes continuously extend from one end of the pixel area to another end of the pixel area in the first direction or the second direction on the first substrate, and the sensor lead-out lines extend in a same direction as the sensor electrodes so as to overlap the sensor electrodes and all of portions of the sensor lead-out lines extending in the same direction as the sensor electrodes in the pixel area are fully covered by the sensor electrodes when viewed in a direction normal to the pixel area.

2. The sensor-equipped display device according to claim 1, further comprising:
driving switching elements defined in the pixel area on the first substrate that control driving of the first lines or the second lines according to signals supplied from outside of the pixel area; and
driving control lines defined in the pixel area on the first substrate, the driving control lines extending in the first direction or the second direction and being connected to the driving switching elements, wherein,
when the pixel area is viewed in a plan view in a direction normal to a surface of the pixel area, the pixels that the driving-control switching elements or the driving control lines overlap, and the pixels that the sensor lead-out lines overlap, are different.

3. The sensor-equipped display device according to claim 1, further comprising:
sensor driving switching elements arranged in the pixel area, that control the driving of the sensor electrodes, wherein
the sensor lead-out lines connect at least either the sensor driving switching elements and the sensor electrodes, or the sensor driving switching elements and electrical lines outside of the pixel area.

4. The sensor-equipped display device according to claim 3, wherein
the sensor lead-out lines connecting the sensor driving switching elements and the electrical lines outside of the pixel area include:
voltage supply lines that supply a predetermined voltage to the sensor driving switching elements from the electrical lines outside of the pixel area; and
sensor driving control lines that supply a signal that controls whether or not the predetermined voltage supplied from the voltage supply lines should be applied to the sensor electrodes.

5. The sensor-equipped display device according to claim 3, wherein, in the pixel area, the sensor driving switching elements are connected to between the sensor lead-out lines and the sensor electrodes.

6. The sensor-equipped display device according to claim 1, wherein
each of the sensor electrodes includes a drive electrode to which a driving signal is input, and a detection electrode that outputs a response signal according to the driving signal, and
either the drive electrodes or the detection electrodes are defined on the second substrate.

7. The sensor-equipped display device according to claim 1, further comprising:
pixel electrodes provided for the pixels, respectively; and common electrodes opposed to the pixel electrodes, wherein
the common electrodes define and function as the sensor electrodes.

8. The sensor-equipped display device according to claim 1, wherein line widths of the sensor lead-out lines, or a number of the sensor lead-out lines connected to one sensor electrode, are different depending on lengths of the sensor lead-out lines.

9. A sensor-equipped display device that includes a pixel area in which pixels that display an image are arranged and that is capable of detecting contact or approach of an object, the sensor-equipped display device comprising:
a first substrate;
a second substrate opposed to the first substrate;
a liquid crystal layer provided between the first substrate and the second substrate;
a plurality of first lines provided on the first substrate, the first lines extending in a first direction in the pixel area;
a plurality of second lines provided on the first substrate, the second lines extending in a second direction in the pixel area that is different from the first direction;
pixel switching elements provided for pixels defined by the first lines and the second lines, respectively, the pixel switching elements being connected to the first lines and the second lines;
a plurality of sensor electrodes provided at positions that overlap the pixel area on at least one of the first substrate and the second substrate, the sensor electrodes detecting the contact or approach of the object; and
a plurality of sensor lead-out lines provided in parallel to the first lines or the second lines in the pixel area on the first substrate, the sensor lead-out lines being connected to the sensor electrodes, respectively, wherein
at least a portion of the sensor electrodes are provided on the second substrate,
the sensor-equipped display device further comprising:
a plurality of sealing contacts provided between the first substrate and the second substrate, the sealing contacts electrically connecting the sensor lead-out lines provided on the first substrate, and the sensor electrodes provided on the second substrate,
the sealing contacts are provided along an edge parallel to the first direction,
each of the sensor lead-out lines includes a first portion that is parallel to the first direction and a second portion that is parallel to the second direction,
one end of the first portion is connected with one end of the second portion in the pixel area,
another end of the second portion is connected with a corresponding one of the plurality of sealing contacts outside of the pixel area, and
on the second substrate, on an edge along which the plurality of sealing contacts are provided, the sealing contacts and the sensor electrodes in the pixel area are connected.

10. The sensor-equipped display device according to claim 9, further comprising:
driving switching elements defined in the pixel area on the first substrate, that control driving of the first lines or the second lines according to signals supplied from outside of the pixel area; and
driving control lines defined in the pixel area on the first substrate, the driving control lines extending in the first direction or the second direction and being connected to the driving switching elements, wherein
when the pixel area is viewed in a plan view in a direction normal to a surface of the pixel area, the pixels that the driving-control switching elements or the driving control lines overlap and the pixels that the sensor lead-out lines overlap, are different.

11. The sensor-equipped display device according to claim 9, further comprising:
sensor driving switching elements arranged in the pixel area that control driving of the sensor electrodes, wherein
the sensor lead-out lines connect at least either the sensor driving switching elements and the sensor electrodes, or the sensor driving switching elements and electrical lines outside of the pixel area.

12. The sensor-equipped display device according to claim 11, wherein
the sensor lead-out lines connecting the sensor driving switching elements and the electrical lines outside of the pixel area include:
voltage supply lines that supply a predetermined voltage to the sensor driving switching elements from the electrical lines outside of the pixel area; and
sensor driving control lines that supply a signal that controls whether or not the predetermined voltage supplied from the voltage supply lines should be applied to the sensor electrodes.

13. The sensor-equipped display device according to claim 11, wherein, in the pixel area, the sensor driving switching elements are connected between the sensor lead-out lines and the sensor electrodes.

14. The sensor-equipped display device according to claim 9, wherein
each of the sensor electrodes includes a drive electrode to which a driving signal is input, and a detection electrode that outputs a response signal according to the driving signal, and
either the drive electrodes or the detection electrodes are defined on the second substrate.

15. The sensor-equipped display device according to claim 9, further comprising:
pixel electrodes provided for the pixels, respectively; and
common electrodes opposed to the pixel electrodes, wherein the common electrodes also define and function as the sensor electrodes.

16. The sensor-equipped display device according to claim 9, wherein line widths of the sensor lead-out lines, or a number of the sensor lead-out lines connected to one sensor electrode, are different depending on lengths of the sensor lead-out lines.

* * * * *